United States Patent [19]

MacDoran et al.

[11] Patent Number: 4,797,677

[45] Date of Patent: Jan. 10, 1989

[54] METHOD AND APPARATUS FOR DERIVING PSEUDO RANGE FROM EARTH-ORBITING SATELLITES

[75] Inventors: Peter F. MacDoran, Pasadena; Donovan J. Spitzmesser, La Crescenta, both of Calif.

[73] Assignee: Istac, Incorporated, Pasadena, Calif.

[21] Appl. No.: 865,958

[22] Filed: May 19, 1986

Related U.S. Application Data

[63] Continuation-in-part of Ser. No. 437,819, Oct. 29, 1982, abandoned.

[51] Int. Cl.⁴ .............................................. H04B 7/185
[52] U.S. Cl. ...................................... 342/352; 342/357
[58] Field of Search ............... 342/352, 356, 357, 358; 375/1

[56] References Cited

U.S. PATENT DOCUMENTS

| | | | |
|---|---|---|---|
| 3,906,204 | 9/1975 | Rigdon et al. | 343/357 X |
| 4,114,155 | 9/1978 | Raab | 342/394 |
| 4,232,389 | 11/1980 | Loiler | 455/12 |
| 4,286,270 | 8/1981 | Veselkov et al. | 343/418 |
| 4,445,118 | 4/1984 | Taylor et al. | 342/357 |
| 4,453,165 | 6/1984 | Maine | 343/418 |
| 4,463,357 | 7/1984 | MacDoran | 342/352 X |
| 4,468,793 | 8/1984 | Johnson et al. | 342/357 X |
| 4,485,383 | 11/1984 | Maher | 342/352 |
| 4,613,977 | 9/1986 | Wong et al. | 342/420 X |
| 4,646,096 | 2/1987 | Brown | 342/357 |
| 4,651,154 | 3/1987 | Wong et al. | 342/356 |
| 4,667,203 | 5/1987 | Counselman, III | 342/418 X |
| 4,689,626 | 8/1987 | Hori et al. | 342/357 |

Primary Examiner—Thomas H. Tarcza
Assistant Examiner—John B. Sotomayor
Attorney, Agent, or Firm—Christie, Parker & Hale

[57] ABSTRACT

The invention permits a user to derive his pseudo range from earth-orbiting, signal-transmitting satellites without knowledge of the code sequence of modulation carried by the signal, if any. A modulated radio frequency signal having a component at a given frequency, which is transmitted from a satellite is intercepted at a user position. The component is recovered from the intercepted signal. The phase and frequency of the component are measured. From these measurements and similar measurements from other such satellites, the pseudo range of the satellite can be derived. Specifically, a fractional phase is derived from the measured phase and frequency of the intercepted signal. A Doppler range value is also derived from the measured frequencies of the satellites. The Doppler range value is divided by the wavelength of the given frequency to produce an integer and a remainder. The integer is added to the fractional phase to produce a value proportional to the pseudo range.

5 Claims, 11 Drawing Sheets

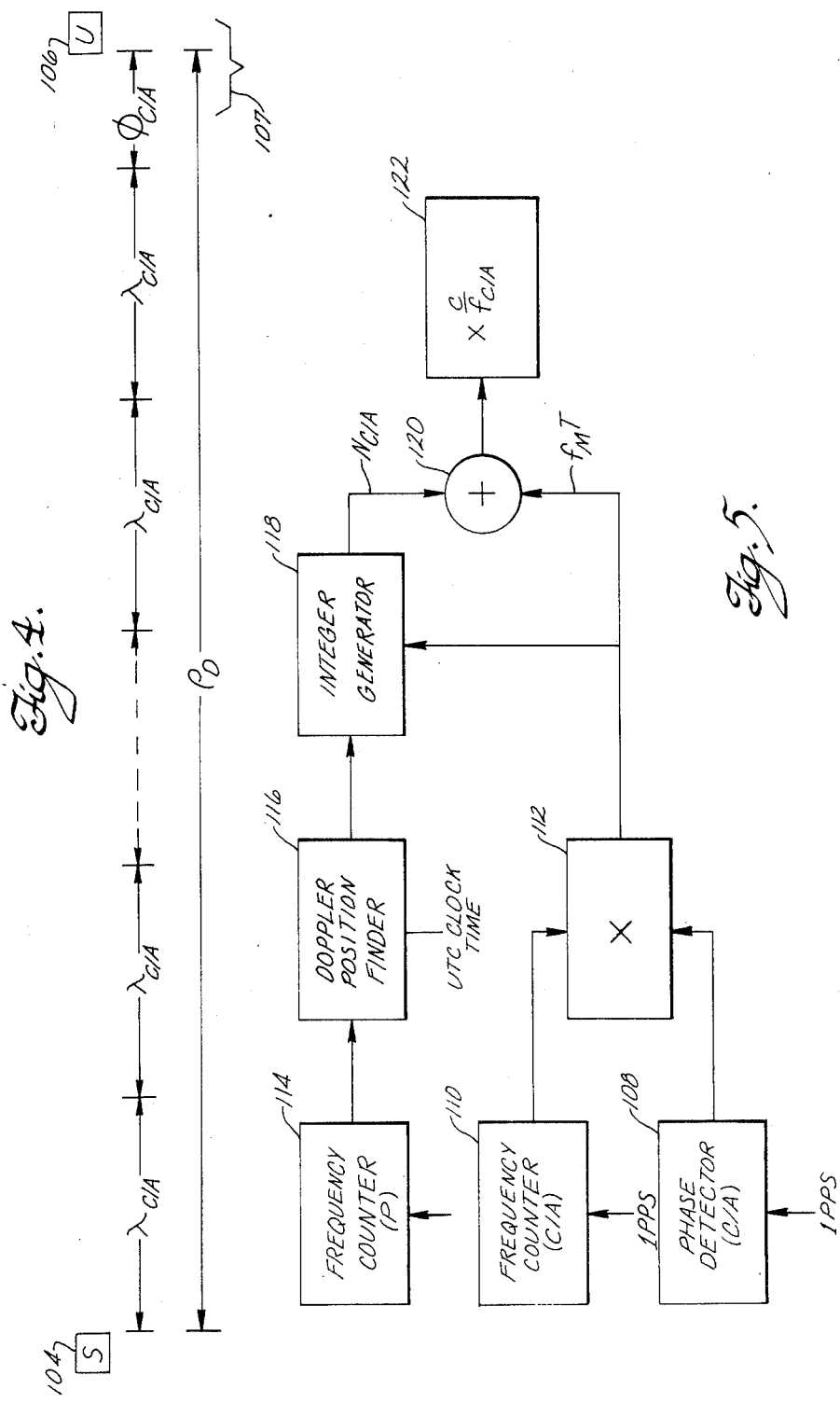

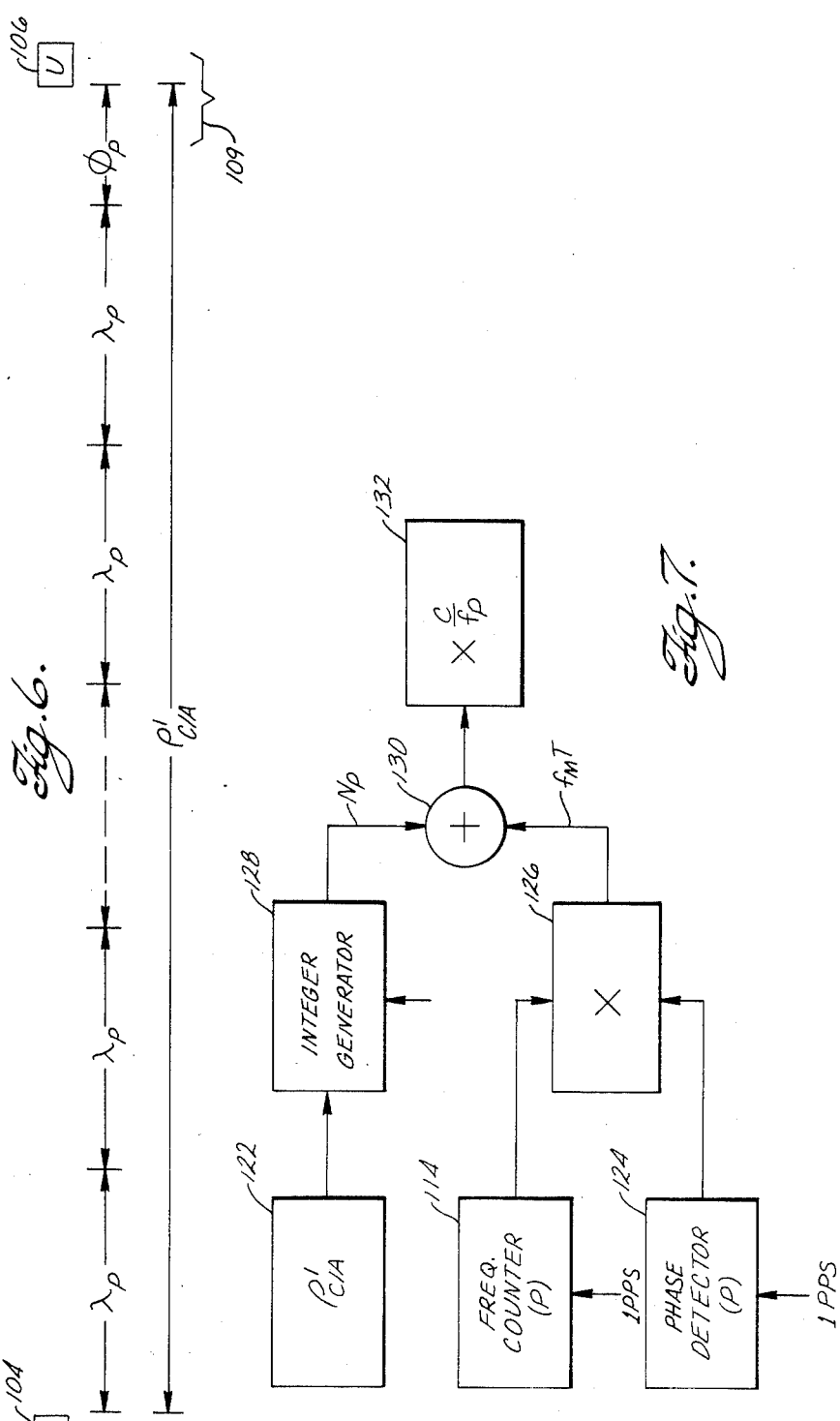

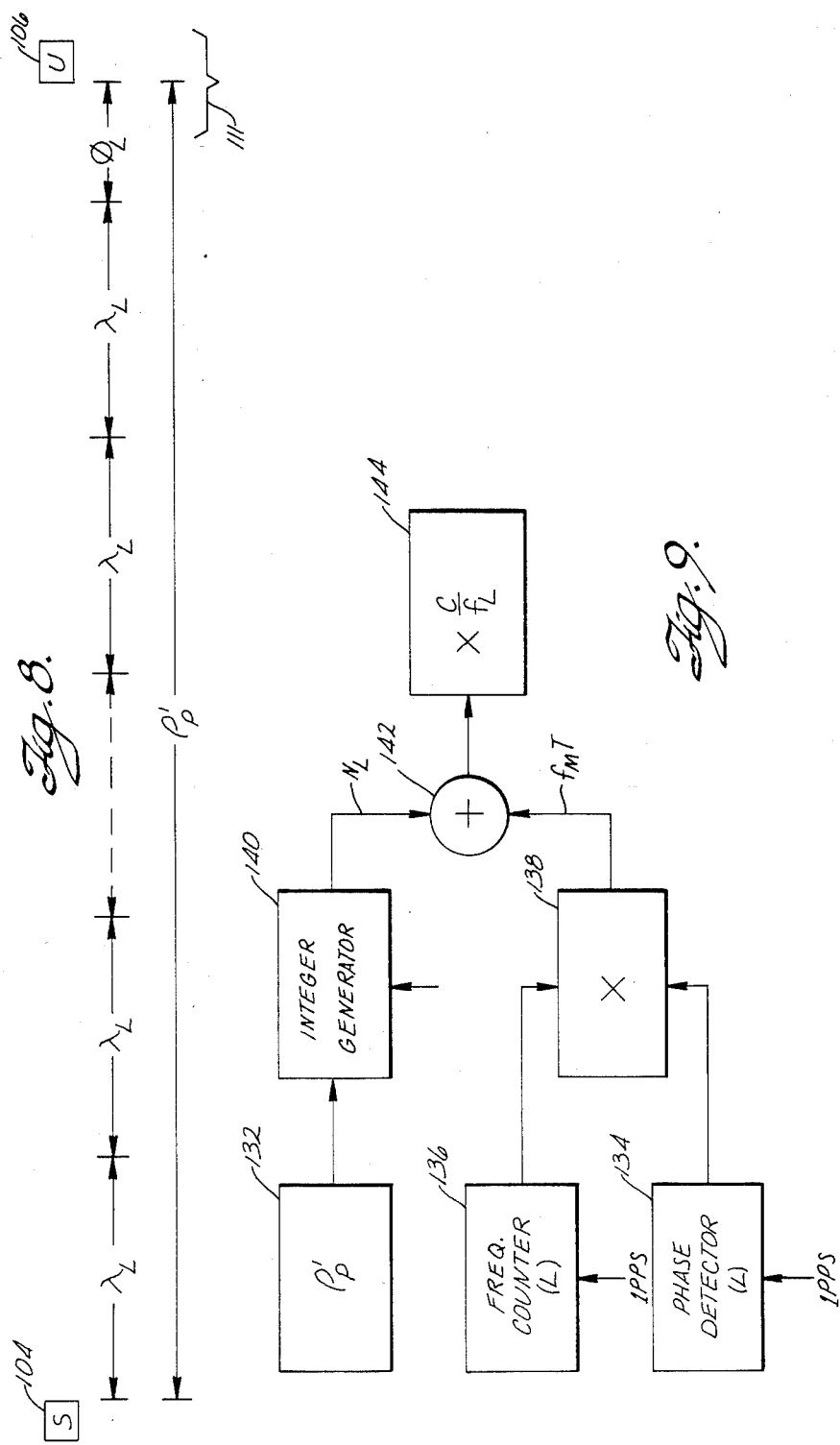

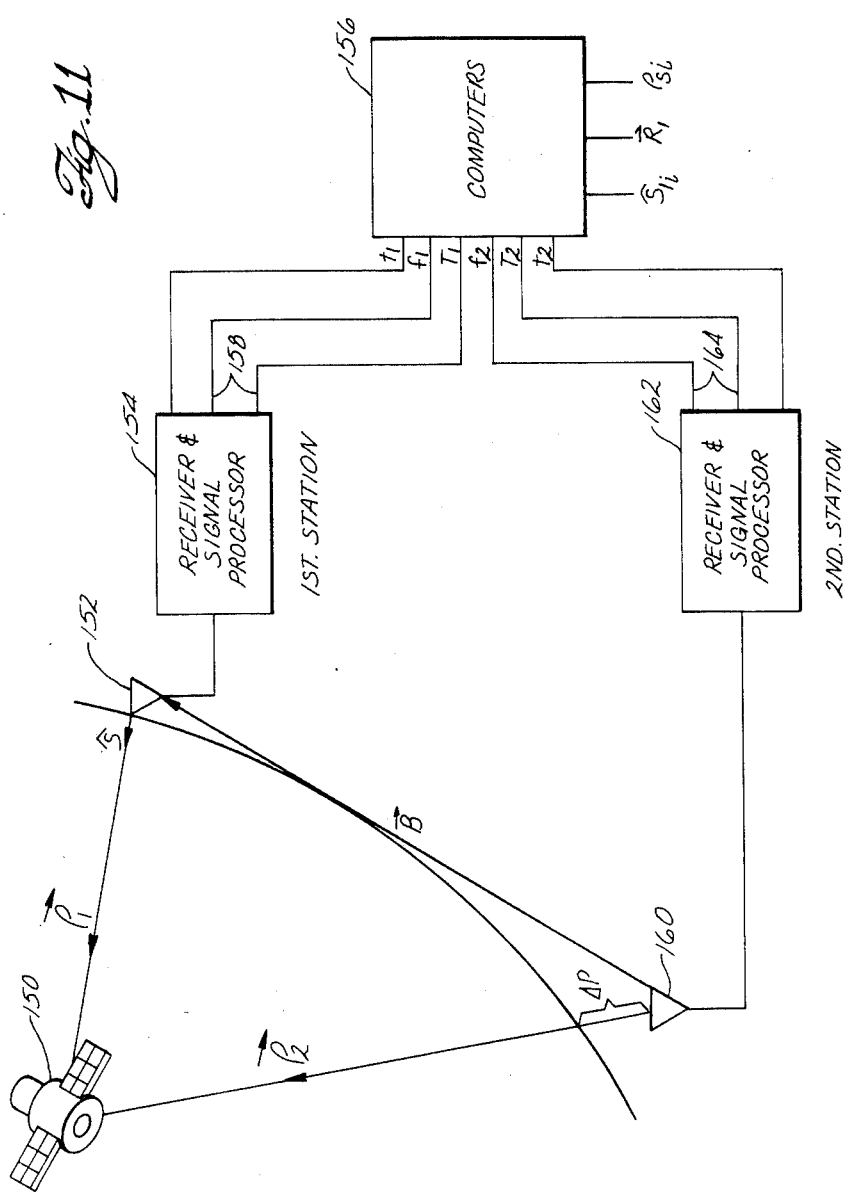

METHOD AND APPARATUS FOR DERIVING PSEUDO RANGE FROM EARTH-ORBITING SATELLITES

CONTRACTUAL ORIGIN OF THE INVENTION

The U.S. government has rights in this invention pursuant to Contract No. NAS7-100 between the National Aeronautics and Space Administration and the California Institute of Technology, Jet Propulsion Laboratory.

CROSS-REFERENCE TO RELATED APPLICATIONS

This is a continuation-in-part of application Ser. No. 06/437,819 filed Oct. 29, 1982, abandoned.

BACKGROUND OF THE INVENTION

This invention relates to platform positioning, i.e., tracking and locating points relative to an earth coordinate system, and, more particularly, to a method and apparatus for deriving pseudo range from earth-orbiting, signal-transmitting satellites.

The U.S. Navy TRANSIT Navigational Satellite System comprises a number of satellites in near-earth polar orbit. The satellites transmit to user stations 150 and 400 MHz carriers on which satellite ephemeris information is modulated. The user measures the frequency of the received signal and calculates his range with respect to transmitting satellites based on the Doppler frequency shift observed by the user and the satellite ephemeris information. Specifically, if the positions of the observed satellite and its transmission frequency are known, the Doppler frequency shift of the signals received from the satellite at a point as it passes over the receiver in 15 minutes or less permits the determination of the location of that point in an earth-referenced coordinate system. A further description of TRANSIT is given in an article by H. D. Black entitled "Satellites for Earth Surveying and Ocean Navigating," Johns Hopkins APL Technical Digest, January–March, 1981, Volume 2, No. 1, pages 3–13.

The NAVSTAR Global Positioning System, which comprises a plurality of coded signal transmitting satellites in far earth orbit, will provide, to authorized users in possession of the code, greater accuracy and more flexibility than TRANSIT. Although at present there are only six NAVSTAR satellites in orbit, it is planned that eventually there will be 18, so distributed that four satellites are visible from any point on earth. Each NAVSTAR satellite transmits a so-called $L_1$ band radio signal centered about a frequency of 1575.42 MHz and an $L_2$ band radio signal centered about a frequency of 1227.6 MHz. The $L_1$ band has a suppressed carrier $L_1$ upon which a protected information channel called P-code and a coarse acquisition channel called C/A code are modulated in double side band form. The $L_2$ band has a suppressed carrier $L_2$ upon which the P-code is modulated in double side band form. The P-code and C/A code channels both carry binary information signals at a given chip rate, i.e., 10.230 MHz in the case of the P-code, and 1.0230 MHz in the case of the C/A code. The P-code sequence is only known to authorized users of the NAVSTAR system. With knowledge of the P-code sequence, an authorized user of NAVSTAR can derive his pseudo range relative to the satellites in his field of view by measuring the time it takes for the P-code sequence to traverse the distance between the satellites and the user, knowing that the signal travels at the speed of light. The true range of the user from a satellite equals the pseudo range plus the difference in the offset of the satellite clock and the user clock relative to a time reference such as the universal time coordinated scale. Having thus measured the pseudo range, a user can determine the satellite and user clock offsets and perform a number of tracking and location determinations, termed "platform positioning," by means of well-known techniques. To those not having access to the P-code sequence, the NAVSTAR satellite system cannot currently be used to determine high-precision pseudo range.

SUMMARY OF THE INVENTION

The invention permits a user to derive his pseudo range from earth-orbiting, signal-transmitting satellites without knowledge of the code sequence of modulation carried by the signal, if any. A modulated radio frequency signal having a component at a given frequency transmitted from a satellite is intercepted at a user position. The component is recovered from the intercepted signal without a reliance on the knowledge of the particulars of the coding sequence used to spread the signal power that suppresses the carrier and the phase of such component is measured. The measured phase of the component is an accurate, but ambiguous indication of the pseudo range from the satellite to the user position—ambiguous because the whole number of cycles of the recovered component is not reflected in the phase measurement. To resolve the ambiguity, a coarse range measurement is made, such as, for example, a Doppler frequency shift measurement. This coarse measurement must be accurate to less than a wave length, preferably less than one-third of a wave length, of the phase measured component. The coarse measurement is processed with the phase measurement of the component to provide an accurate, nonambiguous measurement of pseudo range.

According to a feature of the invention, the pseudo range value determined as described in the preceding paragraph is used as the coarse measurement to derive one or more, more accurate pseudo range values from other frequency components. The higher the frequency of the selected component, the more accurate is the phase measurement, but the more accurate the coarse range measurement must be, in order to resolve the ambiguity of the phase measurement. Thus, after determining a first pseudo range value as described in the preceding paragraph using a selected component having a low frequency, a second more accurate pseudo range value is derived by measuring the phase of a higher selected frequency component and resolving the ambiguity using the first pseudo range value. This procedure can be repeated with one or more times with other, yet higher selected frequency components. In each case, the previous pseudo range value is used to resolve the ambiguity of the phase measurement in the described manner. An extremely accurate pseudo range value may be derived in this way.

A Doppler range value is also derived from the measured frequencies of the satellites. The Doppler range value is divided by the wavelength of the given frequency to produce an integer and a remainder. The integer is added to the fractional phase to produce a value proportional to the pseudo range.

From the pseudo range, a number of platform-positioning operations can be performed by means of well-known techniques—for example, point positioning of a user in an earth-referenced coordinate system, differential positioning of a user relative to a stationary point, satellite positioning, and ionospheric calibration.

BRIEF DESCRIPTION OF THE DRAWINGS

The features of a specific embodiment of the best mode contemplated of carrying out the invention are illustrated in the drawings, in which:

FIGS. 4, 6, and 8 are sketches used to explain the invention;

DETAILED DESCRIPTION OF THE SPECIFIC EMBODIMENT

Although the invention is applicable to other types of earth-orbiting, signal-transmitting satellite systems, it is described herein in connection with the NAVSTAR Global Positioning System, which furnishes a very advantageous signal for pseudo ranging by means of the invention.

Figure 1:
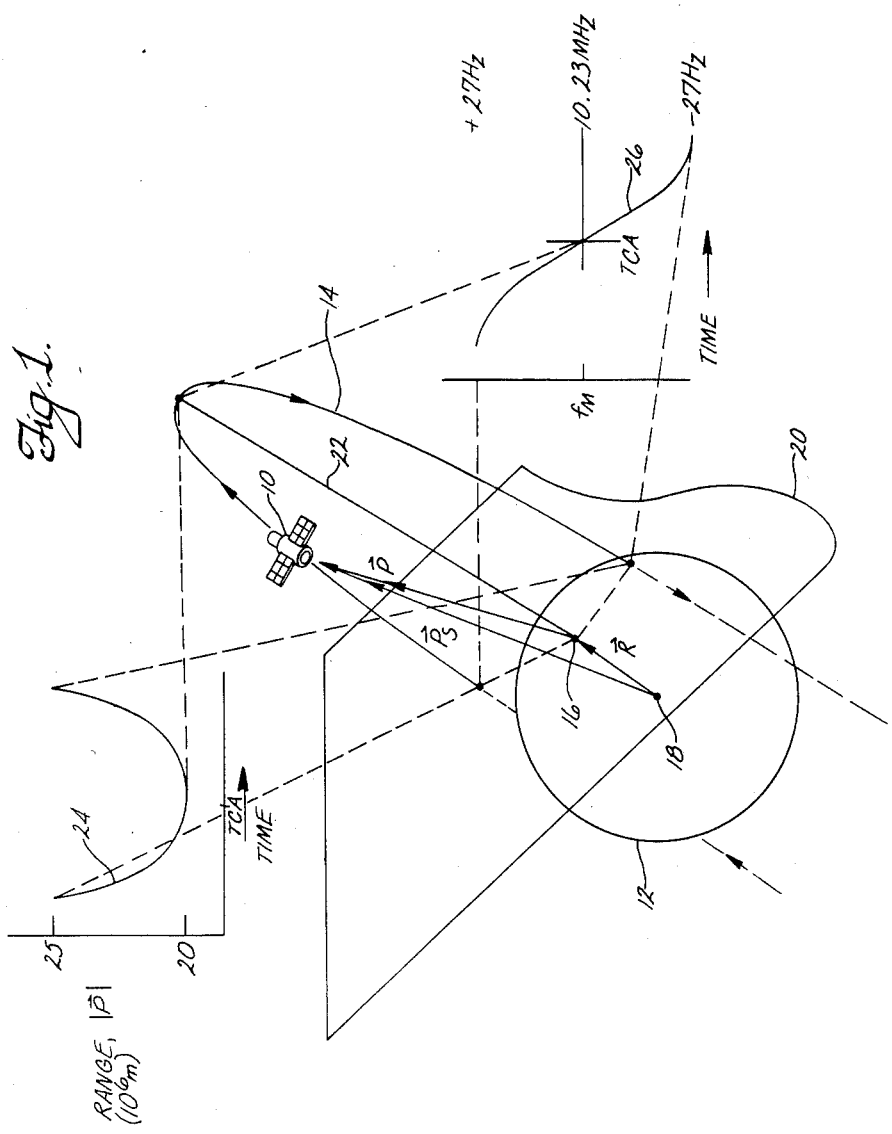
FIG. 1 is a diagram showing a single satellite in earth orbit for the purpose of depicting the relationships and terms used to explain the invention.

FIG. 1 illustrates a signal-transmitting NAVSTAR satellite 10 orbiting the earth 12 along a path 14. A user on the surface of the earth is located at a point 16. In an earth-referenced coordinate system having its origin at the center of the earth 18, the position of user point 16 is $\vec{R}$ and the position of satellite 10 is $\rho_s$. The range of satellite 10 from the user is $\rho$. Point 16 lies in a horizontal plane of observation 20, which is normal to the radial line 22 passing through point 16 and center 18. As illustrated by the solid nature of path 14, satellite 10 is visible to a user at point 16, during the portion of path 14 lying on the opposite side of plane 20 from earth 12. While satellite 10 is visible, the user at point 16 is intercepting radio signals therefrom. The magnitude of the user's range $|\vec{\rho}|$ from satellite 10 varies from a maximum where it rises above plane 20 to a minimum where it crosses radius 22, called herein time of closest approach (TCA), to another maximum where it sets below plane 20 (although $\vec{R}$ need not always lie in the satellite orbit plane). This relationship is shown by a curve 24. In the case of NAVSTAR, this range varies between about 20 million meters and 25 million meters. Due to Doppler frequency shift, the frequency intercepted at point 16 varies from the frequency transmitted by satellite 10, the measured frequency, $f_M$, at point 16 being largest when satellite 10 rises above plane 20, being smallest when satellite 10 sets below plane 20 and being the same as the transmitted frequency, $f_T$, when satellite 10 is at its time of closest approach. This relationship and the Doppler frequency spread are shown by curve 26.

Figure 2:
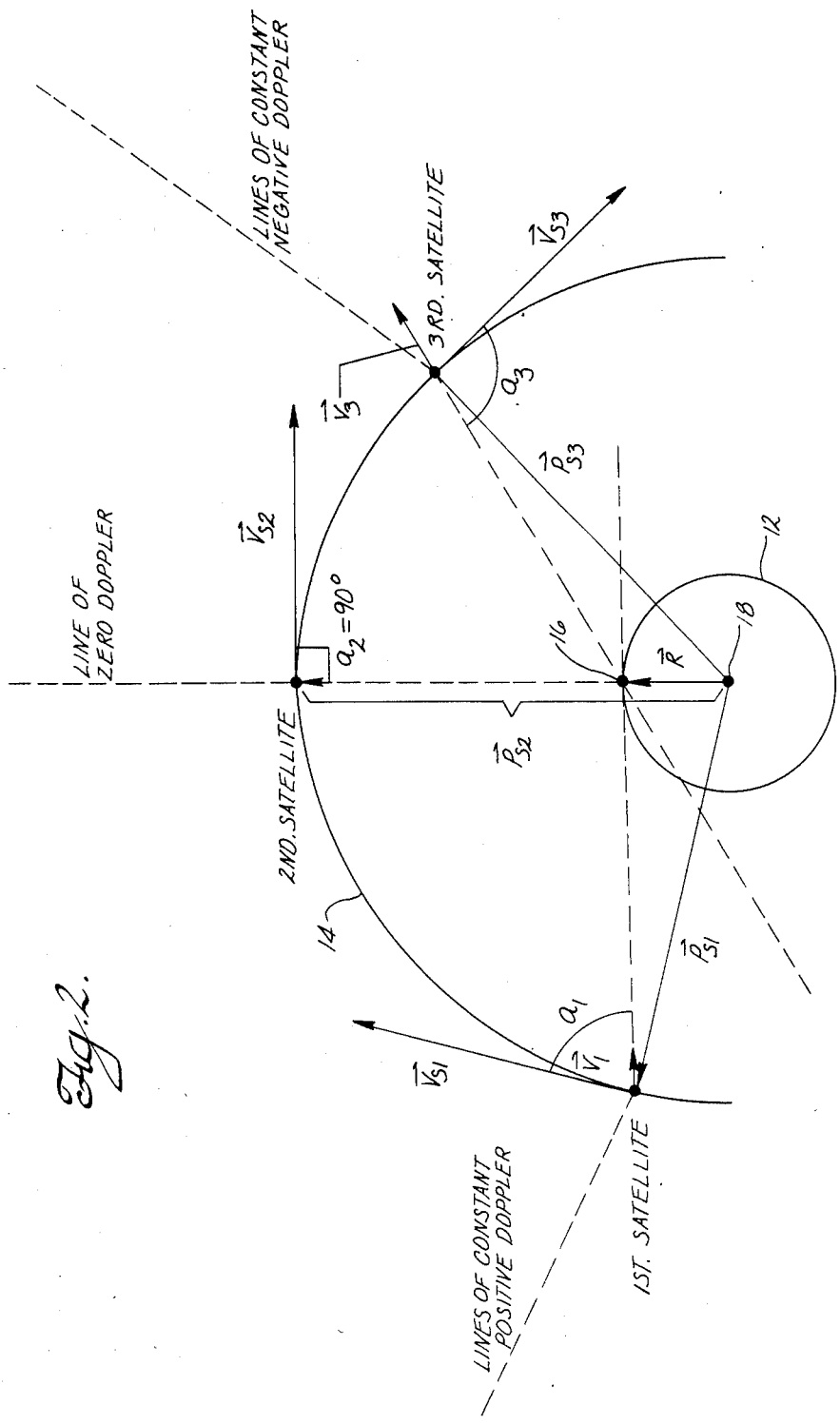
FIG. 2 is a diagram of three satellites orbiting the earth to depict the Doppler frequency shift.

FIG. 2 illustrates how the satellite position affects the frequency shift of the signal intercepted by the user at point 16. The component of the satellite velocity, $\vec{V}_s$, lying on an imaginary line passing through the satellite and point 16, is proportional to the Doppler frequency shift. This component is proportional to the cosine $\alpha$, where $\alpha$ is the angle between the velocity vector of the satellite and the imaginary line passing through the satellite and point 16. Thus, a first satellite that has just risen above the horizontal plane of observation is at an angle $\alpha_1$, i.e., approximately 77°, and has the largest Doppler frequency shift. A second satellite at the time of closest approach has an angle $\alpha_2$ of 90° and no Doppler frequency shift. A third satellite midway between the time of closest approach and the horizontal plane of observation has an angle $\alpha_3$, i.e., approximately 103° and a negative Doppler frequency shift. In general, point 16 must lie on the surface of an imaginary cone whose vertex is at the satellite position with a half apex angle $\alpha$. In a two-dimensional case, the cones of two satellites determine the location of point 16 and therefore two satellites are sufficiently unique to determine the location of point 16 by measuring the Doppler frequency shift at point 16. In the three dimensional case, three satellites are required provided that the receiver frequency reference is identical to the frequency reference aboard the NAVSTAR satellites.

In practicing the invention, selected frequency components of the signal transmitted from the satellites are recovered. To understand how the invention derives the pseudo range from a user to a satellite, the distance therebetween can be considered as comprising a large number of whole wavelengths, N, of one of the selected frequency components together with a fraction of this wavelength. The fraction of the wavelength called hereafter the fractional phase and designated $\phi$, is derived by measuring the frequency, $f_M$, and time interval, T, between a given point of the selected component and a reference signal. Specifically, the measured frequency, $f_M$, is multiplied by the time interval T to produce a precise determination of the fractional phase, $\phi$. The degree of precision depends on the wavelength of the selected component. The fractional phase, $\phi$, is an ambiguous representation of the distance between the satellite and the user. The ambiguity can be resolved by determining the number of whole wave lengths of the selected frequency component in a gross range measurement. The number of whole wavelengths is derived by measuring the Doppler frequency shift of a selected component from different satellites to determine a gross Doppler range value, hereafter called the Doppler range $\rho_D$, by well-known Doppler ranging techniques. The pseudo range is the sum of all the whole wavelengths between the satellite and the user and the fractional wavelength. Thus, the pseudo range can be expressed by the following equation:

$$\rho' = (c/f_T)[f_M T + N]$$

where $\rho'$ is the pseudo range, c is the speed of light, $f_T$ is the true frequency of the selected component transmitted by the satellite, $f_M$ is the measured frequency of the selected component intercepted by the user reflecting the Doppler frequency shift, T is the time interval, and N is the number of whole wavelengths.

By dividing the gross Doppler range value, $\rho_D$, by the wavelength of the selected component, $\lambda$, a whole number of wavelengths, N, plus a remainder are produced. If the measurements for deriving Doppler range, $\rho_D$, are made to provide an accuracy of better than one-half of a wavelength, the whole number of wavelengths, N, is precise, leaving all the uncertainty, i.e., error, in the remainder. In general, the remainder is discarded and in its place the fractional phase, $\phi$, which is very precise, is added to the whole number of wavelengths N to provide an accurate value of pseudo range, $\rho'$, the extent of accuracy depending upon the wavelength of the selected component, $\lambda$. (Note that some measurements must either be discarded or the quotient must be increased to the next whole number to produce the whole number of wavelengths, N, as discussed below in connection with FIG. 4.)

Figure 3:
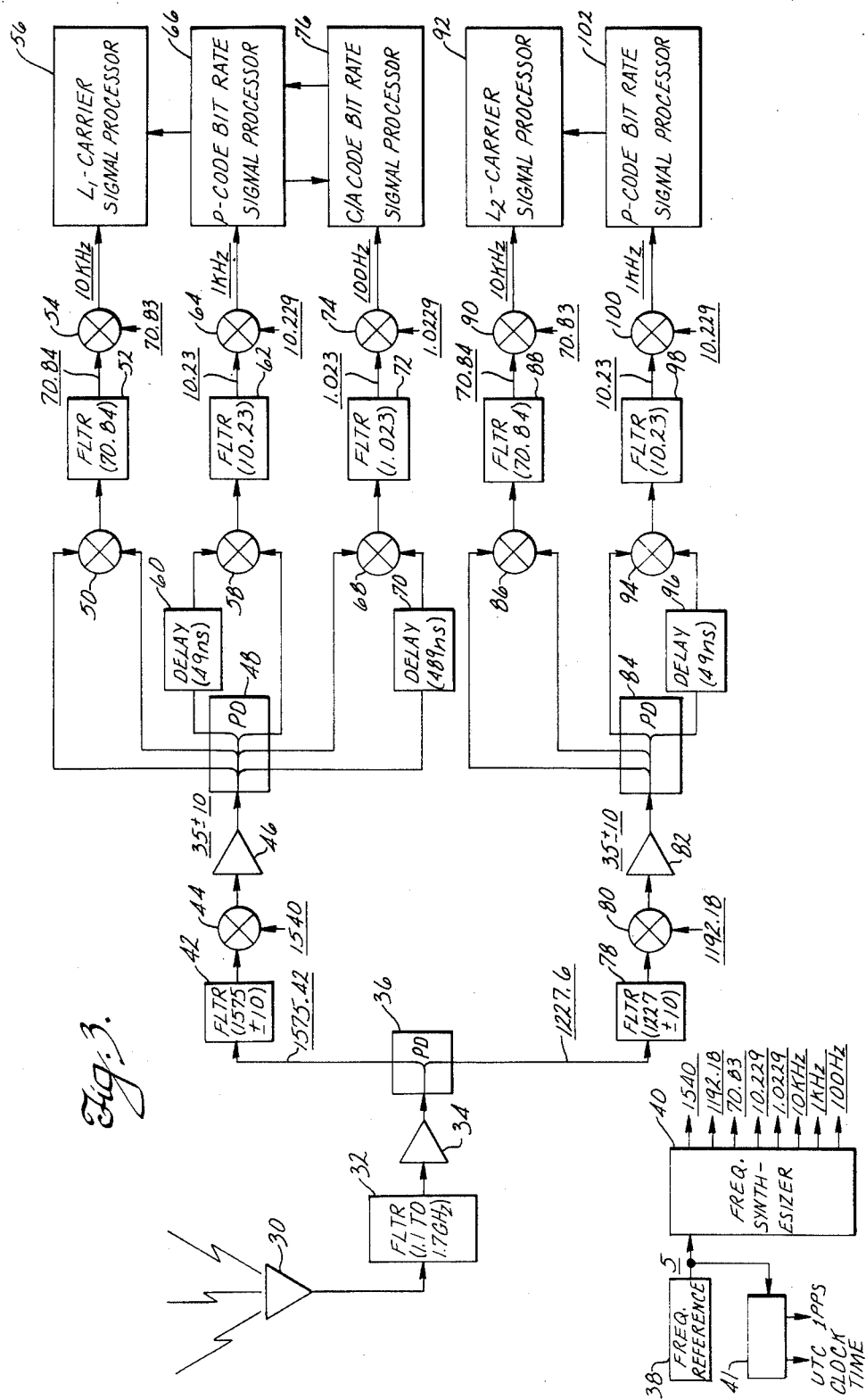
FIG. 3 is a schematic block diagram of a receiver incorporating principles of the invention.

FIG. 3 illustrates a receiver for recovering selected components of the signal transmitted by a NAVSTAR satellite. For convenience, the selected frequency components of the signal transmitted from the NAVSTAR satellites and their characteristics are set forth in the following table:

| Selected Component | Frequency (MHz) | Effective Recovered Wavelength (m) | Doppler Spread |
|---|---|---|---|
| $L_1$ carrier | 1575.42 | .095 | ±8.3 kHz |
| $L_2$ carrier | 1227.6 | .122 | ±6.5 kHz |
| P-code chip rate | 10.230 | 29.3 | ±27 Hz |
| C/A-code chip rate | 1.0230 | 293 | ±2.7 Hz |

The signal transmitted from a NAVSTAR satellite is intercepted by an antenna 30. As previously discussed, this signal comprises an $L_1$ band with a suppressed carrier $L_1$ upon which a P-code channel and a C/A code channel are modulated in double side band form and an $L_2$ band with a suppressed carrier $L_2$ upon which the P-code is modulated in double side band form. The underlined numbers in FIG. 3 represent the frequency at the designated locations, in MHz unless otherwise noted. The numbers in parentheses represent the pass bands of the filters and the time delays of the delay lines with which they are associated. Antenna 30 is connected by a band pass filter 32 and an amplifier 34 to the input of a power divider 36, which separates the $L_1$ band and the $L_2$ band. A frequency reference 38 comprises a stable atomic clock such as a Hewlett-Packard HP5065A, synchronized to the frequency reference of the satellite, although less sophisticated crystal oscillators such as a Hewlett-Packard HP105 can also perform this function. Frequency reference 38 is coupled to a frequency synthesizer 40, which generates eight different frequencies for use in the receiver by means of frequency multipliers and dividers. Thus, the eight frequencies generated by synthesizer 40, which are shown eminating therefrom are precisely synchronized to frequency reference 38. Frequency reference 38 is also coupled to a clock 41, which has an output where Universal Time Coordinated (UTC) clock time is available and an output where one pulse per second (1 PPS) is generated.

From one output of power divider 36, the $L_1$ band is coupled through a filter 42 to a mixer 44 where it is down converted by one of the tones from synthesizer 40. The output of mixer 44 is coupled by an amplifier 46 to the input of a power divider 48.

The $L_1$ carrier component is recovered by connecting two of the outputs of power divider 48 to a mixer 50. The output of mixer 50 is coupled by a filter 52 to a mixer 54, where it is down converted by a tone from synthesizer 40. The output of filter 52 is centered at 70.84 MHz and has twice the Doppler frequency spread that occurs on the $L_1$ carrier and thus an effective recovered wavelength of 0.095 meters. A low frequency narrow band sine wave signal, exhibiting the Doppler frequency shift and fractional phase of the $L_1$ carrier, is coupled from mixer 54 to an $L_1$ carrier signal processor 56. The zero Doppler frequency shift condition is exhibited as a 10 kHz sine wave.

The P-code chip rate component is recovered by connecting one output of power divider 48 directly to a mixer 58 and another output of power divider 48 to mixer 58 through a delay line 60 that introduces a time delay of one-half of the period of the P-code chip rate. The output of mixer 58 is coupled by a filter 62 to a mixer 64, where it is down converted by a tone from synthesizer 40. The output of filter 62 is a sine wave at the P-code chip rate. A low-frequency, narrow-band sine wave signal, exhibiting the Doppler frequency shift and fractional phase of the P-code chip rate component, is coupled from mixer 64 to a P-code chip rate signal processor 66.

The C/A code chip rate component is recovered by connecting another output of power divider 48 directly to a mixer 68 and yet another output of power divider 48 to mixer 68 through a delay line 70, which introduces a delay equal to one-half the period of the C/A code chip rate. The output of mixer 68 is coupled by a filter 72 to a mixer 74, where it is down converted by a tone from synthesizer 40. The output of filter 72 is a sine wave at the C/A code chip rate. A low-frequency, narrow-band sine wave signal exhibiting the Doppler frequency shift and fractional phase of the C/A code chip rate component is coupled from mixer 74 to a C/A code chip rate signal processor 76.

From the other output of power divider 36, the $L_2$ band is coupled through a filter 78 to a mixer 80, where it is down converted by one of the tones from synthesizer 40. The output of mixer 80 is coupled by an amplifier 82 to the input of a power divider 84.

The $L_2$ carrier component is recovered by connecting two of the outputs of power divider 84 to a mixer 86. The output of mixer 86 is coupled by a filter 88 to a mixer 90, where it is down converted by a tone from synthesizer 40. The output of filter 88 is centered at 70.84 MHz and has twice the Doppler frequency spread that occurs on the $L_2$ carrier and thus the effective recovered wavelength is 0.122 meters. A low frequency, narrow-band sine wave signal exhibiting the Doppler frequency shift and fractional phase of the $L_2$ carrier is coupled from mixer 90 to an $L_2$ carrier signal processor 92. The zero Doppler frequency condition is exhibited by a sine wave at 10 kHz.

The $L_2$ channel P-code chip rate component is recovered by connecting one output of power divider 84 directly to a mixer 94 and another output of power divider 84 to mixer 94 through a delay line 96 that introduces a time delay of one-half of the period of the P-code chip rate. The output of mixer 94 is coupled by a filter 98 to a mixer 100, where it is down converted by a tone from synthesizer 40. The output of filter 98 is a sine wave at the P-code chip rate. A low-frequency, narrow-band sine wave signal, exhibiting the Doppler frequency shift and fractional phase of the P-code chip rate component, is coupled from mixer 100 to a P-code chip rate signal processor 102.

Figure 4:
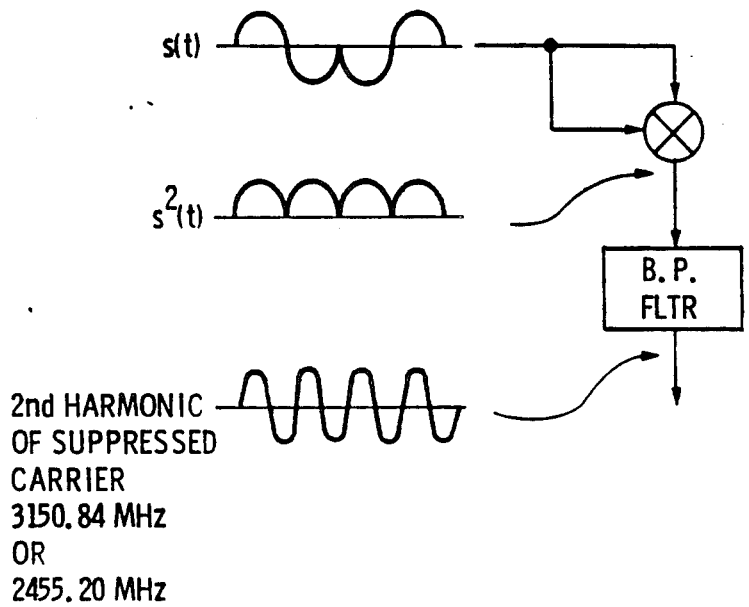

FIG. 4 depicts the distance, i.e., range, between a satellite 104 and a user 106 for the C/A code chip rate component. A large number, $N_{C/A}$, of whole wavelengths, $\lambda_{C/A}$, of the C/A code component and a fractional phase, $\phi_{C/A}$, extend between satellite 104 and user 106. The fractional phase, $\phi_{C/A}$, is measured and the number of wavelengths, $N_{C/A}$, is determined by deriving a gross value of Doppler range, $\rho_D$. In this case, the gross value of Doppler range, $\rho_D$, is derived from the Doppler frequency shift of the P-code chip rate component because, assuming an amplitude signal-to-noise ratio of 10:1, this can readily be done to an accuracy of 50 meters or less, i.e., about one-sixth of a wavelength, $\lambda_{C/A}$. The uncertainty i.e., possible error, of the gross value of Doppler range, $\rho_D$, is depicted by the parentheses 107, meaning that the measured gross value of the Doppler range $\rho_D$ could fall anywhere within the parentheses. The gross value of the Doppler range, $\rho_D$, is divided by the wavelength, $\lambda_{C/A}$, of the C/A code chip rate component to produce a quotient comprising a whole number plus a remainder. In general, the remainder is discarded and the whole number, which is treated as the whole number of wavelengths, $N_{C/A}$, is added to the fractional phase, $\phi_{C/A}$, to produce an accurate value of pseudo range $\rho'_{C/A}$. If the remainder is larger than a given value depending on the signal-to-noise ratio, e.g., five-sixths of a wavelength, $\lambda_{C/A}$, for an amplitude signal-to-noise ratio of 10:1 and the fractional phase, $\phi_{C/A}$, is smaller than a given value, e.g., one-sixth of a wavelength, $\lambda_{C/A}$, for an amplitude signal-to-noise ratio of 10:1, this particular measurement of the gross value of the Doppler range must either be disregarded or one must be added to the whole number of the quotient to produce the whole number of wavelengths, $N_{C/A}$, to be added to the fractional phase, $\phi_{C/A}$, to produce an accurate value of pseudo range, $\rho'_{C/A}$. With the assumed amplitude signal-to-noise ratio ratio of 10:1, the pseudo range value, $\rho'_{C/A}$, can be determined to an accuracy of 5 meters or better.

Figure 5:
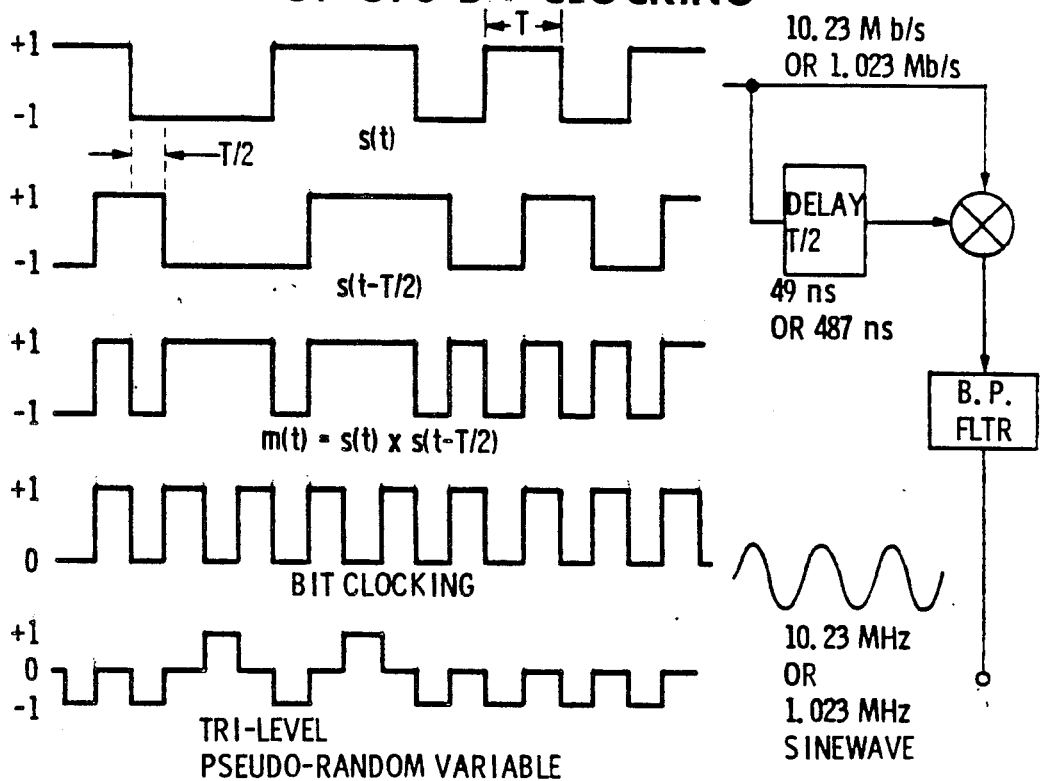
FIGS. 5, 7, and 9 are schematic block diagrams of the signal processors of FIG. 3.

FIG. 5 shows signal processor 76, which performs the operations described in connection with FIG. 4. The output of mixer 74 (FIG. 3) is coupled to a phase detector 108 and a frequency counter 110. The phase of the C/A code chip rate component relative to pulses occurring at one pulse per second generated by clock 41 is determined by phase detector 108. The frequency of this component is determined by frequency counter 110 at intervals of 1 PPS under the control of clock 41. Phase detector 108 and frequency counter 110 are connected to a multiplier 112, which produces the fractional phase, $\phi_{C/A}$, at its output. The output of mixer 64 (FIG. 3) is connected to a frequency counter 114. The output of frequency counter 114 is connected to a Doppler position finder 116 to which UTC clock time is also applied from clock 41. Position finder 116 could comprise commercially available equipment such as Magnavox Model 1502 adapted for data processing at 10.23 MHz instead of 400 MHz using principles described in "Satellite Surveying," by G. J. Hoar, Magnavox Document MX-TM-3346-81, No. 10058, February, 1982. Position finder 116 determines the gross value of Doppler range, $\rho_D$. The output of range finder 116 is connected to an integer generator 118, which produces the value of the whole number of wavelengths, $\lambda_{C/A}$. The outputs of multiplier 112 and integer generator are applied to an adder circuit 120 and the output of adder circuit 120 is connected to a multiplier 122, where the value of the sum of the fractional phase, $\phi_{C/A}$, plus the whole number of wavelengths, $N_{C/A}$, is multiplied by the speed of light, c, divided by the frequency, $f_{C/A}$, of the C/A code chip rate component without Doppler shift.

Figure 6:
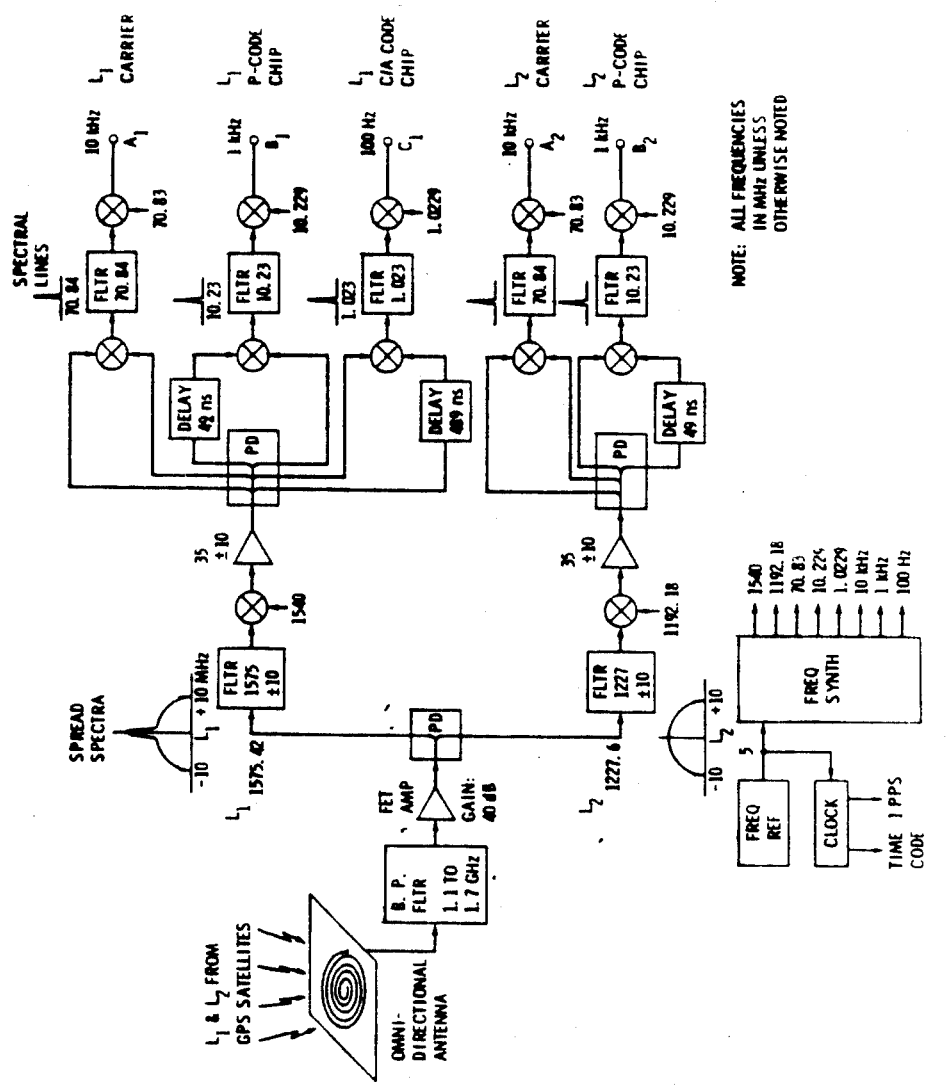

FIG. 6 depicts the distance, i.e., range, between satellite 104 and user 106 for the P-code chip rate component. A large number, $N_P$, of whole wavelengths, $\lambda_P$, of the P-code component and a fractional phase, $\phi_P$, extend between satellite 104 and user 106. The fractional phase, $\phi_P$, is measured and the number of wavelengths, $N_P$, is determined by using the already derived pseudo range value, $\rho'_{C/A}$, which is accurate to less than one-sixth of a wavelength, $\lambda_P$, of the P-code chip rate component. The uncertainty, i.e., possible error, of the pseudo range, $\rho'_{C/A}$, is depicted by the parentheses 109, meaning that it could fall anywhere within the parentheses. The value of the pseudo range, $\rho'_{C/A}$, is divided by the wavelength, $\lambda_P$, of the P-code chip rate component to produce a quotient comprising a whole number of wavelengths, $N_P$, plus a remainder. In general, the remainder is discarded the whole number, which is treated as the whole number of wavelengths, $N_P$, is added to the fractional phase, $\phi_P$, to produce an accurate value of pseudo range, $\rho'_P$. If the remainder is larger than a given value depending on the signal-to-noise ratio, e.g., five-sixths of a wavelength, $\lambda_P$, for an amplitude signal-to-noise ratio of 10:1 and the fractional phase $\phi_P$ is smaller than a given value, e.g., one-sixth of a wavelength, $\lambda_P$, for an amplitude signal-to-noise ratio of 10:1, the gross value of the Doppler range must either be disregarded or one must be added to the whole number of the quotient to produce the whole number of wavelengths, $N_P$, to be added to the fractional phase, $\phi_P$, to produce an accurate value of pseudo range, $\rho'_P$. With the assumed amplitude signal-to-noise ratio of 10:1, the pseudo range value, $\rho'_P$ can be determined to an accuracy of 30 cm, or better.

Figure 7:
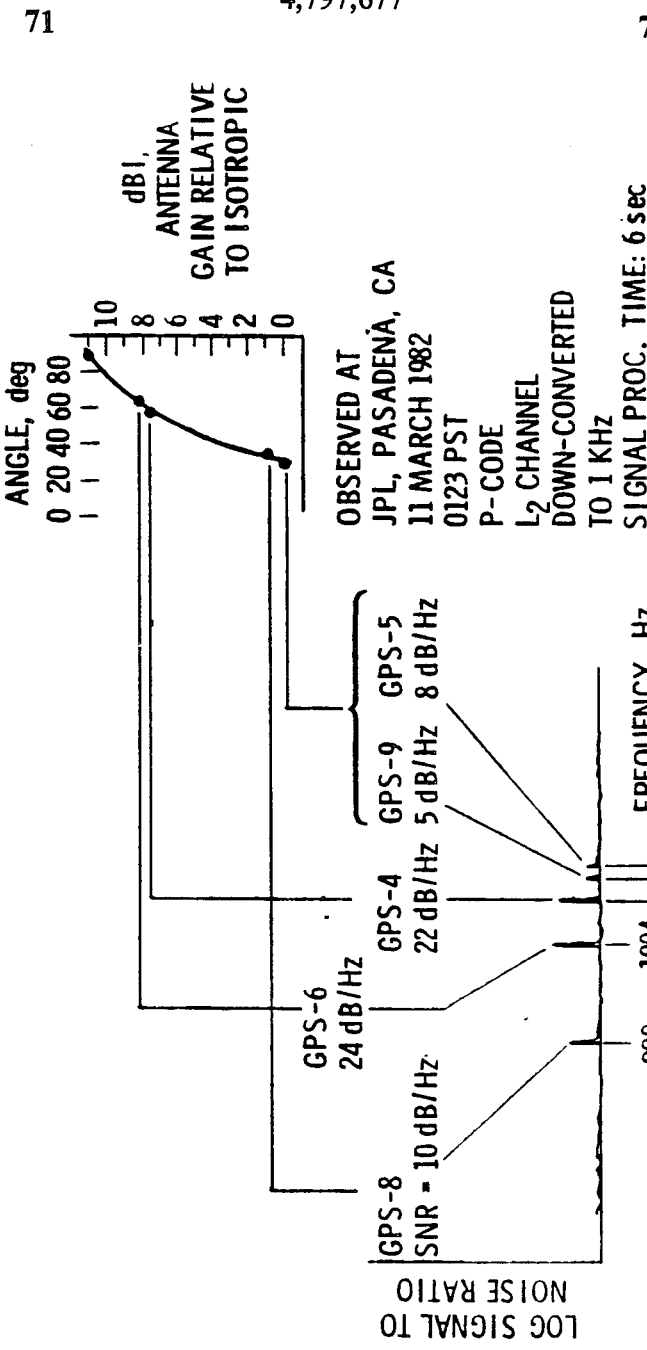

FIG. 7 shows signal processor 66 or 102, which performs the operations described in connection with FIG. 6. The output of mixer 64 or 100 (FIG. 3) is coupled to a phase detector 124 and to frequency counter 114 (FIG. 5). The phase of the P-code chip rate component relative to pulses occurring at one pulse per second generated by clock 41 is determined by phase detector 124. The frequency of this component is determined by frequency counter 114 at intervals of 1 PPS under the control of clock 41. Phase detector 124 and frequency counter 114 are connected to a multiplier 126, which produces the fractional phase, $\phi_P$, at its output. The output of multiplier 122 (FIG. 5) is connected to an integer generator 128, which produces the value of the whole number of wavelengths, $\lambda_P$. The outputs of multiplier 126 and integer generator 128 are applied to an adder circuit 130 and the output of adder circuit 130 is connected to a multiplier 132, where the value of the sum of the fractional phase, $\phi_P$, plus a whole number of wavelengths, $N_P$, is multiplied by the speed of light, c, divided by the frequency, $f_P$, of the P-code chip rate component without Doppler shift.

FIG. 8 depicts the distance, i.e., range, between satellite 104 and user 106 for the L-carrier component. A large number $N_L$ of whole wavelengths, $\lambda_L$, of the L-carrier component and a fractional phase, $\phi_L$, extend between satellite 104 and user 106. The fractional phase, $\phi_L$, is measured and the number of wavelengths, $N_L$, is determined by using the already derived pseudo range value, $\rho'_P$, which is accurate to less than one-sixth of a wavelength, $\lambda_L$, of the L-carrier component. The uncertainty, i.e., possible error, of the pseudo range, $\rho'_P$, range is depicted by the parentheses 111, meaning that it could fall anywhere within the parentheses; however, a relatively high signal-to-noise ratio of 230:1 is required. The value of the pseudo range, $\rho'_P$, is divided by the wavelength, $\lambda_L$, of the L-carrier component to produce a quotient comprising a whole number of wavelengths, $N_L$, plus a remainder. In general, the remainder is discarded and the whole number, which is treated as the whole number of wavelengths, $N_L$, is added to the fractional phase, $\phi_L$, to produce an accurate value of pseudo range, $\rho'_L$. If the remainder is larger than a given value depending of the signal-to-noise ratio, e.g., five-sixths of a wavelength, $\lambda_L$, for an amplitude signal-to-noise ratio of 10:1 and the fractional phase, $\phi_L$, is smaller than a given value, e.g., one-sixth of a wavelength, $\lambda_L$, for an amplitude signal-to-noise ratio of 10:1, the gross value of the Doppler range must either be disregarded or one must be added to the whole number of the quotient to produce the whole number of wavelengths, $N_L$, to be added to the fractional, $\phi_L$, to produce an accurate value of pseudo range, $\rho'_L$. With the assumed amplitude signal-to-noise ratio of 10:1, the pseudo range value, $\rho'_L$, can be determined to an accuracy of 2 mm or better.

Figure 9:
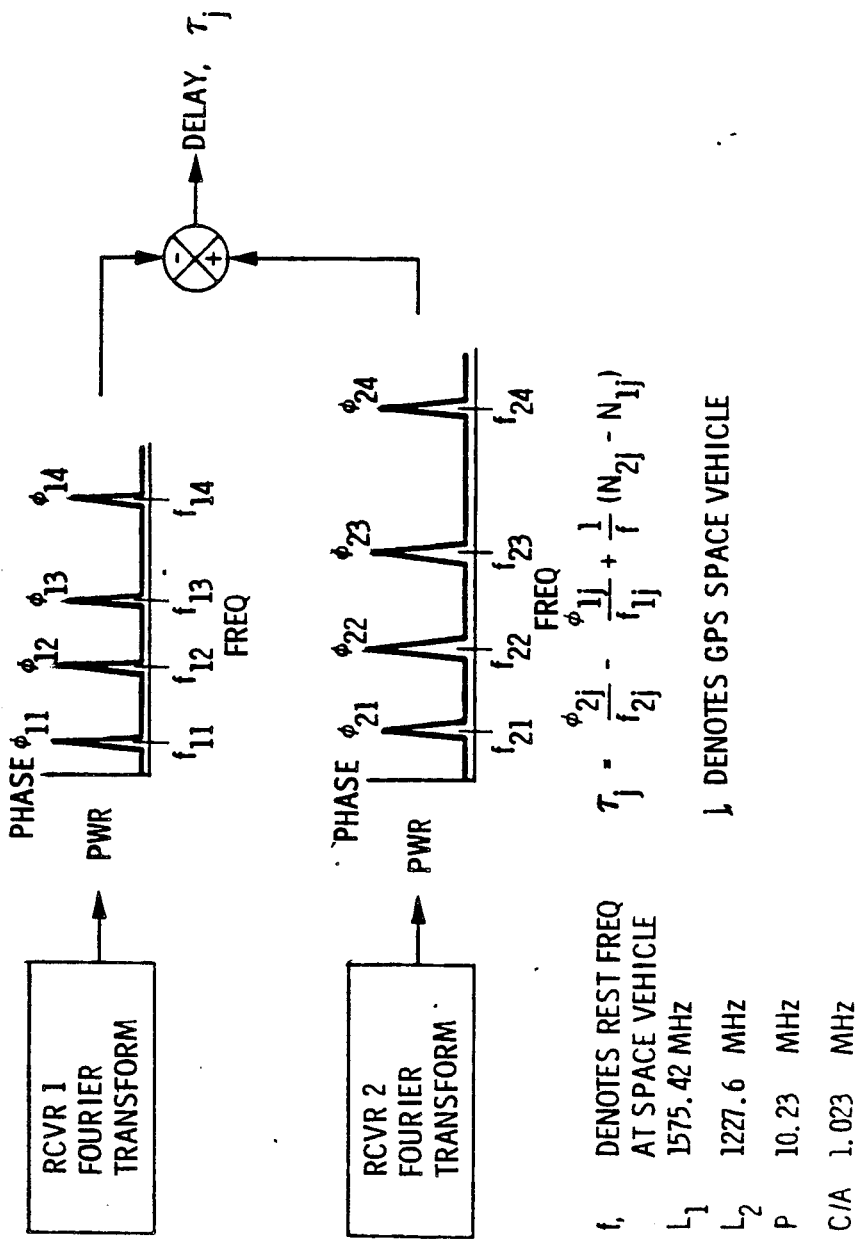
Figure 10:
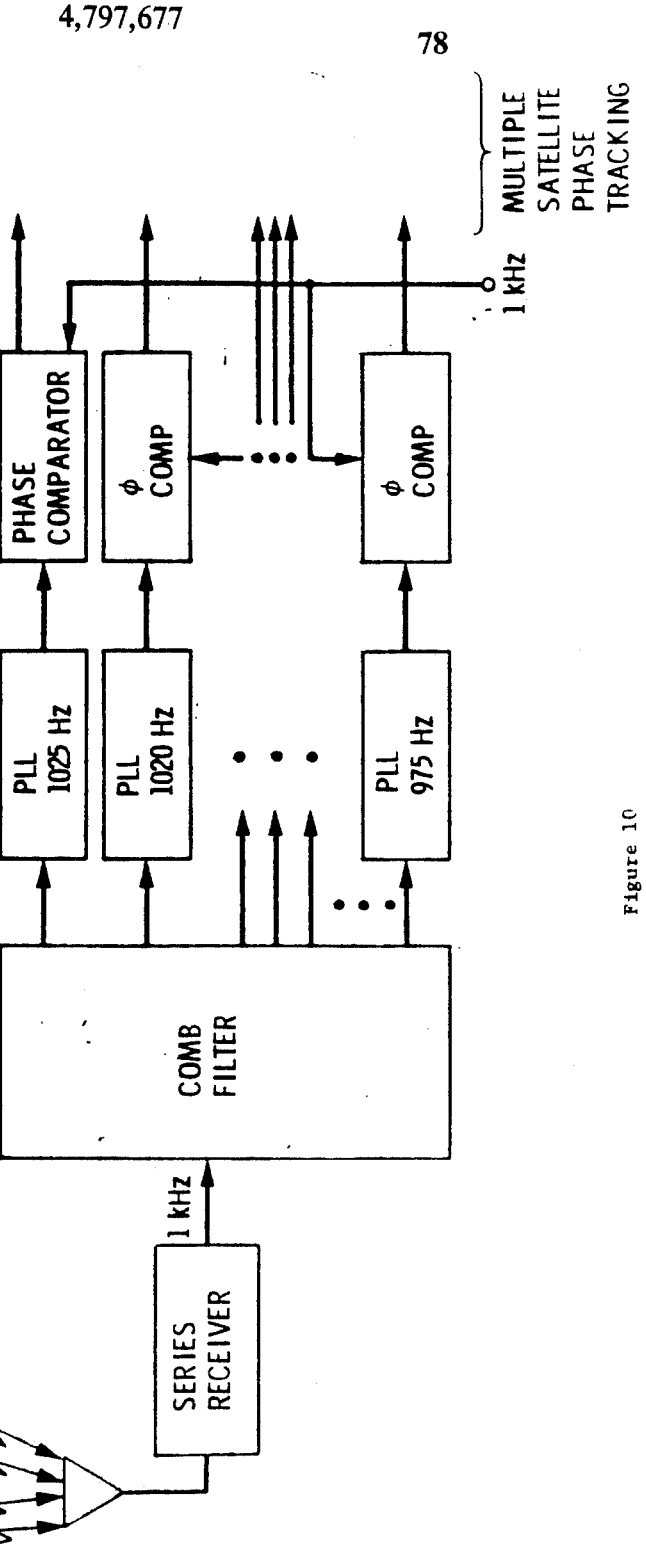

FIG. 9 shows signal processor 56 or 92, which performs the operations described in connection with FIG. 8. The output of mixer 54 or 90 (FIG. 3) is coupled to a phase detector 134 and a frequency counter 136. The phase of the L-carrier component relative to pulses occurring at one pulse per second generated by clock 41 is determined by a phase detector 134. The frequency of this component is determined by a frequency counter 136 at intervals of 1 PPS under the control of clock 41. Phase detector 134 and frequency counter 136 are connected to a multiplier 138, which produces the fractional phase, $\phi_L$, at its output. The output of multiplier 132 (FIG. 7) is connected to an integer generator 140, which produces the value of the whole number of wavelengths, $\lambda_P$. The output of multiplier 138 and integer generator 140 are applied to an adder circuit 142 and the output of adder circuit 142 is connected to a multiplier 144, where the value of the sum of the fractional phase, $\phi_L$, plus a whole number of wavelengths, $N_L$, is multiplied by the speed of light, C, divided by the frequency, $f_L$, of the L-carrier component without Doppler shift.

Referring once again to FIGS. 4, 6, and 8, the fractional phase, $\phi$, is measured accurately in each case, but there is an ambiguity, namely, the number of whole cycles, N, in addition to the fractional phase, $\phi$, that makes up the total path length between satellite 104 and user 106, i.e., the pseudo range, $\rho'$. In the case of each selected frequency component, the ambiguity is resolved by a measurement which, although not as accurate as the fractional phase measurement, is accurate to within less than about one-sixth of a wavelength of the selected component, thereby permitting precise determination of the number of wavelengths, N. Thus, in the described example, the ambiguity of the C/A chip rate code component is resolved by a Doppler position measurement, the ambiguity of the P-code chip rate component is resolved by using the pseudo range derived from the measurements in connection with the C/A chip rate component, and the ambiguity of the L carrier component is resolved by using the pseudo range derived from the measurement in connection with the P-code chip rate component.

By way of example, the described phase detectors could be so-called time interval counters comprising a clock pulse source (e.g., at a frequency of 5 MHz) that feeds pulses to a counter. The counter starts counting the clock pulses when a 1 PPS pulse from clock 41 is applied thereto and stops counting the clock pulses at the positive going zero crossing of a component whose phase is being detected. Similarly, the described frequency detectors could comprise a counter that counts the number of cycles of the selected component occurring during a given time period, e.g., one second, as determined by clock 41.

Figure 10:
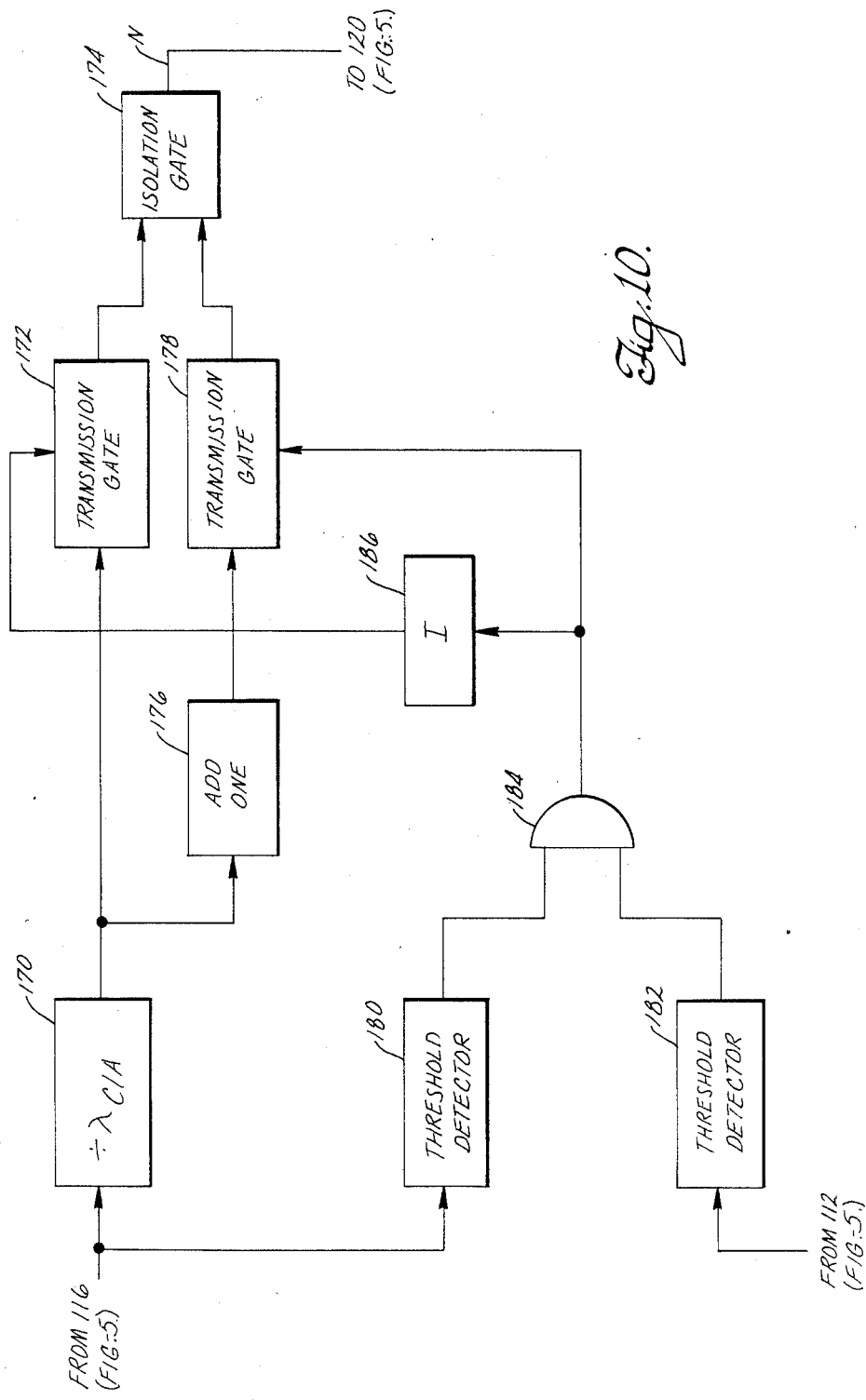
FIG. 10 is a schematic block diagram of the integer generator of FIGS. 5, 7, and 9.

FIG. 10 shows integer generator 118 in more detail. (Integer generators 128 and 140 are identical thereto.) A divider 170 to which the output of Doppler position finder 116 (multiplier 122 in FIG. 7, and multiplier 132 in FIG. 9) is connected divides the input value by the value of the wavelength, $\lambda_{C/A}$ ($\lambda_P$ in FIG. 7, and $\lambda_L$ in FIG. 9). The output of divider 170 is directly connected to adder circuit 120 (130 in FIG. 7, and 142 in FIG. 9) via a transmission gate 172 and an isolation gate 174. The output of divider 170 is also coupled through an add one circuit 176, a transmission gate 178, and isolation gate 174 to adder circuit 120 (132 in FIG. 7, and 142 in FIG. 9). The same signal applied to divider 170 is also also applied to a threshold detector 180. The output of multiplier 112 (126 in FIG. 7, and 138 in FIG. 9) is applied to a threshold detector 182. The outputs of threshold detectors 180 and 182 are coupled to the inputs of an AND gate 184. The output of AND gate 184 is directly connected to the control terminal of transmission gate 178 and is connected via an inverter 186 to the control terminal of transmission gate 172. Threshold detectors 180 and 182, AND gate 184, and inverter 186 are digital control circuits, while divider 170, add one circuit 176, transmission gate 172 and 178, and isolation gate 174 are analog or digital signal transmission circuits. Threshold detector 180 produces a high binary value when the signal applied to its input exceeds a threshold representative of a quotient with a remainder larger than five-sixth of a wavelength, $\lambda_{C/A}$. Threshold detector 182 produces a high binary value when the signal applied to its input is representative of a fractional phase less than one-sixth of a wavelength, $\lambda_{C/A}$. When both these conditions are met, AND gate 184 produces a high binary value, thereby opening transmission gate 178 to transmit therethrough a value representative of the whole number of the quotient from divider 170 plus one. Otherwise, transmission gate 172 couples a value representative of the whole number of the quotient from divider 170.

The signals and components in FIGS. 5, 7, and 9 could either be analog or digital. In the latter case, sequential timing circuits not shown would be provided. Alternatively, these operations could be carried out on a programmed digital computer.

In the case of the selected components in the $L_2$ band, which does not have a C/A code channel, the Doppler range is derived on the basis of the Doppler frequency shift of the P-code component to sufficient accuracy to permit the derivation of the whole number $N_P$ of wavelengths, $\lambda_P$, rather than, $\lambda_{C/A}$, as described in connection with FIGS. 4 and 5. This whole number of wavelengths, $N_P$, is added to the fractional phase, $\phi_P$, of the P-code chip rate component rather than the C/A code chip rate component which will require a higher signal-to-noise ratio to resolve one-sixth of a wavelength, $\lambda_P(5$ m), rather than the requirements to position to 50 m to resolve C/A code phase ambiguities.

In processing signals from a plurality of satellites with a directional antenna, only one set of signal processors such as processors 56, 66, 76, 92, and 102, need be provided because only the signal from one satellite at a time is being received. If an omnidirectional antenna is employed, then a separate set of signal processors must be provided for each of the satellites, e.g., four, in view at one time. The signals received from the different satellites are distinguishable from each other by their difference in frequency due to Doppler frequency shift. They could be separated from each other by, for example, by a comb filter or by Fourier transformation.

Figure 12:
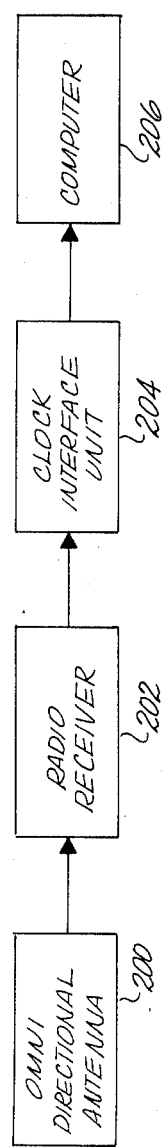
FIG. 12 is a schematic block diagram of an alternative embodiment of the invention.
Figure 13:
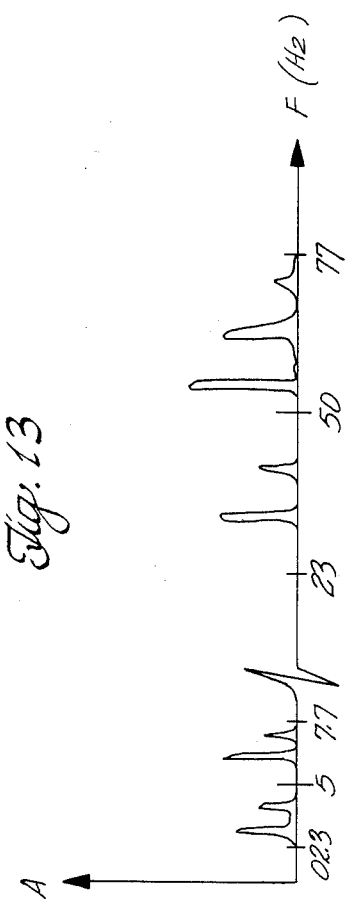
FIG. 13 is a diagram of the frequency spectrum of a typical signal coupled from the radio receiver to the clock interface unit of FIG. 12.

In the embodiment of the invention illustrated in FIG. 12, an omnidirectional antenna 200 intercepts the signal from all the satellites in view at one time. These signals contain frequency components that are Doppler shifted from each other by small amounts depending upon the satellite velocity, and thus position, relative to antenna 200. A Doppler shifted frequency component from at least three satellites uniquely and unambiguously defines the position of antenna 200 relative to the satellite. Antenna 200 is coupled to a radio receiver 202 to recover selected components of the satellite signals, as described in connection with FIG. 3. In this particular embodiment, only the P-code chip rate component and the C/A-code chip rate component are recovered. With respect to FIG. 3, frequency synthesizer 40 supplies a tone of 10.22995 MHz to mixer 64 and a tone of 1.022995 MHz to mixer 74. As a result, a number of P-code chip rate components corresponding to the individual satellites in view of antenna 200 are produced at different frequencies offset from a nominal frequency of 50 Hz by the Doppler phase shift applicable to the particular satellite position. These P-code components are distributed between 23 Hz and 77 Hz. A number of C/A-code chip rate components corresponding to the individual satellites in view of antenna 200 are also produced at different frequencies offset from a nominal frequency of 5 Hz by the Doppler phase shift applicable to the particular satellite position. The C/A-code components are distributed between 2.3 Hz and 7.7 Hz. FIG. 13 illustrates a typical frequency spectrum for the sub-audio signal produced by receiver 202 in terms of an amplitude (A) versus frequency (F).

The sub-audio output signal produced by receiver 202 is connected to a clock interface unit 204, where the sub-audio signal is sampled, in this embodiment, at a rate of 200 times per second, converted to digital form, and time tagged to identify the precise time at which each sample is taken. The time tagged digital samples are coupled to a digital computer 206 where the functions discussed below in connection with FIGS. 14 to 16, as well as others, are performed. Appendix A hereto is a listing of the data acquisition program for performing these functions.

Figure 14:
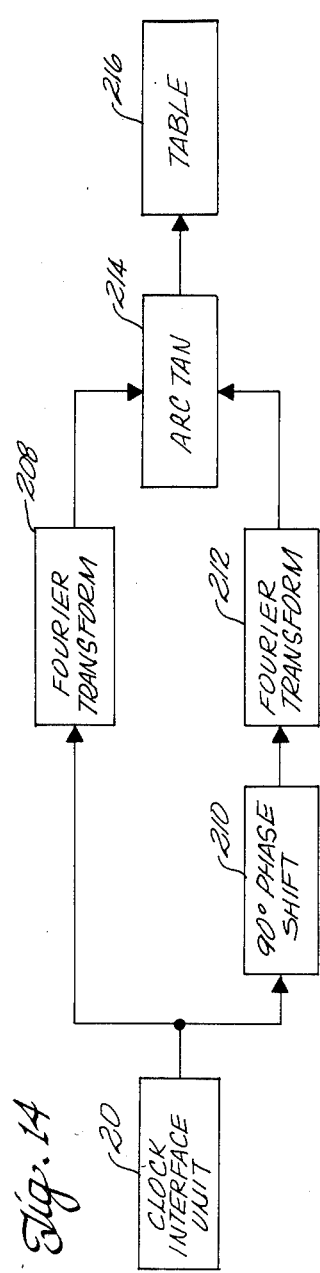
FIGS. 14, 15, and 16 are functional block diagrams depicting the operations performed by the computer in FIG. 12.

As depicted in FIG. 14, the digital samples are Fourier transformed in phase (block 208) and phase quadrature (blocks 210 and 212). In the preferred embodiment, the Fourier transform is repeatedly taken over a period of 10.24 seconds, using 2,048 digital samples (i.e. the in phase and quadrature phase. The result of each Fourier transform (i.e. the in-phase and quadrature phase) is a series of amplitude-frequency tables corresponding to the sampling periods. At the sampling rate of 200 times per second, the frequency resolution of the Fourier transforms is 0.05 Hz. Thus, each table tabulates coefficients representing amplitude in bins of 0.05 Hz width across the frequency band, i.e., 2.3 Hz to 77 Hz. Typically, the amplitude values vary from zero to about 300.

From publicly available data concerning the emphemerides of NAVSTAR satellites and the approximate longitude and latitude location of antenna 200, estimated Doppler frequency shifts for each satellite in view of antenna 200 are calculated by computer 206. In this way, the particular satellite from which each frequency component of the sub-audio signal originated is identified and tagged. As represented by block 214, the arc tangent of each coefficient of the in-phase tables divided by the coefficient of the quadrature phase tables is calculated to produce a phase value for each frequency band. As represented by block 216, the result is a set of tables of phase values and amplitudes in frequency bins of 0.05 Hz width across the frequency band. The Tables are time tagged to identify the time at which they are applicable and the frequency bins are tagged to identify the satellites they represent.

Figure 15:
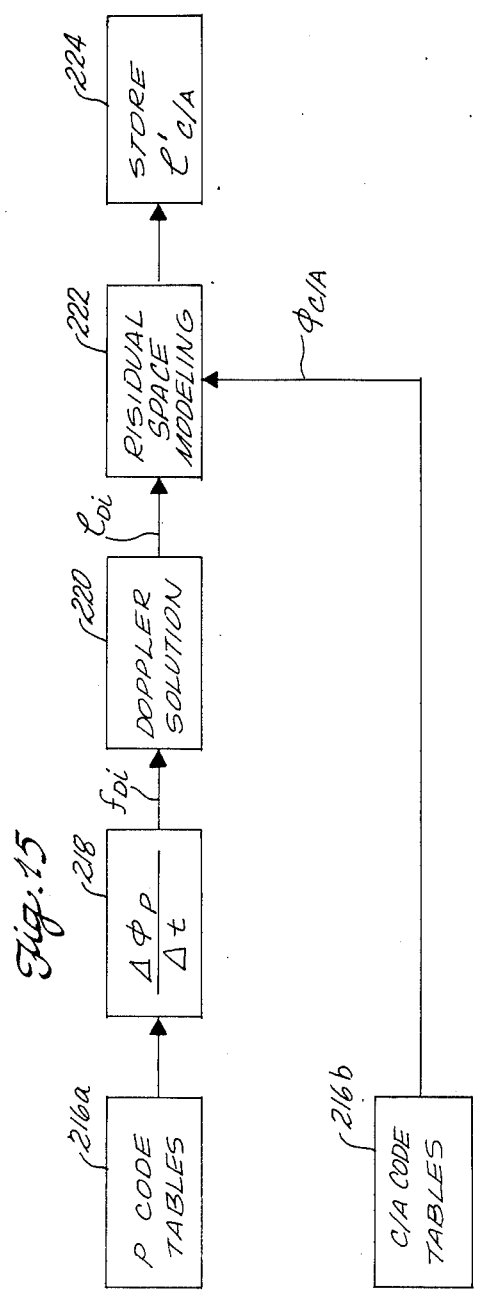
Figure 11:
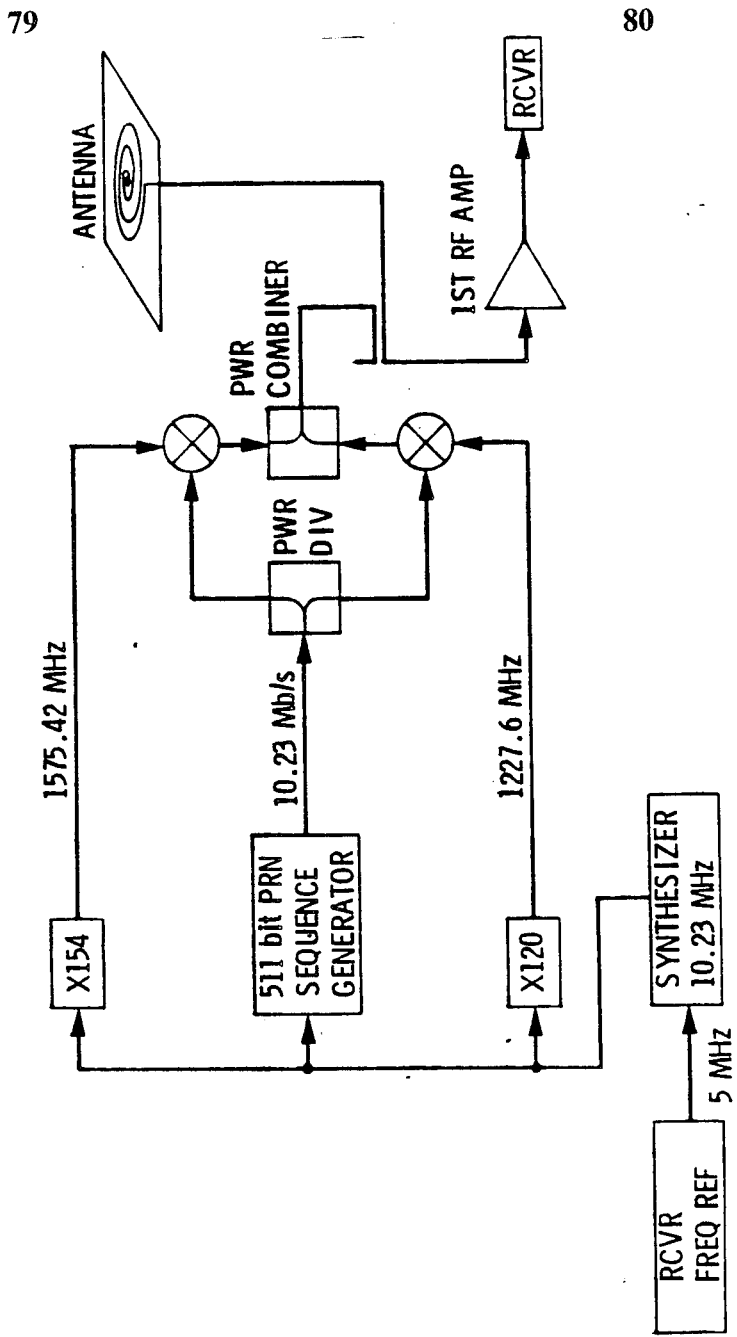
FIG. 11 is a schematic diagram of a differential positioning system incorporating principles of the invention.
Figure 12:
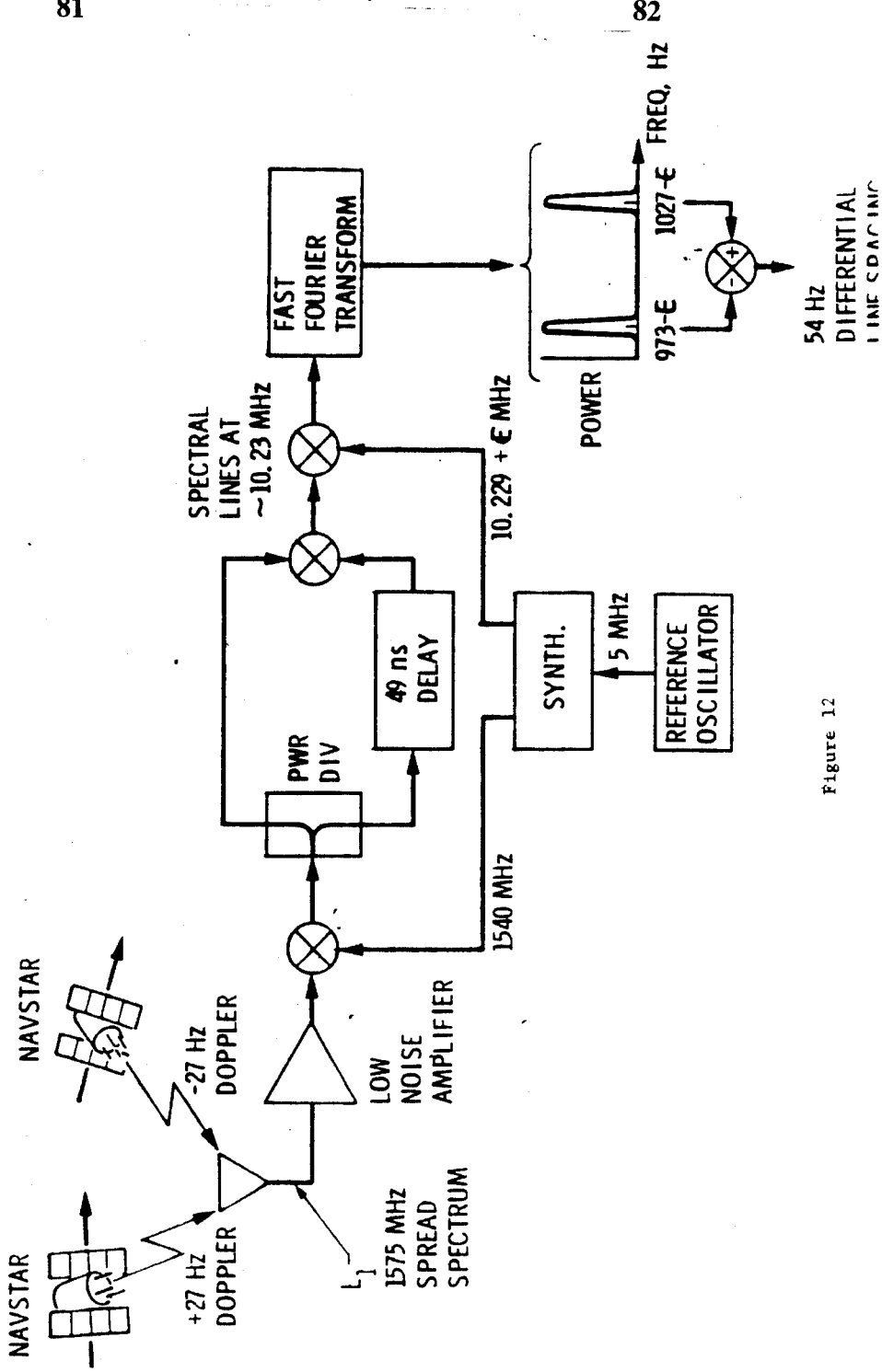
Figure 13:
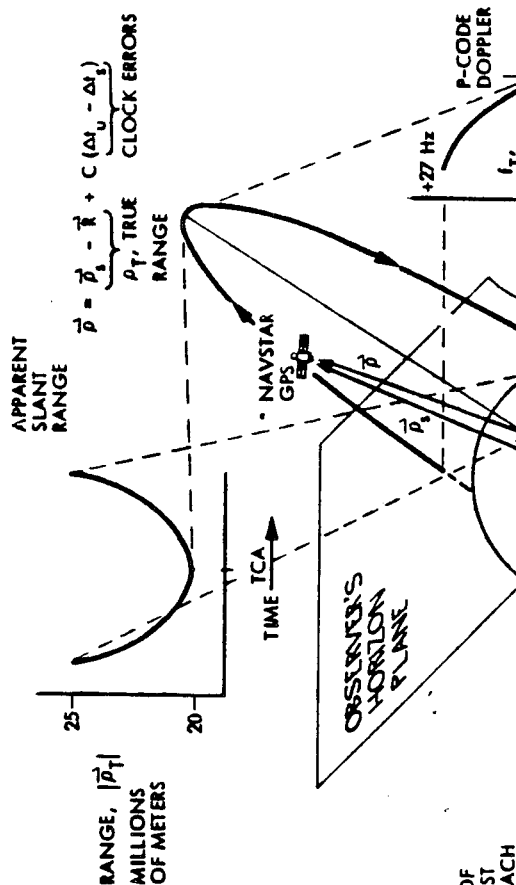
Figure 14:
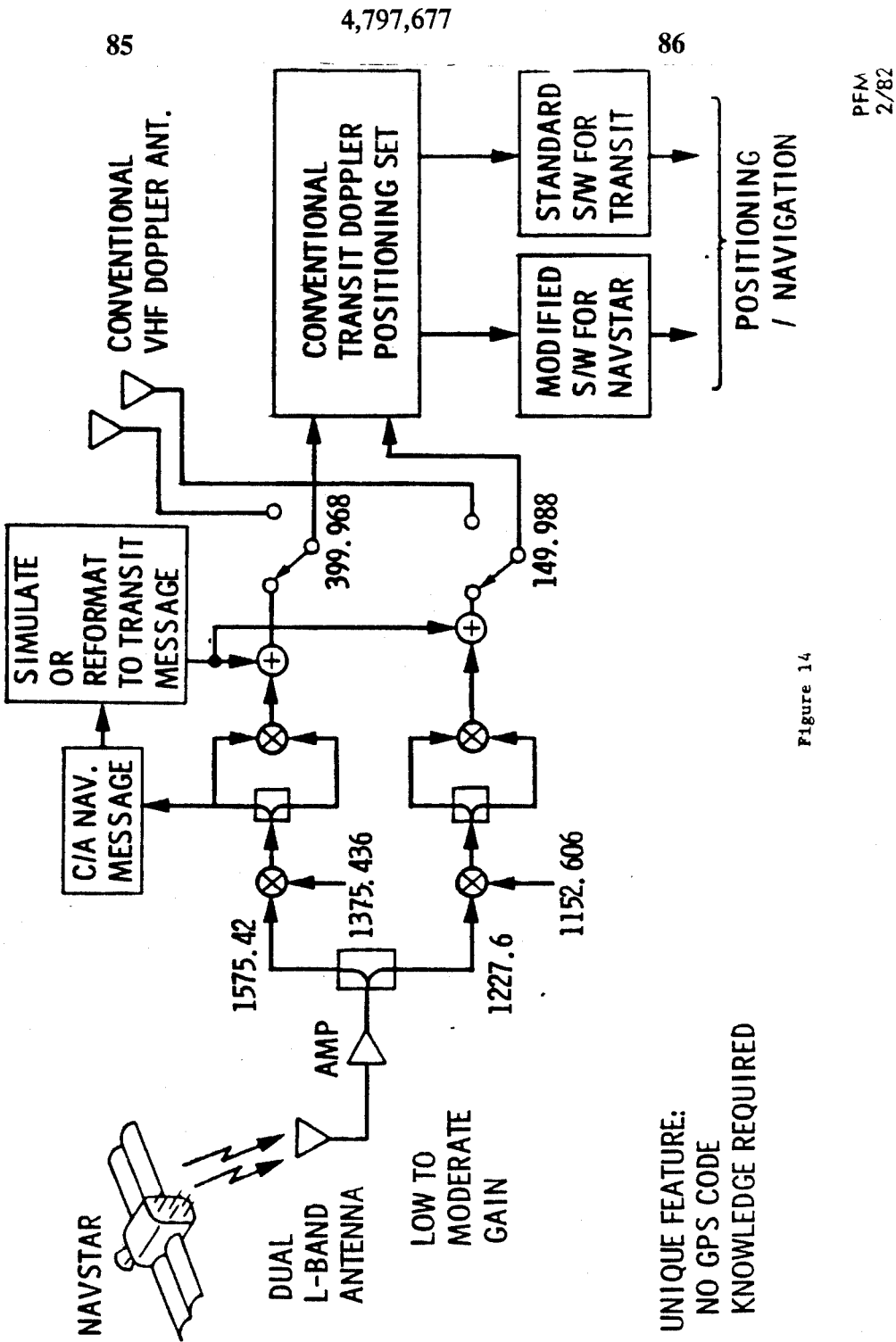
Figure 15:
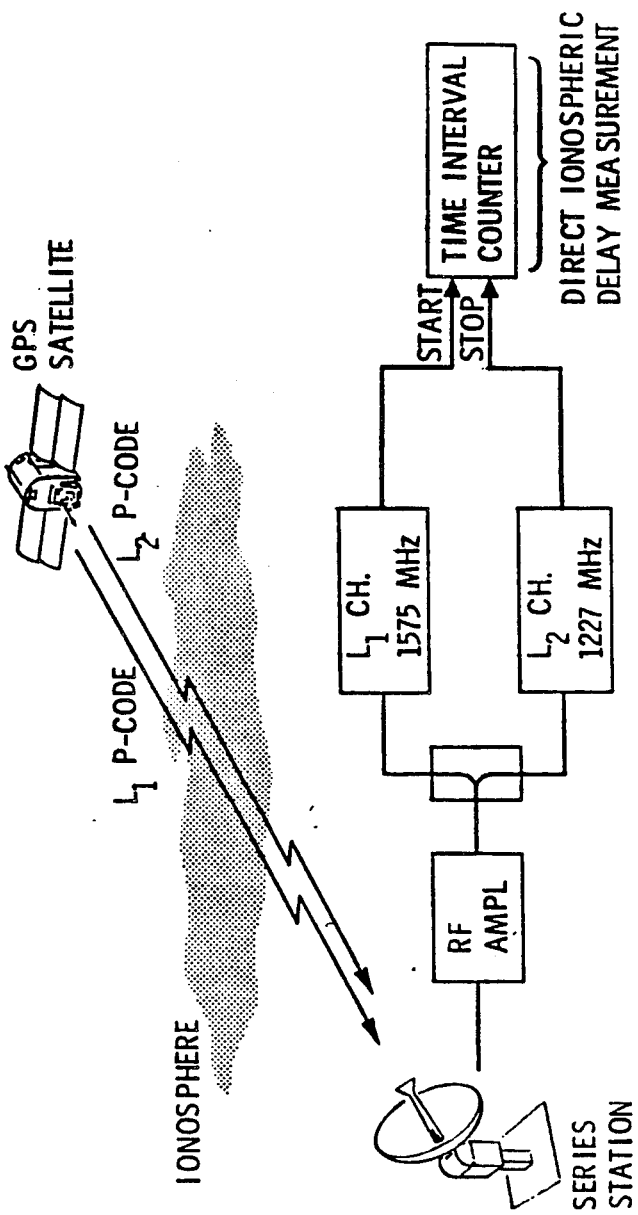
Figure 16:
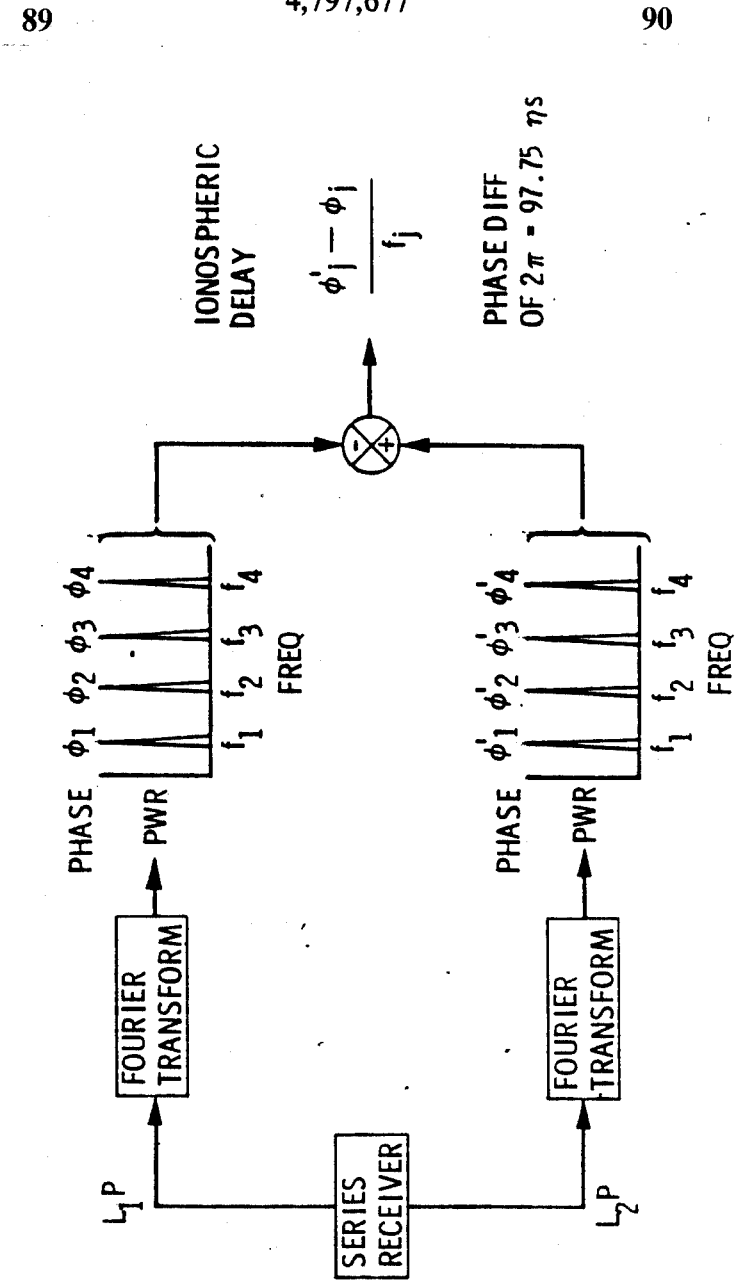

Reference is now made to FIG. 15 for a functional description of how pseudo range values are derived from the C/A-code component. A coarse range value for each satellite in view is derived from the phase values of the P-code tables represented by block 216a. The phase values of successive tables, e.g., 100 successive tables, corresponding to a particular satellite are sampled to derive the phase difference between samples. As represented by a block 218, the ratio of this phase difference, $\Delta\phi_P$, to the time interval, $\Delta t$, which is 10.24 seconds, represents the rate of change of phase, i.e., the Doppler frequency, $f_{Di}$, over a time interval of 10.24 seconds. (The subscript "i" identifies the particular satellite.) The Doppler frequencies from at least four satellites permit the determination of a Doppler solution of the range, $\rho_{Di}$, as represented by block 220, and an estimate of the relative frequency difference of the oscillators at the first and second user stations (FIG. 11). The phase values of the C/A-code tables, $\phi_{C/A}$, represented by block 216b, are processed with the Doppler range values, $\rho_{Di}$, utilizing residual space modeling techniques, as represented by block 222. This process resolves the ambiguity of the phase values, $\phi_{C/A}$, as a representation of pseudo range. To so resolve the ambiguity, the Doppler solution needs to be an accurate representation of the pseudo range to a fraction of a wave length of the C/A-code component, preferably one-third of a wave length or better. Typically, the Doppler solution would be accurate to about 100 meters or better. By means of the residual space modeling process, theoretical phase values are computed based upon the Doppler range values and compared with the phase values from table 216b; then the range values are repeatedly revised in an iterative process by least squares estimation until the difference between the theoretical phase values and the phase values from table 216b are minimized. The range values upon which these theoretical minimum difference phase values are based represent the pseudo range, $\rho'_{C/A}$, to substantially greater accuracy than the Doppler solution, typically of the order of 3 meters for a one thousand second data observation period in a differential positioning application of the type described below in connection with FIG. 11. As represented by block 224, the pseudo range values, $\rho'_{C/A}$, are stored for future reference.

Figure 16:
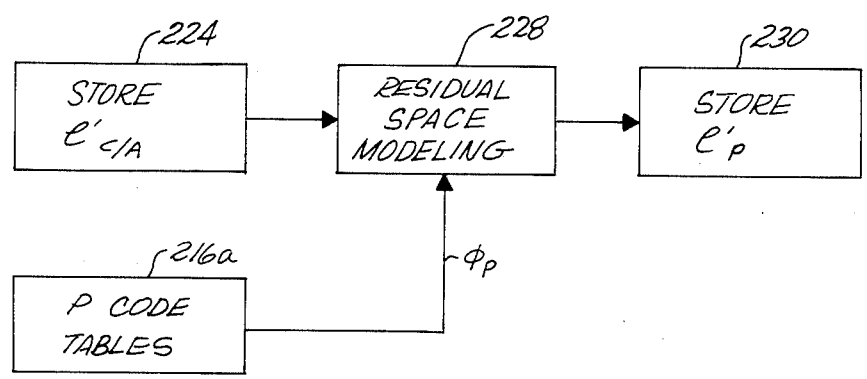
Figure 3:
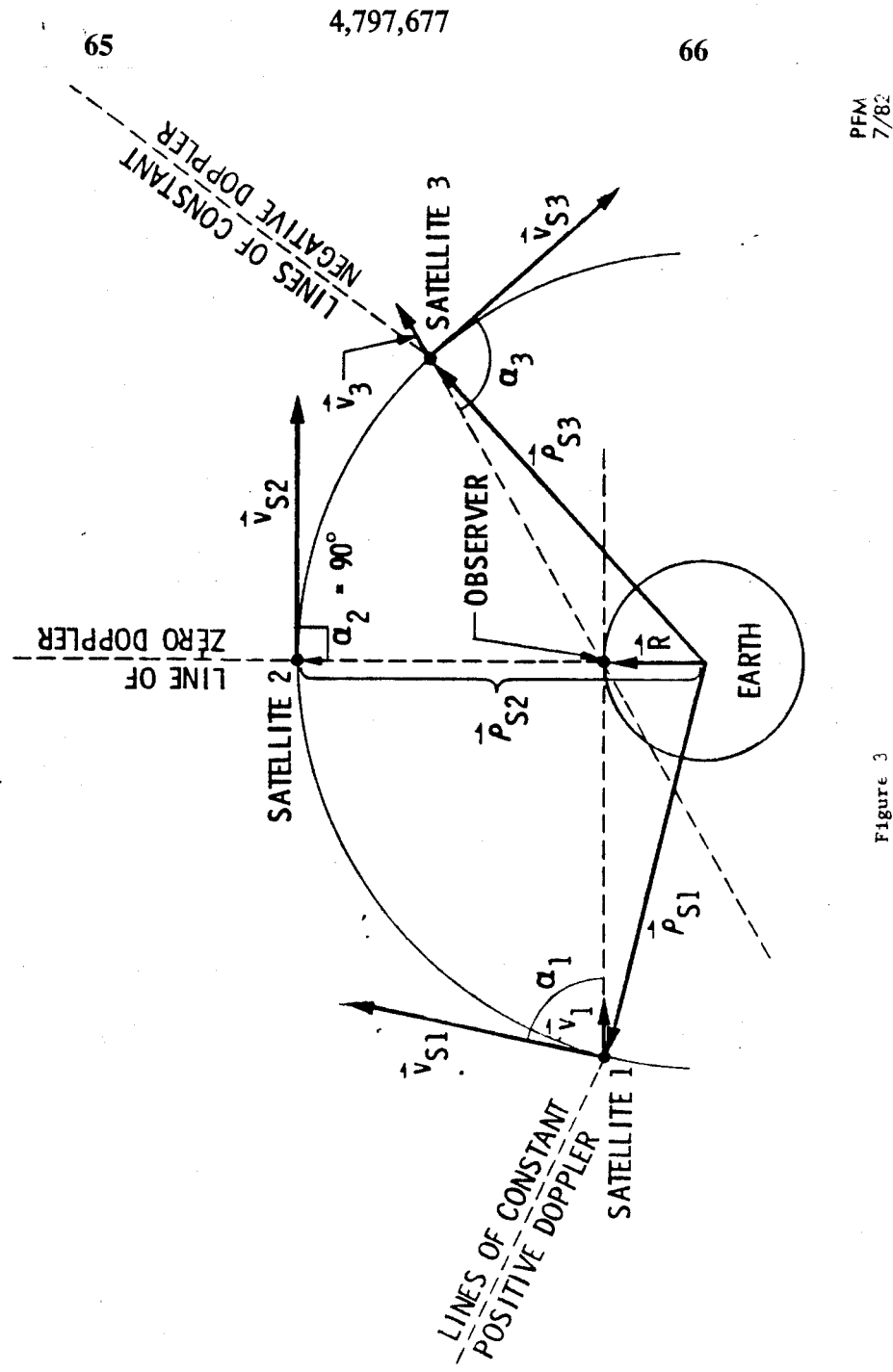

Reference is now made to FIG. 16 for a functional description of how pseudo range values are derived from the P-code component. The stored pseudo range values, $\rho'_{C/A}$, are used as coarse range values to resolve the ambiguity of the phase values, $\phi_P$, as a representation of pseudo range. The phase values of the P-code tables, $\phi_P$, represented by block 216a, are processed with the previously determined stored pseudo-range values, $\rho'_{C/A}$, represented by block 224, utilizing residual space modeling techniques, as represented by block 228. The accuracy of the pseudo range, $\rho'_{C/A}$, e.g., three meters, is sufficient to resolve the ambiguity of the phase values, $\phi_P$, as a representation of pseudo range, since the wave length of the P-code component is 29.3 meters. Again, as described in connection with FIG. 15, by means of the residual space modeling process, theoretical phase values are computed based upon the coarse range values, $\rho'_{C/A}$, and compared with the phase values, $\phi_P$, from table 216a; then the computed range values are repeatedly revised in an iterative process by least squares estimation until the difference between the theoretical phase values and the phase values from table 216a are minimized. The range values upon which these theoretical minimum difference phase values are based represent the pseudo range, $\rho'_P$, to substantially greater precision than the pseudo range values, $\rho'_{C/A}$, typically of the order of three centimeters for a one thousand second data observation period in a differential positioning application of the type described below in connection with FIG. 11. As represented by a block 230, the pseudo range values, $\rho'_P$, are stored for future reference.

FIG. 11 depicts an application of the invention to differential positioning, i.e., the positioning of a user relative to a stationary point in an earth-referenced coordinate system. A NAVSTAR satellite 150 transmits signals to first and second stationary earth stations. The range from satellite 150 to the first station is $\rho_1$ and to the second station is $\rho_2$. The unit vector from the first station to the satellite is $\hat{S}$. The baseline vector from the first station to the second station is $\vec{B}$, the quantity to be derived. At the first stationary station, the satellite signal is intercepted by an antenna 152, which is connected to a receiver and signal processor 154. Receiver and signal processor 154 derives frequency and time interval values for a selected component of the intercepted signal and sends this information to a remote computer 156 via a transmission line 158, although by time tagging these values the information can be delayed by any amount in its transmission. Similarly, at the second user station, the satellite signal is intercepted by an antenna 160, which is connected to a receiver and signal processor 162. Receiver and signal processor 162 derives frequency and time interval values for a selected component of the intercepted signal and sends this information to computer 156 via a transmission line 164. The known quantities $\hat{S}_{li}$, $\vec{R}$, and $\vec{\rho}_{Si}$ are also supplied to computer 156 which by means of a computer program, a listing of which is attached hereto as Appendix B, generates the baseline vector $\vec{B}$. For each of the four satellites in view, computer 156 solves the following equation:

$$\Delta\rho = -\hat{S}\cdot\vec{B} + \delta + c(\Delta T_{U1} - \Delta T_{U2}) + cT_{TM} = c/f(f_2T_2 - f_1T_1) + c/f(N_2 - N_1)$$

where $\Delta T_{U1}$ is the offset of the clock at the first station, $\Delta T_{U2}$ is the offset of the clock at the second station, $T_{TM}$ is the differential atmospheric transmission media error for the signals arriving at each station, $f_1$ is the measured frequency of the selected component at the first station, $T_1$ is the measured time interval of the selected component at the first station, $f_2$, is the measured frequency of the selected component at the second station, and $T_2$ is the measured time interval of the selected component of the second station, and $\delta = \Delta\rho - B^2/2\rho_1$. Receiver and signal processors 154 and 162 are constructed in the manner described in connection with FIG. 3 together with the frequency counters and phase detectors as described in connection with FIGS. 5, 7, and 9.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. One aspect of the invention is to derive pseudo range by Doppler positioning alone utilizing concurrent reception of modulated radio signals from plural satellites together with recovery of a component therefrom for comparison with the frequency of the transmitted component. Such comparison permits the position of the user to be determined as described above. Attached hereto as Appendix B is further description of the invention, the disclosure of which is fully incorporated into this application by reference.

```
type &ser ft.for
FTN4,Y
        PROGRAM SERFT
C       MAIN PROGRAM FOR SERIES BASELINE PROCESSING ON THE HP
C       REVISION:    11:55 AM  THU., 29  JULY, 1982     (820810.1031)
C          SEPARATE ROTATION TO/FROM LOCAL FRAME FROM ADOPTED STATION LOC
C          USE FIELD INFO(ROUND EARTH) FOR TOPOCENTRIC ANGLES
C             ADOPTED STATION LOCATION FOR RANGE/RANGE DIFF CALCULATION
C       COMPILE STEPS:
C          ::LDCFT =    :OF,SERFT
C                       :RU,FTN4,&SERFT,,-
C                       :RU,FTN4,&REPET,,-
C                       :RU,FTN4,&PHFIT,,-
C                       :RU,FTN4,&EPHEM,,-
C                       :RU,LOADR,LDSFT  =  LB
C                                           RE,%SERFT
C                                           RE,%REPET
C                                           RE,%PHFIT
C                                           RE,%EPHEM
C                  :                        /E
```

```
C     LETTER CODE FUNCTIONS:
C     A     ADJUST APRIORI DATA
C     B     BACKUP AND PROCESS BASELINE FROM LAST GRAND FIT START
C     C     CORRECT APRIORI WITH FITTED ESTIMATES
C     D
C     E     END FILE
C     F     FILE PROCESS
C     G
C     H     DISPLAY DATA HEADER
C     I     INIT FILES
C     J
C  -  K     CLOSE AND PURGE ANY SPOOL PRINT FILE
C     L     LOAD POINT
C     M     MODIFY MODE WORD
C             MODE BIT ASSIGNMENTS:
C             DECIMAL   OCTAL
C             4096      10000   DISPLAY TIMES IN RECORD
C             2048       4000   DISPLAY DIFFERENCING RESULTS
C             1024       2000   DISPLAY MINOR DET'S, XI'S, MXI'S
C              512       1000   DISPLAY MAJOR DET'S, XI'S, MXI'S
C              256        400   GDOP MONITOR--RMS=1.0NSEC
C              128        200   DISPLAY APRIORI CONTRIBUTIONS
C               64        100   DISPLAY TIMES, MEANS, RMS
C               32         40   DISPLAY X
C               16         20   DISPLAY X
C                8         10   BACKUP FOR MOVING WINDOW
C                4          4   SUPPRES DISPLAY CA FIT
C                2          2   SUPPRES DISPLAY P- FIT
C                1          1   APRIORI PASS THROUGH DATA FILE
C     N     NOTE CURRENT APRIORI VALUES
C     O
C     P     PRINT SPOOLED PRINT FILE
C     Q
C     R     READ ONE
C     S
C     T     PUT FORM FEED INTO PRINT FILE
C     U     UNIT TOGGEL
C     V
C     W
```

APPENDIX A

```
C     X
C     Y
C     Z
C
      IMPLICIT DOUBLE PRECISION (D)
      COMMON/CIO/IBUF(600),IDCB(144,5),LUN,MODE,IF,IT
      COMMON/APRI/NORDER,NORDMX,COFST,CRATE,CDRIFT,DCOFF,FLTRP,FLTRC,
     ,            IFRC,IFRP,A(6,6),E(6,6)
      COMMON/CPH/
     ,            IDAY(2),IMO(2),IYR(3),AIZ(2),IDOY(3),IHOD(3),
     ,            ASTA(6),DXJ(6),DYJ(6),DZJ(6),DTE(2),
     ,            IDS(2),DX(2),DY(2),DZ(2),DRNG(2),
     ,            ITC(3,3,2),RPC(19,3,2),ITP(3,3,2),RPP(19,3,2),
C     DAY OF YEAR IDOY IS MORE CONVENIENT THAN IDAYE, BUT EPHEM
C       IS NOT SETUP FOR IT YET.
     ,            DEQR,DRAD,DLEN
      COMMON/MAIN/IDAYE,IMOE,IYRE,AIZE,ASTAE,DXJE,DYJE,DZJE,
     ,            IHOE,IMOE,ISOE,DXE,DYE,DZE,DRNGE,DRDOTE,
     ,            DXDOTE,DYDOTE,DZDOTE
C     MAIN COMMON ALLOWS USE OF MORE RECENT EPHEMERIS FOR DX,DY,DZ

DIMENSION OBUF(600),ALAB(6),NA(10)
      DIMENSION IBUFR(16),NAME(3),ISMP(3),ITBUF(15)
      LOGICAL FIRST
      EQUIVALENCE (ISECU,IBUFR(6)),(ICR,IBUFR(7)),(NAME(1),IBUFR(3))
      DATA IBUFR/0,0,2HMY,2HSP,2HOL,0,36,12B,402B,0,0,0,0,0,0,0/
      DATA ISIZE/32/,ITYPE/3/,ISLU/0/,ISMP/2HSM,2HP ,2H  /
      DATA JOB/1H /,IBLANK/2H  /,ICNWD/1101B/,ITOP/6000B/
      DATA NOTED/0/
      DATA ALAB/4HAT  ,4HTO  ,4H    ,4H    ,4HBASE,4HLOCA/

CALL LGBUF(OBUF,600)
      NORDR=MIN0(NORDER,NORDMX-1)
      GO TO 111
```

```
C      HANDLE ANY KEYBOARD INPUT
 100   WRITE(1,101)
 101   FORMAT('C:')
       READ(1,102)JOB
 102   FORMAT(A1)

IF(JOB.NE.1HE) GO TO 110
C      EXIT THIS PROGRAM
C      CLOSE FILES USED
       DO 105 I=1,2
 105   CALL CLOSE(IDCB(1,I),IERR)
C      HANDLE SPOOL FILE IF IT EXISTS
       IF(ISLU.EQ.0)GO TO 109
       CALL EXEC(3,ICNWD,-1)
       CALL EXEC(23,ISMP,1,ISLU)
       CALL EXEC(23,ISMP,4,ISLU)
 109   STOP

110   IF(JOB.NE.1HI) GO TO 120
C      GET NEW PAIR OF FILES FOR BASELINE
 111   CALL FILE
       CALL ONE(1)
       CALL ONE(2)
       DEQR=DXJ(1)*DXJ(1)+DYJ(1)*DYJ(1)
       DRAD=DSQRT(DEQR+DZJ(1)*DZJ(1))
       DEQR=DSQRT(DEQR)
       WRITE(1,271)IF,IT
       CALL REPET(2,1)
       GO TO 125

120   IF(JOB.NE.1HL) GO TO 130
C      REWIND TO START OF FILES
       IYR(2)=-2
       IYR(1)=-2
       IDOY(3)=-1
       IDOY(2)=-2
       IDOY(1)=-2
 125   CALL RWNDF(IDCB(1,1))
       CALL RWNDF(IDCB(1,2))
C      NOTE FILE POSITIONS FOR REPOSITION
       CALL LOCF(IDCB(1,1),IERR,IREL1G,IRB1G,IOFF1G)
       CALL LOCF(IDCB(1,2),IERR,IREL2G,IRB2G,IOFF2G)
       GO TO 9000

130   IF(JOB.NE.1HR) GO TO 140
C      READ ONE RECORD FROM THE FILE NOTED
       WRITE(1,131)
 131   FORMAT(' WHICH: 1=AT, 2=TO')
       READ(1,132)ISTA
 132   FORMAT(I1)
       CALL ONE(ISTA)
       GO TO 9000

140   IF(JOB.NE.1HH) GO TO 150
C      DISPLAY CURRENT ARRAYS
       CALL REPET(2,1)
       GO TO 9000

150   IF(JOB.NE.1HU) GO TO 160
C      TOGGEL OUTPUT UNIT
       IF(LUN.NE.1) GO TO 195
C      WE WANT A SPOOLED PRINTER OUTPUT
       IF(ISLU.NE.0)GO TO 158
C      NO SPOOL FILE AROUND--MAKE ONE
 151   CALL CREAT(IDCB(1,5),IERR,NAME,ISIZE,ITYPE,ISECU,ICR)
       IF(IERR.GE.0) GO TO 155
       IF(IERR.EQ.-2) GO TO 153
C      CAN'T GET THE SPOOL FILE
       WRITE(1,152)IERR
 152   FORMAT('ERROR ',I4,' GETTING SPOOL FILE')
       GO TO 9000
C      DUPLICATE OF THIS FILE--TRY ANOTHER NAME
 153   WRITE(1,154)NAME
 154   FORMAT(3A2,' ALREADY ON DISK')
       NAME(3)=NAME(3)+1
       GO TO 151
```

```
C       PREP FILE FOR SMP--SPOOLER
155     CALL CLOSE(IDCB(1,5))
        CALL SPOPN(IBUFR,ISLU)
        IF(ISLU.GT.0)GO TO 158
        WRITE(1,156)ISLU
156     FORMAT('ERROR ',I3,' CALLING SPOOLER')
        ISLU=0
        CALL PURGE(IDCB(1,5),IERR,NAME,ISECU,ICR)
        GO TO 9000
158     LUN=ISLU
        ICNWD=11008+ISLU
        WRITE(1,159)LUN
159     FORMAT(' OUTPUT NOW TO ',I2)
        GO TO 9000

160     IF(JOB.NE.1HK) GO TO 190
C       K=> CLOSE AND DISCARD SPOOLED OUTPUT
        CALL EXEC(23,ISMP,4,ISLU)
        GO TO 194

190     IF(JOB.NE.1HP)GO TO 200

C       P=> PRINT SPOOLED OUTPUT NOW
        IF(ISLU.EQ.0)GO TO 9000
        CALL EXEC(3,ICNWD,-1)
        CALL EXEC(23,ISMP,5,ISLU,0,10)
        CALL EXEC(23,ISMP,4,ISLU)
194     ISLU=0
195     ICNWD=11018
        LUN=1
        WRITE(1,159)LUN
        GO TO 9000
200     IF(JOB.NE.1HB)GO TO 201
C       B=> BACKUP TO START OF LAST GRAND FIT AND PROCESS FILE
        CALL APOSN(IDCB(1,1),IERR,IREL1G,IRB1G,IOFF1G)
        CALL APOSN(IDCB(1,2),IERR,IREL2G,IRB2G,IOFF2G)
        IDOY(2)=-2
        IDOY(1)=-2
        GO TO 204
201     IF(JOB.NE.1HF) GO TO 300
C       F => PROCESS THIS DATA PAIR FOR A BASELINE
C       REMEMBER THIS POINT FOR RESTART
        CALL LOCF(IDCB(1,1),IERR,IREL1G,IRB1G,IOFF1G)
        CALL LOCF(IDCB(1,2),IERR,IREL2G,IRB2G,IOFF2G)
C       RESET START UP LOGIC
204     FIRST=.TRUE.
        IYR(1)=-2
        IYR(2)=-2
        IDOY(3)=-1
C       RESET INTERIM DETECTOR LOGIC
        NN=0
        DO 205 I=1,10
205     NA(I)=0
        NOTED=0
C
C       LOOP ON PAIRED STATION PHASE OBSERVATIONS
210     CALL PAIR(IDATA)
        IF(IDATA.LT.0) GO TO 290
C       HANDLE 2 STAGE MOVING WINDOW POSITION SITUATION
        NOTED=NOTED+1
        IF(NOTED.NE.2)GO TO 212
C       NOTE FILE POSITIONS FOR MOVING WINDOW REPOSITION
        CALL POSNT(IDCB(1,1),IERR,-1)
        CALL POSNT(IDCB(1,2),IERR,-1)
        CALL LOCF(IDCB(1,1),IERR,IREL1,IRB1,IOFF1)
        CALL LOCF(IDCB(1,2),IERR,IREL2,IRB2,IOFF2)
        CALL POSNT(IDCB(1,1),IERR,+1)
        CALL POSNT(IDCB(1,2),IERR,+1)
C       CHECK THAT REFERENCE EPOCH NOT CHANGED
212     IF(IYR(1).NE.IYRE)GO TO 213
        IF(IMO(1).NE.IMOE)GO TO 213
        IF(IDAY(1).NE.IDAYE)GO TO 213
        IF(AIZ(1).NE.AIZE)GO TO 213
        GO TO 214
```

```
213   IH0E=ITC(1,1,1)
      IM0E=ITC(2,1,1)
      IS0E=ITC(3,1,1)
      IDAYE=IDAY(1)
      IM0E=IMO(1)
      IYRE=IYR(1)
      AIZE=AIZ(1)
      CALL EPHIN
C     ADOPT NEW STATION PARAMETERS IF FIRST PASS
214   IF(FIRST)GO TO 225
C     CHECK THAT NO MAJOR PARAMETERS HAVE CHANGED
      DO 215,I=1,2
      IF(ASTA(I).NE.ASTA(I+2)) GO TO 220
      IF(DXJ(I).NE.DXJ(I+2)) GO TO 220
      IF(DYJ(I).NE.DYJ(I+2)) GO TO 220
      IF(DZJ(I).NE.DZJ(I+2)) GO TO 220
2.5   CONTINUE
C     ALSO OBSERVATION GAP TO BE LESS THAN 3 HOURS LONG
      INTRVL=(IDOY(1)-IDOYL)*24+IHOD(1)-IHODL
      IF(INTRVL.GT.3)GO TO 220
C     ALL MAJOR PARAMETERS ARE UNCHANGED--CONTINUE WITH PHASES
      GO TO 275
C     SPOTTED A NEW GRAND FIT INTERVAL
C        SHOW A BASELINE GRAND FIT AND LET HIM DO SOMETHING
C        BACKUP TO PRESERVE DATA FOR NEXT PASS
220   CALL POSNT(IDCB(1,1),IERR,-1)
      CALL POSNT(IDCB(1,2),IERR,-1)
      CALL PHFIT(2)
C        ALLOW APRIORI PASS OR PIPELINE SCAN OF DATA
      IF(IAND(MODE,1).EQ.1)GO TO 204
      GO TO 9000
C     NEW GRAND FIT SETUP
225   FIRST=.FALSE.
C     ADOPT STATIONS FOR BASELINE FIT
      IDOY(3)=IDOY(1)
      IHOD(3)=IHOD(1)
      IYR(3)=IYR(1)
      ASTA(3)=ASTA(1)
      ASTAE=ASTA(1)
      ASTA(4)=ASTA(2)
      DXJ(3)=DXJ(1)
      DXJ(4)=DXJ(2)
      DYJ(3)=DYJ(1)
      DYJ(4)=DYJ(2)
      DZJ(3)=DZJ(1)
      DZJ(4)=DZJ(2)
      DEQR=DXJ(1)*DXJ(1)+DYJ(1)*DYJ(1)
      DRAD=DSQRT(DEQR+DZJ(1)*DZJ(1))
      DEQR=DSQRT(DEQR)
C     SHOW WHAT WE HAVE NOW
270   CALL FTIME(ITBUF)
      IF(IAND(MODE,17300B).NE.0)CALL EXEC(3,ICNWD,-1)
      WRITE(LUN,271)IF,IT,ITBUF
271   FORMAT('SERS',A2,' TOWARD SERS',A2' RUN ',15A2)
      CALL REPET(2,LUN)
275   CALL SUMPH(DN3)
      IF(DN3.EQ.0D0)GO TO 210
      IDOYL=IDOY(1)
      IHODL=IHOD(1)
C     DO AN INTERIM BASELINE WHEN THERE ARE FIVE COMPONENTS MEASURED
      IF(NA(IDS(1)).EQ.0)NN=NN+1
      NA(IDS(1))=NA(IDS(1))+1
      IF(NN.LT.NORDR) GO TO 210
      CALL PHFIT(1)
      NN=0
      DO 280 I=1,10
280   NA(I)=0
      NOTED=0
      IF(IAND(MODE,8).EQ.0)GO TO 210
C     BACKUP FOR MOVING WINDOW THROUGH SATELLITE OBSERVATIONS
      CALL APOSN(IDCB(1,1),IERR,IREL1,IRB1,IOFF1)
      CALL APOSN(IDCB(1,2),IERR,IREL2,IRB2,IOFF2)
      IYR(1)=-2
      IYR(2)=-2
      GO TO 210
```

```
      290 CALL PHFIT(2)
          NN=0
          DO 295 I=1,10
      295 NA(I)=10
          WRITE(1,291)
      291 FORMAT(' END OF DATA')
          GO TO 9000
      300 IF(JOB.NE.1HA) GO TO 400
C         MODIFY SOME APRIORI DATA
      301 WRITE(1,302)
      302 FORMAT('MODIFY INDIVIDUAL CONSTANTS?')
          READ(1,303)IY
      303 FORMAT(A1)
          IF(IY.NE.1HY) GO TO 304
C         ALLOW 2 TO 6 PARAMETER FIT
          DAPR=NORDER
          CALL REVIS(4HORDR,DAPR)
          IF((DAPR.LE.NORDMX).AND.(DAPR.GT.2))NORDER=DAPR
          NORDR=MIN0(NORDER,NORDMX-1)
C         RELATIVE CLOCK BIAS AT START(UNITS: NANOSECONDS)
          DAPR=COFST
          CALL REVIS(4HCBIS,DAPR)
          COFST=DAPR
          DAPR=CRATE*1.0E11
          CALL REVIS(4HCRAT,DAPR)
          CRATE=DAPR*1.0D-11
          DAPR=CDRIFT*1.0E14
          CALL REVIS(4HCDFT,DAPR)
          CDRIFT=DAPR*1.0D-14
          CALL REVIS(4HCOFF,DCOFF)
C         C/A CHANNEL FILTER (UNITS: MICROSEC/HZ-DOPPLER)
          DFLTR=FLTRC*1.0E-3
          CALL REVIS(4HCFLT,DFLTR)
          FLTRC=DFLTR*1.0D+3
C         P- CODE FILTER (UNITS: MICROSEC/HZ-DOPPLER)
          DFLTR=FLTRP*1.0E-3
          CALL REVIS(4HPFLT,DFLTR)
          FLTRP=DFLTR*1.0D+3
C         ABSOLUTE ORIGIN OF BASELINE(UNITS:METERS)
          CALL REPET(2,1)
      304 WRITE(1,305)
      305 FORMAT('MODIFY ABSOLUTE ORIGIN OF BASELINE?(Y,N)')
          READ(1,303)IY
          IF(IY.NE.1HY)GO TO 308
          WRITE(1,306)
      306 FORMAT('ADOPT "AT" POSITION?')
          READ(1,303)IY
          IF(IY.NE.1HY) GO TO 307
          DXJE=DXJ(1)
          DYJE=DYJ(1)
          DZJE=DZJ(1)
      307 CALL REVIS(4HX-A ,DXJE)
          CALL REVIS(4HY-A ,DYJE)
          CALL REVIS(4HZ-A ,DZJE)
          CALL REPET(2,1)
      308 WRITE(1,309)
      309 FORMAT('MODIFY WGS-72 BASELINE COMPONENTS?(Y,N)')
          READ(1,303)IY
          IF(IY.NE.1HY)GO TO 310
          CALL REVIS(4HX-W ,DXJ(5))
          CALL REVIS(4HY-W ,DYJ(5))
          CALL REVIS(4HZ-W ,DZJ(5))
          DLEN=DSQRT(DXJ(5)*DXJ(5)+DYJ(5)*DYJ(5)+DZJ(5)*DZJ(5))
C         ROTATE TO LOCAL FRAME
          CALL REPET(1,0)
          CALL REPET(2,1)
      310 WRITE(1,311)
      311 FORMAT('REVISE LOCAL FRAME COMPONENTS?(Y,N)')
          READ(1,303)IY
          IF(IY.NE.1HY) GO TO 9000
          CALL REVIS(4HL-E ,DXJ(6))
          CALL REVIS(4HL-N ,DYJ(6))
          CALL REVIS(4HL-U ,DZJ(6))
C         ROTATE TO WGS-72 FRAME
          CALL REPET(3,0)
          DLEN=DSQRT(DXJ(5)*DXJ(5)+DYJ(5)*DYJ(5)+DZJ(5)*DZJ(5))
```

```
 320  CALL REPET(2,1)
      GO TO 9000

400  IF(JOB.NE.1HM) GO TO 500
C     M=>PUT IN A NEW MODE NUMBER
      WRITE(1,401)MODE
 401  FORMAT(
     ./'10000 DISPLAY TIMES IN RECORD'/,
     .' 4000 DISPLAY DIFFERENCING RESULTS'/,
     .' 2000 DISPLAY MINOR DET, XI, MXI'/,
     .' 1000 DISPLAY MAJOR DET, XI, MXI'/,
     .'  400 GDOP MONITOR--RMS=1.0NSEC'/,
     .'  200 DISPLAY APRIORI CONTRIBUTIONS'/,
     .'  100 DISPLAY TIMES, MEANS, RMS'/,
     .'   40 DISPLAY X'/,
     .'   20 DISPLAY X'/,
     .'   10 BACKUP FOR MOVING WINDOW'/,
     .'    4 SUPPRES DISPLAY CA FIT'/,
     .'    2 SUPPRES DISPLAY P- FIT'/,
     .'    1 APRIORI PASS THROUGH DATA FILE'/,
     .' MODE: ',O5)
      READ(1,402)MODE
 402  FORMAT(O5)
      WRITE(1,403)MODE
 403  FORMAT(' NOW: ',O5)
      GO TO 9000
 500  IF(JOB.NE.1HC) GO TO 600
C     CORRECT APRIORI WITH FITTED ESTIMATES OR SOME REFERNCE DATA
      WRITE(1,501)
 501  FORMAT('APRIORI CORRECTOR(D-STATION DIFFERENCE,Z-ZERO,'
     ,'L-LAST NOTED,'//'CA-1,3,5  P-2,4,6  ROUND,GRAND,AVERAGE')
      READ(1,502)IC
 502  FORMAT(A1)
      IF(IC.NE.1HD)GO TO 505
C     COMPUTE APRIORI BASELINE FROM APRIORI POSITIONS
      DXJ(5)=DXJ(2)-DXJ(1)
      DYJ(5)=DYJ(2)-DYJ(1)
      DZJ(5)=DZJ(2)-DZJ(1)
      GO TO 530
 505  IF(IC.NE.1HZ)GO TO 510
      COFST=0.0
      CRATE=0.0
      CDRIFT=0.0
      DXJ(5)=0D0
      DYJ(5)=0D0
      DZJ(5)=0D0
      DLEN=0D0
      DXJ(6)=0D0
      DYJ(6)=0D0
      DZJ(6)=0D0
      GO TO 9000
 510  IF(IC.NE.1HL)GO TO 520
      GO TO(511,512,513,514,515,516),NORDER
 516  CDRIFT=A3
 515  CRATE=A2
 514  COFST=A1
 513  DZJ(5)=DA5
 512  DYJ(5)=DA4
 511  DXJ(5)=DA3
      GO TO 530
 520  IF((IC.LT.1H1).OR.(IC.GT.1H6))GO TO 540
      IC=(IC-1H0)/256
      GO TO(521,522,523,524,525,526),NORDER
 526  CDRIFT=CDRIFT+A(6,IC)*1.0E-11
 525  CRATE=CRATE+A(5,IC)*1.0E-11
 524  COFST=COFST+A(4,IC)
 523  DZJ(5)=DZJ(5)+A(3,IC)
 522  DYJ(5)=DYJ(5)+A(2,IC)
 521  DXJ(5)=DXJ(5)+A(1,IC)
 530  DLEN=DSQRT(DXJ(5)*DXJ(5)+DYJ(5)*DYJ(5)+DZJ(5)*DZJ(5))
C     ROTATE TO LOCAL FRAME
      CALL REPET(1,0)
      CALL REPET(2,1)
      GO TO 9000
 540  WRITE(1,541)IC
 541  FORMAT('?: ',A1)
      GO TO 9000
```

```
      600 IF(JOB.NE.1HN) GO TO 650
C     NOTE CURRENT APRIORI VALUES
          GO TO(601,602,603,604,605,606),NORDER
      606 A3=CDRIFT
      605 A2=CRATE
      604 A1=COFST
      603 DA5=DZJ(5)
      602 DA4=DYJ(5)
      601 DA3=DXJ(5)
          GO TO 9000
      650 IF(JOB.NE.1HT) GO TO 2500
C     PUT A FORMFEED INTO PRINT FILE
          IF(LUN.NE.1)CALL EXEC(3,ICNWD,-1)
          GO TO 9000

2500 CONTINUE

8990 WRITE(1,8991)JOB
     8991 FORMAT(' ?JOB: ',A2)

9000 JOB=IBLANK
          GO TO 100

END
          END$
:
B>
B>
  type &phftit.for

FTN4,Y
C*****ROUTINE TO DIFFERENCE PHASES AND FILL ARRAYS FOR FITING BASELINE
C       REVISION:    5:13 PM   MON.,  19  APR., 1982     (820804..1103)
C                    TO TREAT EACH SET OF 19 PHASE MEASUREMENTS AS A NORMAL PT
        SUBROUTINE SUMPH(DN3)
C
C     UNITS USED IN THIS AREA ARE NANOSECONDS AND METERS WITH DISPLAY
C       INTENDED TO .001 NANO AND M
C
C     THE MODEL TO FIT THE RESIDUAL DELAY IS A 3 COMPONENT VECTOR
C       IN THE WGS-72 COORDINATES SYSTEM( IN METERS) AND TIMING SYSTEM
C       BIAS( IN NANOSECONDS) AND A RATE( UNITS OF 1.0E-11 DF OVER F)
        IMPLICIT DOUBLE PRECISION (D)
        COMMON/CIO/IBUF(600),IDCB(144,5),LUN,MODE
        COMMON/APRI/NORDER,NORDMX,COFST,CRATE,CDRIFT,DCOFF,FLTRP,FLTRC,
       ,            IFRC,IFRP,A(6,6),E(6,6)
        COMMON/CPH/
       ,            IDAY(2),IMO(2),IYR(3),AIZ(2),IDOY(3),IHOD(3),
       ,            ASTA(6),DXJ(6),DYJ(6),DZJ(6),DTE(2),
       ,            IDS(2),DX(2),DY(2),DZ(2),DRNG(2),
       ,            ITC(3,3,2),RPC(19,3,2),ITP(3,3,2),RPP(19,3,2)
        COMMON/MAIN/IDAYE,IMOE,IYRE,AIZE,ASTAE,DXJE,DYJE,DZJE,
       ,            IHOE,IM0E,IS0E,DXE,DYE,DZE,DRNGE,DRDOTE
C       MAIN COMMON ALLOWS USE OF MORE RECENT EPHEMERIS FOR DX,DY,DZ
        COMMON/CMTRX/NX(2,2),DMX(6,6,4),DXI(6,4),TIMED,IH,IM,IS,ITS
        DIMENSION DCA(6),DM(4,2),DSD(4,2)
        LOGICAL ANYC,ANYP,TIMED
        DATA DCLGHT/2.99793D-1/,DTRC/977.517D0/,DTRP/97.7517D0/
C       INITALIZE DISPLAY ARRAYS
        DO 3 I=1,3
        DM(I,1)=0D0
        DM(I,2)=0D0
        DSD(I,1)=0D0
     3  DSD(I,2)=0D0
        IF3C=1H
        IF3P=1H
C       COLLECT OBSERVATION INTERVAL
        IF(TIMED)GO TO 5
        IH=ITC(1,1,1)
        IM=ITC(2,1,1)
        IS=ITC(3,1,1)
        ITS=0
        TIMED=.TRUE.
        GO TO 8
     5  TS=((ITC(1,3,1)-IH)*60.0+ITC(2,3,1)-IM)*60.0+ITC(3,3,1)-IS+2
        IF(TS.LT.0)TS=TS+86400.0
        ITS=TS
```

```
C       RECOMPUTE DOPPLER FACTORS FROM PERIOD PASSED
    8   DDOP=1D0/DTE(1)-10230000D0
        DSCALE=(10230000D0)/(1000D0+DDOP)
C       DOPPLER SHIFT EFFECT IN ACTIVE FILTER OUTPUT STAGES
        FLTC=FLTRC*DDOP/DSCALE
        FLTP=FLTRP*DDOP/DSCALE
C       DTEC=DTE(1)*10D9
C       DTEP=DTE(1)*1.D9
        DTEC=DTRC
        DTEP=DTRP
        DN3=0D0
        ANYC=.FALSE.
        ANYP=.FALSE.
C       COUNT THROUGH 3 SAMPLES
        DO 300 J=1,3
C       VERIFY TIMES ARE IN SYNCH
        IF(IAND(MODE,4096).NE.0)
       .WRITE(LUN,9)((ITC(I,J,K),I=1,3),K=1,2),((ITP(I,J,K),I=1,3),K=1,2)
    9   FORMAT(3I2,2X,3I2,5X,3I2,2X,3I2)
        DO 10 I=2,3
C       ASSUME HOURS AND TIME ZONES HAVE BEEN CHECKED BY OB SYNCHER(PAIR)
        IF(ITC(I,J,1).NE.ITC(I,J,2)) GO TO 300
        IF(ITP(I,J,1).NE.ITP(I,J,2)) GO TO 300
C       THIS IS ONE TEST FOR CONFIDENCE EACH SUBSECOND PHASE WAS MEASURED
C         AT THE SAME TIME
   10   CONTINUE
C       INIT 1 SET SUMS
        DNC=0D0
        DM1C=0D0
        DM1SC=0D0
        DNP=0D0
        DM1P=0D0
        DM1SP=0D0

C       CALCULATE APRORI CONTRIBUTION TO DELAY
C       C/A CODE EARLIER OF TWO RANGES
C       UPDATE EPHEMERIS FOR CURRENT GEOMETERY
        CALL EPHEM(ITC(1,J,1),IDS(1),DCOFF)
C       ITERATE TO CORRECT TO TIME OF EMISSION
        CALL EPHEM(ITC(1,J,1),IDS(1),DCOFF-DRNGE/2.99793D8)
C       GEOMETRIC-PATH DIFFERENCE CONTRIBUTION
        DTAUC=-(DRNGE-DSQRT((DXE-DXJ(5))**2+(DYE-DYJ(5))**2
       ,       +(DZE-DZJ(5))**2))/DCLGHT
C       CLOCK OFFSETS(RE START OF RUN EPOCH APRIORI PARAMETERS)
        DTI=((ITC(1,J,1)-IHOE)*60D0+(ITC(2,J,1)-IMOE))*60D0+ITC(3,J,1)
       ,    -ISOE
        IF(DTI.LT.0D0)DTI=DTI+86400D0
        CLKC=-COFST-DTI*(CRATE+DTI*CDRIFT)*1E9
C   -   P- CODE LATER OF TWO RANGES
        CALL EPHEM(ITP(1,J,1),IDS(1),DCOFP)
C       ITERATE TO CORRECT TO TIME OF EMISSION
        CALL EPHEM(ITP(1,J,1),IDS(1),DCOFF-DRNGE/2.99793D8)
        DTAUP=-(DRNGE-DSQRT((DXE-DXJ(5))**2+(DYE-DYJ(5))**2
       ,       +(DZE-DZJ(5))**2))/DCLGHT
        DTI=((ITP(1,J,1)-IHOE)*60D0+(ITP(2,J,1)-IMOE))*60D0+ITP(3,J,1)
       ,    -ISOE
        IF(DTI.LT.0D0)DTI=DTI+86400D0
        CLKP=-COFST-DTI*(CRATE+DTI*CDRIFT)*1E9
C       INTRA-OBSERVATION RAMP
        ATI=((ITP(1,J,1)-ITC(1,J,1))*60E0+ITP(2,J,1)-ITC(2,J,1))*60E0
       ,    +ITP(3,J,1)-ITC(3,J,1)
        IF(ATI.LT.0.0)ATI=ATI+86400.0
        ARNTH=.1*((DTAUP+CLKP)-(DTAUC+CLKC))/ATI
C       USE P-CODE EPOCH AS EPHEMERIS FOR NOMINAL GEOMETERY
C       COMPUTE LINEAR COEFFICIENTS
        D=DRNGE*DCLGHT
        DCA(1)=-DXE/D
        DCA(2)=-DYE/D
        DCA(3)=-DZE/D
        DCA(4)=-1D0
        DCA(5)=-1.0D-2*DTI
        DCA(6)=-1.0D-2*DTI*DTI
C       TOTAL DELAY
        DTTC=DTAUC+CLKC+FLTC
        DTTP=DTAUP+CLKP+FLTP
C       MODULUS TO ONE PERIOD
```

```
      DTC=DMOD(DTTC,DTEC)
      DTP=DMOD(DTTP,DTEP)
C     DISPLAY VALUES OF APRIORI DELAY
      IF(IAND(MODE,128).NE.0)WRITE(LUN,7)IDS(1),DTAUC,DTAUP,CLKP,ARNTH,
     .FLTC,DTTC,DTEC,DTC,
     .FLTP,DTTP,DTEP,DTP
7     FORMAT(1H(,I2,1H),2X,3HBL:,2F10.3,2X,3HCK:,F10.3,6H STEP:,F10.3,
     .,2(/5X,4F10.3))
C     NOTE USE OF START OF P-CODE PHASE RUN AS REFERENCE EPOCH
C       DIFFERENCE ALL SAMPLES
      DO 190 I=1,19
      DDC=RPC(I,J,2)-RPC(I,J,1)
      DDP=RPP(I,J,2)-RPP(I,J,1)
C     COMPUTE PHASE DIFFERENCE, CORRECTING FOR APRIORI DELAY
      DC=DDC-ARNTH*(I-1)-DTC
      DP=DDP-ARNTH*(I-1)-DTP
160   IF(DABS(DC).LT.DTEC/2)GO TO 170
      DC=DC-DSIGN(DTEC,DC)
      GO TO 160
170   IF(DABS(DP).LE.DTEP/2)GO TO 180
      DP=DP-DSIGN(DTEP,DP)
      GO TO 170
C     CONSIDER NOISE AT THE HALF WAVELENTH POINT
C       LOCK WHOLE OBSERVATION TO SAME SIGN
180   IF(I+J.EQ.2) GO TO 185
      IF(DC*DCL.LE.-16D4)DC=DC-DSIGN(DTEC,DC)
      IF(DP*DPL.LE.-16D2)DP=DP-DSIGN(DTEP,DP)
185   DCL=DC
      DPL=DP
C     DISPLAY DETAILS (AND RESIDUALS TO APRIORI) IF MODE SET
      IF(IAND(MODE,2048).NE.0)WRITE(LUN,189)RPC(I,J,2),RPC(I,J,1),DDC,
     ,DC,RPP(I,J,2),RPP(I,J,1),DDP,DP
189   FORMAT(4F10.3,4X,4F9.3)
C     ACCUMULATE FOR MEAN AND RMS
      DNC=DNC+1D0
      DM1C=DM1C+DC
      DM1SC=DM1SC+DC*DC
      DNP=DNP+1D0
      DM1P=DM1P+DP
190   DM1SP=DM1SP+DP*DP
C
C     PROCESS C/A CODE DELAYS
C     TREAT DIAGNOSTIC TEST CASE OF 'ZERO BASELINE' BY REPLACING IMPOSSIBLE
C       DATA SET OF ZERO VARIANCE WITH IMPROBABLE ONE OF 1 MILLIMETER RMS.
      DM(J,1)=DM1C/DNC
      DSDS=DM1SC/DNC-DM(J,1)*DM(J,1)
      IF(DSDS.LT.1D-20)DSDS=9.0D-8
      DSD(J,1)=DSQRT(DSDS)
C     THROW OUT NOISY NORMAL C/A CODE POINTS
      IF(DSD(J,1).GT.20D0)GO TO 270
C     MOD TO MEASURE GDOP ALONE--RMS=1NANO*19D0
      IF(IAND(MODE,4008).NE.0) DSDS=19D0
C     FORCE MEAN BACK WITHIN ONE HALF PERIOD--NOISE MAY HAVE SPREAD IT
      IF(DABS(DM(J,1)).GE.DTEC/2D0)DM(J,1)=DM(J,1)-DSIGN(DTEC,DM(J,1))
C     NOTE TROUBLE WITH SOLUTION IF NEAR AMBIGUITY POINT
      IF(DABS(DM(J,1)).LE.DTEC*.45)GO TO 250
      IF3C=1H*
      IFRC=1H*
C     COUNT DATA INTO DATA VECTOR AND MEASUREMENT MATRIX
250   DO 260 I=1,NORDMX
      DIC=DCA(I)/DSDS*DNC
      DXI(I,1)=DXI(I,1)+DIC*DM(J,1)
      DO 260 K=1,NORDMX
260   DMX(I,K,1)=DMX(I,K,1)+DIC*DCA(K)
      DN3=DN3+DNC
      ANYC=.TRUE.
C
C     PROCESS P-CODE DELAYS
270   DM(J,2)=DM1P/DNP
      DSDS=DM1SP/DNP-DM(J,2)*DM(J,2)
      IF(DSDS.LT.1D-20)DSDS=9.0D-8
      DSD(J,2)=DSQRT(DSDS)
C     THROW OUT NOISY NORMAL P-CODE POINTS
      IF(DSD(J,2).GT.2D0)GO TO 300
C     MOD TO MEASURE GDOP ALONE--RMS=1NANO*19D0
      IF(IAND(MODE,4008).NE.0) DSDS=19D0
```

```
C       FORCE MEAN BACK WITHIN ONE HALF PERIOD--NOISE MAY HAVE SPREAD IT
        IF(DABS(DM(J,2)).GE.DTEP/2D0)DM(J,2)=DM(J,2)-DSIGN(DTEP,DM(J,2))
C       NOTE TROUBLE WITH SOLUTION IF NEAR AMBIGUITY POINT
        IF(DABS(DM(J,2)).LE.DTEP*.45)GO TO 280
        IF3P=1H*
        IFRP=1H*
C       COUNT DATA INTO DATA VECTOR AND MEASUREMENT MATRIX
  280   DO 290 I=1,NORDMX
        DIP=DCA(I)/DSDS*DNP
        DXI(I,2)=DXI(I,2)+DIP*DM(J,2)
        DO 290 K=1,NORDMX
  290   DMX(I,K,2)=DMX(I,K,2)+DIP*DCA(K)
        DN3=DN3+DNP
        ANYP=.TRUE.
  300   CONTINUE
        IF(ANYC)NX(1,1)=NX(1,1)+1
        IF(ANYP)NX(2,1)=NX(2,1)+1
        IF(IAND(MODE,64).EQ.0)RETURN
        IF(IAND(MODE,4).EQ.0)
       ,WRITE(LUN,301)(ITC(I,J,1),I=1,3),IDS(1),
       ,((DM(I,1),DSD(I,1)),I=1,3),IF3C
        IF(IAND(MODE,2).EQ.0)
       ,WRITE(LUN,301)(ITP(I,J,1),I=1,3),IDS(1),
       ,((DM(I,2),DSD(I,2)),I=1,3),IF3P
  301   FORMAT(3I2,'(',I2,')',3(F10.3,F7.3),40X,A1)
        RETURN
        END
C*******USE FILLED ARRAYS TO ESTIMATE BASELINE
C  -   REVISION:    2:51 PM   THU., 15  APR., 1982
        SUBROUTINE PHFIT(IR)
C
C       SCHEME INTENDS TO DISPLAY ESTIMATED SOLUTION WITH
C           THE MINIMUM AND THE GRAND DATA SET
C       BULK OF THE CODE RESULTS FROM HAVING ONLY THREE INDICIES
C           IN THE ARRAYS IN HP FORTRAN
C       ALLOWS SOLUTIONS TO BE CALCULATED EVEN IF NOT DISPLAYED
C           SINCE THEY MAY BE USED IN &SERFT TO RESET APRIORI VALUES
C
        IMPLICIT DOUBLE PRECISION (D)
        COMMON/CMTRX/NX(2,2),DMX(6,6,4),DXI(6,4),TIMED,IH,IM,IS,ITS
        COMMON/CIO/IBUF(600),IDCB(144,5),LUN,MODE
        COMMON/CPH/
       ,            IDAY(2),IMO(2),IYR(3),AIZ(2),IDOY(3),IHOD(3),
       ,            ASTA(6),DXJ(6),DYJ(6),DZJ(6),DTE(2),
       ,            IDS(2),DX(2),DY(2),DZ(2),DRNG(2),
       ,            ITC(3,3,2),RPC(19,3,2),ITP(3,3,2),RPP(19,3,2)
        COMMON/APRI/NORDER,NORDMX,COFST,CRATE,CDRIFT,DCOFF,FLTRP,FLTRC,
       ,            IFR(2),A(6,6),E(6,6)
        DIMENSION VDET(4),ILAB(4)
        DIMENSION DSV(6,2),DSQ(6,2)
        LOGICAL TIMED
        DATA ILAB/1HC,1HP,1HC,1HP/
C
C       SOME DATA WAS PROCESSED--PASS IT ON
        NX(1,2)=NX(1,2)+NX(1,1)
        NX(2,2)=NX(2,2)+NX(2,1)
        DO 10 I=1,NORDMX
        DXI(I,3)=DXI(I,3)+DXI(I,1)
        DXI(I,4)=DXI(I,4)+DXI(I,2)
        DO 10 J=1,NORDMX
        DMX(I,J,3)=DMX(I,J,3)+DMX(I,J,1)
        DMX(I,J,4)=DMX(I,J,4)+DMX(I,J,2)
        DMX(J,I,1)=DMX(I,J,1)
   10   DMX(J,I,2)=DMX(I,J,2)
        NORDR=MIN0(NORDER,NORDMX-1)
C       DON'T DO A SOLUTION IF NOT EXPLICITLY CALL IN DETECTOR LOGIC
        IF(IR.NE.1) GO TO 110
C       DON'T ALLOW SOLUTION  FOR A(6,
        DO 100 K=1,2
        IF(IAND(MODE,6-2*K).NE.0)GO TO 100
        IF(NX(K,1).LT.NORDR) GO TO 100
C       INVERT MATRIX FOR BASE LINE
        CALL MATIN(K,NORDR,VDET(K))
        IF(VDET(K).LT..1) GO TO 50
```

```
      DO 20 I=1,NORDR
      E(I,K)=DSQRT(DMX(I,I,K))
      DSQ(I,K)=DSQ(I,K)+1D0/DMX(I,I,K)
      A(I,K)=0.0
      DO 15 J=1,NORDR
 15   A(I,K)=A(I,K)+DMX(I,J,K)*DXI(J,K)
 20   DSV(I,K)=DSV(I,K)+A(I,K)/DMX(I,I,K)
      ALEN=SQRT(A(1,K)*A(1,K)+A(2,K)*A(2,K)+A(3,K)*A(3,K))
      VLEN=0.0
      DO 30 I=1,3
      DO 30 J=1,3
 30   VLEN=VLEN+A(I,K)*A(J,K)*DMX(I,J,K)
      VLEN=SQRT(VLEN)/ALEN
      ELEN=
     . DSQRT((DXJ(5)+A(1,K))**2+(DYJ(5)+A(2,K))**2+(DZJ(5)+A(3,K))**2)
     .-DSQRT((DXJ(5))**2+(DYJ(5))**2+(DZJ(5))**2)
      WRITE(LUN,31)
     ,IH,IM,IS,ITS,ILAB(K),IFR(K),ELEN,VLEN,(A(I,K),E(I,K),I=1,NORDR)
 31   FORMAT(3I2,I4,2A1,6(1X,F8.3,'(',F6.3,')'))
 50   IF(IAND(MODE,1024).EQ.0) GO TO 100
      WRITE(LUN,53)VDET(K)
 53   FORMAT(' DET:',E10.2,)
      WRITE(LUN,57)(DXI(I,K),(DMX(I,J,K),J=1,5),I=1,NORDR)
 57   FORMAT(5(E10.3,2X,5E10.3/)/)
 100  CONTINUE
C     REINITALIZE FIRST MATRIX
 110  NX(1,1)=0
      NX(2,1)=0
      IFR(1)=1H
      IFR(2)=1H
      DO 120 I=1,6
      DXI(I,1)=0D0
      DXI(I,2)=0D0
      DO 120 J=1,6
      DMX(I,J,1)=0D0
 120  DMX(I,J,2)=0D0
      TIMED=.FALSE.
 1000 IF(IR.NE.2)RETURN
      IF((NX(1,2)+NX(2,2)).EQ.0)RETURN
C     SOME DATA WAS ACCUMULATED--SHOW SOMETHING
      IF(IAND(MODE,6).NE.6)WRITE(LUN,123)
 123  FORMAT(10'-',2X,6(1X,16'-'))
      DO 1100 K=3,4
      IF(IAND(MODE,10-2*K).NE.0)GO TO 1100
      IF(NX(K-2,2).LT.NORDER) GO TO 1100
C     INVERT MATRIX FOR BASE LINE
      CALL MATIN(K,NORDER,VDET(K))
      IF(VDET(K).LT..1) GO TO 1050
      DO 1020 I=1,NORDER
      E(I,K)=DSQRT(DMX(I,I,K))
      A(I,K)=0.0
      DO 1020 J=1,NORDER
 1020 A(I,K)=A(I,K)+DMX(I,J,K)*DXI(J,K)
      ALEN=SQRT(A(1,K)*A(1,K)+A(2,K)*A(2,K)+A(3,K)*A(3,K))
      VLEN=0.0
      DO 1030 I=1,3
      DO 1030 J=1,3
 1030 VLEN=VLEN+A(I,K)*A(J,K)*DMX(I,J,K)
      VLEN=SQRT(VLEN)/ALEN
      ELEN=
     . DSQRT((DXJ(5)+A(1,K))**2+(DYJ(5)+A(2,K))**2+(DZJ(5)+A(3,K))**2)
     .-DSQRT((DXJ(5))**2+(DYJ(5))**2+(DZJ(5))**2)
      WRITE(LUN,1031)
     ,ILAB(K),ELEN,VLEN,(A(I,K),E(I,K),I=1,NORDER)
 1031 FORMAT(10H    GRAND ,A1,1X,7(1X,F8.3,'(',F6.3,')'))
 1050 IF(IAND(MODE,1024).EQ.0) GO TO 1100
      WRITE(LUN,53)VDET(K)
      WRITE(LUN,57)(DXI(I,K),(DMX(I,J,K),J=1,6),I=1,NORDER)
 1100 CONTINUE
C     REINITALIZE SECOND MATRIX
 1150 DO 1155 I=1,6
      DXI(I,3)=0D0
      DXI(I,4)=0D0
      DO 1155 J=1,6
      DMX(I,J,3)=0D0
```

```
1155  DMX(I,J,4)=0D0
C
C     COMPUTE WEIGHTED AVERAGE OF COMPONENTS
      DO 1300 K=5,6
      IF(IAND(MODE,14-2*K).NE.0)GO TO 1300
      IF(DSQ(1,K-4).EQ.0D0) GO TO 1300
      DO 1220 I=1,NORDER
      E(I,K)=1D0/DSQRT(DSQ(I,K-4))
1220  A(I,K)=DSV(I,K-4)/DSQ(I,K-4)
      ALEN=SQRT(A(1,K)*A(1,K)+A(2,K)*A(2,K)+A(3,K)*A(3,K))
      VLEN=0.0
      DO 1230 I=1,3
1230  VLEN=VLEN+A(I,K)*A(I,K)/DSQ(I,K-4)
      VLEN=SQRT(VLEN)/ALEN
      ELEN=
     .  DSQRT((DXJ(5)+A(1,K))**2+(DYJ(5)+A(2,K))**2+(DZJ(5)+A(3,K))**2)
     .-DSQRT((DXJ(5))**2+(DYJ(5))**2+(DZJ(5))**2)
C     DISPLAY LENGTH(FORMAL ERROR) OR TOTAL LENGTH DIFFERENTIAL(F.E.)
      WRITE(LUN,1231)
     ,ILAB(K-4),ELEN,VLEN,(A(I,K),E(I,K),I=1,NORDR)
1231  FORMAT(10H  AVERAGE ,A1,1X,6(1X,F8.3,'(',F6.3,')'))
1300  CONTINUE
C     REINITALIZE SECOND MATRIX
1350  NX(1,2)=0
      NX(2,2)=0
      DO 1355 I=1,6
      DSQ(I,1)=0D0
      DSQ(I,2)=0D0
      DSV(I,1)=0D0
1355  DSV(I,2)=0D0
      RETURN
      END
C*****MATRIX INVERTER
C     REVISION:    2:51 PM  THU., 15  APR., 1982
      SUBROUTINE MATIN(IR,NORDER,DET)
C
C-------------------------------------------------------------
C
C     MATINV IS THE MATRIX INVERTER SUBROUTINE FOR USE IN THE
C     CURFIT PACKAGE       SEE BEVINGTON, PAGE 302
C
C     REVISED TO ELIMINATE DIVIDE BY ZERO INTERUPTS
C               RUN IN THIS PACKAGE L.A.B. 16DEC81
C
C-------------------------------------------------------------
C
      IMPLICIT DOUBLE PRECISION (D)
      REAL DET
      COMMON/CMTRX/NX(2,2),DMX(6,6,4),DXI(6,4),TIMED,IH,IM,IS,ITS
      DOUBLE PRECISION  AMAX, SAVE
      DIMENSION  IK(10), JK(10)
      LOGICAL TIMED
C
10    DET= 1.0
11    DO 100 K=1,NORDER
      AMAX= 0.0D0
21    DO 30 I=K,NORDER
      DO 30 J=K,NORDER
23    IF( DABS(AMAX) -DABS(DMX(I,J,IR)) ) 24,24,30
24    AMAX= DMX(I,J,IR)
      IK(K)= I
      JK(K)= J
30    CONTINUE
31    IF( DABS(AMAX).GT.1.0D-35 ) GO TO 41
32    DET= 0.0
      GO TO 140
41    I= IK(K)
      IF( I-K ) 21,51,43
43    DO 50 J=1,NORDER
      SAVE= DMX(K,J,IR)
      DMX(K,J,IR)= DMX(I,J,IR)
50    DMX(I,J,IR)= -SAVE
51    J= JK(K)
      IF( J-K ) 21,61,53
```

```
53      DO 60 I=1,NORDER
        SAVE= DMX(I,K,IR)
        DMX(I,K,IR)= DMX(I,J,IR)

60 -    DMX(I,J,IR)= -SAVE

61      DO 70 I=1,NORDER
        IF( I-K ) 63,70,63
63      DMX(I,K,IR)= -DMX(I,K,IR)/AMAX
70      CONTINUE
71      DO 80 I=1,NORDER
        DO 80 J=1,NORDER
        IF( I-K ) 74,80,74

74      IF( J-K ) 75,80,75

75      DMX(I,J,IR)= DMX(I,J,IR) +DMX(I,K,IR)*DMX(K,J,IR)

80      CONTINUE

81      DO 90 J=1,NORDER
        IF( J-K) 83,90,83

83      DMX(K,J,IR)= DMX(K,J,IR)/AMAX
90      CONTINUE
        DMX(K,K,IR)= 1D0/AMAX

100     DET= DET*AMAX

101     DO 130 L=1,NORDER
        K= NORDER -L +1
        J= IK(K)
        IF( J-K ) 111,111,105

105     DO 110 I=1,NORDER
        SAVE= DMX(I,K,IR)
        DMX(I,K,IR)= -DMX(I,J,IR)

110     DMX(I,J,IR)= SAVE

111     I= JK(K)
        IF( I-K ) 130,130,113

113     DO 120 J=1,NORDER

SAVE= DMX(K,J,IR)
        DMX(K,J,IR)= -DMX(I,J,IR)

120     DMX(I,J,IR)= SAVE

130     CONTINUE

140     RETURN
/       END

C*****COMMON DATA

C       REVISION:    2:51 PM  THU., 15  APR., 1982
        BLOCK DATA CMTRX
        IMPLICIT DOUBLE PRECISION (D)
        COMMON/CMTRX/NX(2,2),DMX(6,6,4),DXI(6,4),TIMED,IH,IM,IS,ITS
        LOGICAL TIMED
        DATA NX/4*0/,DMX,DXI/120*0D0/
        END
        END$
!
8>
```

METHOD AND APPARATUS FOR POSITIONING AND IONOSPHERIC MONITORING BY PASSIVE USE OF EARTH SATELLITES OF OPPORTUNITY

Contents

I. Abstract
II. Statement of the Challenge
III. Theory of Operation
IV. Implementation
V. Signal Extraction—Digital
VI. Signal Extraction—Analog
VII. Time and Frequency Requirements
VIII. Doppler Positioning
IX. NAVSTAR to Transit Adaptor
X. Differential Observations
XI. Satellite Positions and Phase Offsets
XII. Ionospheric Calibration—Dual P-Code Channels
XIII. Single Channel Ionospheric Calibration
XIV. High Precision Ionospheric Measurement

APPENDIX B

METHOD AND APPARATUS FOR POSITIONING AND IONOSPHERIC MONITORING BY PASSIVE USE OF EARTH SATELLITES OF OPPORTUNITY

By

Peter F. MacDoran

Donovan J. Spitzmesser

Abstract:

The purpose of this document is to describe the method and apparatus by which radio emissions from artificial Earth satellites of opportunity, particularly those of the NAVSTAR Global Positioning System (GPS), can be utilized without detailed knowledge of the coded transmissions to perform a wide variety of tracking and location determination missions and ionospheric monitoring in terrestrial and Earth orbital environments.

These tracking and location measurements are termed platform positioning and are intended to encompass the determination of the state (position, velocity, acceleration and higher derivatives), of one or more receiver(s) being tracked by the methodology to be described. The idea of platform positioning is a general concept and encompasses static or small motions as in the case of geodesy and Earth tectonic plate deformation monitoring at rates of a 1 cm/year; aircraft traffic approaching one another at a relative velocity of Mach 3 or an Earth orbiting satellite with a velocity of several km/sec relative to an Earth fixed reference system. When high accuracy is required, the methodology also enables the calibration of the ionosphere with an accuracy and flexibility unattainable by other presently available means. This ionospheric measurement method has in itself major applications to the study of the Earth's upper atmosphere and enables passive sensing of terrestrial events such as volcanic explosions, large earthquakes, seismic seawaves and underground nuclear detonations as well as the usual solar terrestrial interactions.

This methodology of passive use of satellite radio signals of opportunity has three major elements which are arranged to suit specific embodiments of the invention. The first element is an antenna which gathers the satellite emitted radio energy from one or more directions on the sky. The second element is a code sequence independent signal recovery module which employs non-linear detection circuitry and the third element is a signal processor which provides an output tailored to the application desired. It is the second element which tends to remain common to the various applications of the invention.

By employing the methods described, it is possible to determine the position, velocity and acceleration (i.e. state vectors) of any vehicle or platform which can view the sky. If two or more of these observing platforms state vector are differenced, their relative positions and velocities are determined. An algorithm can then determine if a safety threat exists such as constant platform relative three dimensional bearing and a decreasing range which guarantees a collision. Having established such a threat, actions can be taken to avoid a midair or at sea collision. This condition can also be exploited such as for rendezvous or for search and rescue.

Statement of the Challenge

The satellite constellation of the Global Positioning System (GPS) when fully implemented in 1987 will be composed of 18 or perhaps 24 Earth satellites. This satellite constellation will illuminate the Earth with dual L-band microwave signals intended to serve primarily U.S. military needs for positioning and navigation. At this writing, five satellites are in orbit and functional. The three main elements of the GPS are the satellite segment (termed NAVSTAR) which develops L-band signals from on-board atomic clocks and disseminates satellite ephemeris information; a ground control segment that monitors and controls the ephemeris of each satellite and the clocks in orbit; and a user segment that receives the L-band signals to accomplish a wide variety of positioning and navigation function involving many types of vehicles. Because of the nature of military missions, each segment of the GPS has capability which is restricted to all but the authorized and the highest precision information transmissions are encrypted in a manner originally designed to be unavailable to the public. In its highest precision mode, the GPS is required to have an accuracy of 16 m in three dimensions. However, for certain applications such as crustal deformation monitoring for earthquake predictive research, sub-decimeter accuracy is the threshold of interest. The challenge is then, to devise a system which exploits the existence of the GPS, without code knowledge, to achieve an accuracy three orders of magnitude better than was originally designed into the GPS and also do it with inexpensive equipment.

Theory of Operation

Consider FIG. 1. The observer is located at a geocentric vector location described as $\bar{R}$ with the NAVSTAR-GPS satellite located at geocentric vector position $\bar{\rho}_s$. The observer acquires the satellite broadcast once the satellite rises above the observer's horizon. Imagine that the clock aboard the satellite and the clock at the observer's radio receiver are synchronized. The apparent delay in the arrival of the satellite clock pulses are late by t and the range to the satellite is $\rho = c\Delta t$ were c is the speed of light. The magnitude of the true range, $\rho_T$ varies between $25 \times 10^6$ meters at rise and set to a minimum of approximately $20 \times 10^6$ m at the time of closest approach, TCA. The rate of change of range causes the frequency stable 10.23 MHz P-code modulation to vary from its true frequency $f_T = 10.23$ MHz by an amount equal to $\pm 27$ Hz with the $f_T$ value being observed at approximately TCA. However, in the real world the observer's or user's clock is not exactly synchronized to an external frequency scale such as UTC (Universal Time Coordinated) nor is the satellite clock synchronized. Thus, an error in the observed range results which now appears as $\rho = \rho_s - R + c(t_u - t_s)$ where the subscripts u and s denote user and satellite, respectively. Also, the measured frequency of the satellite signals, $f_M$, is in error by a summation of errors such as the clock rate of both the user and satellite clocks as well as atmospheric range-rate appearing terms.

In the conventional GPS configuration, the terms $\rho_s$ and $\Delta t_s$ are supplied to the user by a 50 bit per second telemetry message which contains satellite ephemeris and clock state information. The measured $\rho$ values from decrypting the C/A and P-code channels received from four separate NAVSTAR satellites allows the solution for the three dimensional user location R and the user's clock in the manner described in reference 1.

However, the invention herein being described assumes no knowledge of the C/A or P-code modulation sequence but can in principle deduce the same set of information, $\rho$, $\rho_s$, $\bar{R}$, $\Delta t_s$ and $\Delta t_u$ but using an implementation very different from the design for conventional GPS utilization.

The first challenge is to extract a useable signal from the encoded L-band transmissions without a decrypting receiver. Briefly, that detection is accomplished by multiplication of the broadband signals with themselves to recover the L-band carrier second harmonics or by a delay and multiply that recovers the chipping rates of the C/A and P-code modulations of the dual L-band carriers. This type of information acquisition is ambiguous unlike the P-code pseudo range observable derived by decrypting the GPS signals. However, having no dependence upon the code form of GPS transmissions is such an advantage to a civilian user community that innovations to accommodate ambiguous data are well worth the effort especially when the resultant system can achieve an accuracy improvement of 100 to 1000 times better than the 16 m accuracy designed into the conventional GPS mode.

The ambiguities are 9.5 cm and 12.0 cm from the second harmonics of the $L_1$ and $L_2$ channels, 29.3 m from the P-code modulations extracted from either the $L_1$ or $L_2$ channel and 293 m from the C/A code modulation on the $L_1$ channel. The L-band carrier ambiguities are resolved by a $10^{-3}$ phase interpolation of the P-code phase which is equivalent to 3 cm which is 31% of an $L_1$ carrier second harmonic cycle or 24% of an $L_2$ carrier second harmonic cycle. Thus, to well within one-half an L-band derived carrier cycle, the phase is measured within 0.1 mm precision limit governed by an amplitude signal to noise ratio, SNR = 160 but with a new ambiguity interval of the P-code wavelength, 29.3 meters. In a similar manner, the P-code ambiguity is resolved by interpolating within the C/A code modulation to a precision of 10 meters which represents a modest 3% of the C/A code cycle wavelength and requires an amplitude SNR = 5. An ambiguity of some number of C/A cycles (wavelength, 293 m) is now present which must be resolved by the use of Doppler positioning techniques accurate to 100 meters which are unambiguous but lack the precision of the pseudo-ranging previously mentioned in this section.

Thus, a method has been outlined which deduces pseudo range by a combination of Doppler positioning with an accuracy of 100 meters to resolve C/A cycle ambiguities with the C/A precision being better than 10 meters which resolves P-code cycle ambiguities with P-code precision of 3 cm which resolves L-band cycle ambiguities which are themselves precise to the sub-millimeter level.

Consider the two dimensional case shown in FIG. 2. To deduce the true user position, a solution of the following system of equations is performed.

$$\sqrt{(X_u - X_1)^2 + (Y_u - Y_1)^2} = \rho_1' - c(\Delta t_u - \Delta t_{s1})$$

$$\sqrt{(X_u - X_2)^2 + (Y_u - Y_2)^2} = \rho_2' - c(\Delta t_u - \Delta t_{s2})$$

$$\sqrt{(X_u - X_3)^2 + (Y_u - Y_3)^2} = \rho_3' - c(\Delta t_u - \Delta t_{s3})$$

where $\rho_1'$, $\rho_2'$, and $\rho_3'$ are measurements of the pseudo-range from the user receiver to each of the satellites at the given satellite positions of $X_i$ and $Y_i$ and with their given individual satellite clock time offsets of $\Delta t_{si}$, where i = 1, 2 or 3.

For this two dimensional case the three unknowns, $X_u$, $Y_u$ and $\Delta t_u$ are solved for based upon the three observations $\rho_1'$, $\rho_2'$ and $\rho_3'$.

The SERIES invention, to be expanded upon in later sections, makes it possible to deduce the pseudo-ranges $\rho_i'$ without code knowledge. However, the terms $\Delta t_{si}$ are generally unknown for each of the satellites being observed by a civil user. To avoid the necessity of knowing $t_{si}$, a pair of user stations now observes the three satellites and the measured pseudo ranges from each station are differenced. Thus, any offset in the epoch time of satellite transmission is an error presented simultaneously to the two stations and is therefore common-mode eliminated in the differential data-type. This two station differential data type is also identical to the delay data type developed by cross correlation signal detection in Very Long Baseline Interferometry (VLBI).

A tradeoff is therefore accomplished, that of abandoning a point positioning determination in which the geocentric position of the user ($X_u$, $Y_u$) and user clock offset ($\Delta t_u$) is deduced, traded for the determination of the differential location of station 2 relative to station 1. Consider FIG. 2. The unit vector $\hat{S}$ is located at station 1 and points to the satellite signal source at a distance $\rho_1$. The baseline vector $\bar{B}$ points from antenna 2 (phase center) to antenna 1 (phase center in the case of an unsteered omnidirectional antenna).

The satellite clock offsets are eliminated but in their place a new clock parameter appears, that of the two user clocks differential error because in general clock 1 is not synchronized to clock 2. Because the satellites are a finite distance away from the user receivers, incoming wavefronts are spherical in shape. The VLBI geodetic experience deals with extragalactic radio sources and as such they could be considered as being virtually at infinity and thus their incoming wavefronts are planar. As shown in Reference 2, the usual VLBI geodetic equations can be recast into a modified form by including a spherical to planar wavefront term, δ. Thus, the set of differential pseudo-range equations take on the form $$\Delta\rho = -\hat{S} \cdot \vec{B} + \delta + c(\Delta t_{u1} - \Delta t_{u2}) + ct_{TM} \quad (1)$$

$$\text{where } \delta = \frac{(\rho_2 - \rho_1) - B^2}{2\rho_1}$$

$$\Delta\rho = \rho_2 - \rho_1 = c/f(f_2 T_2 - f_1 T_1) + c/f(N_2 - N_1) \quad (2)$$

The term $(\Delta t_{u1} - \Delta t_{u2})$ is the differential of clock 2 relative to clock 1 and $t_{TM}$ is the time delay associated with the transmission media of the troposphere and ionosphere through which the satellite signals must pass in reaching the user receiver. The tropospheric delay calibration can be ignored, modelled or explicitly calibrated depending upon accuracy requirements. The ionospheric delay can be explicitly measured by exploiting the dual frequency NAVSTAR transmissions, without code knowledge, as will be discussed in the sections dealing with the ionosphere. The terms $N_1$ and $N_2$ account for the phase ambiguities associated with the SERIES technique. For example, the P-code chipping rate of 10.23 MHz is recovered and exhibits a phase offset indicative of the pseudo-range, $\rho_i$, to the satellite but with an ambiguity of the P-code wavelength. In FIG. 3, the pseudo range at station 1 is formed by measuring the elapsed time between the start of the time interval counter with the one pulse per second (1 pps) event markers from clock 1 and the counter is stopped by with the next occurring positive going zero crossing of the receiver 1 P-code 10.23 MHz sinusoidal output.

The time interval counter indicates a value $T_1$ between 0 and 97.75 nanoseconds. The received P-code frequency will be Doppler shifted by as such as 27 Hz for a terrestrial user and the actual received frequency, $f_1$, is measured with the frequency counter. The P-code fractional phase is now formed by multiplying the $f_1$ by $T_1$. The pseudo range is the wavelength (c/f) multiplied by the fractional phase, $\rho_1 = c/f(f_1 T_1) + c/f N_1$ were $cN_1/f$, is the integer number of whole P-code wavelength cycles (29.3 m) between the receiver and satellite and f is the rest frequency of the satellite.

In this process it has been assumed that the geocentric location of receiver 1; the unit vectors from receiver 1 to the satellite and the range from receiver 1 to the satellite are known quantities.

The receiver 2 outputs are now measured relative to clock 2 and the pseudo range becomes $\rho_2 = c/f(f_2 T_2) + c/f N_2$. The differential pseudo range is now formed as $$\Delta\rho = \rho_2 - \rho_1 = c/f(f_2 T_2 - f_1 T_1) + c/f(N_2 - N_1)$$

The differential pseudo range, $\Delta\rho$, is functionally dependent upon the baseline as indicated in equation (1).

The problem is now the determination of the ambiguity of whole cycles, cN/f. FIG. 3 illustrates in two dimensions the physical situation of three NAVSTAR satellite following each other around the Earth in their 12 hour period orbits. The observer is located at $\vec{R}$ and each of the satellites is located at $\vec{\rho}_{s1}$, $\vec{\rho}_{s2}$ and $\vec{\rho}_{s3}$, respectively. Each of the NAVSTAR satellites transmits the same frequency $(f_T)$ and the observer is assumed to have a receiver with an oscillator synchronized to the same UTC frequency scale. The measured Doppler frequency $f_M = [f_T v_s/c] \cos \alpha$. Additional insight to the physics of Doppler and range observations is given in FIG. 13.

The velocity vector projections along the line of sight cause the Doppler shift effect. Consider a simplification of a non-rotating Earth or a possible observer at a very high latitude so that the Earth's rotational velocity is very small compared to the satellite's velocity along its orbital path. Each value $f_M$ measured at time t allows the look-up, or computation from ephemeris elements, of the satellite state vector, position $\vec{\rho}_{si}$ and velocity $\vec{v}_{si}$. Therefore, all the possible places that the observer could be located are on the surface of a cone whose vertex is at the satellite position $\vec{\rho}_s$ with the half apex angle given by $\alpha = \cos^{-1}[cf_M/v_s f_T]$. Since FIG. 3 illustrates a two dimensional situation, the intersection of the cones with the plane of the figure reduces the loci of possible positions to lines of constant Doppler. The intersection of the lines of possble position from satellites 1 and 3 are sufficient to determine the observer position $\vec{R}$. Satellite 2 is shown at the special case of zero Doppler occuring at the time of closest approach so that the observer must lie in a plane defined by the normal to the satellite 2 velocity vector. Actually, two satellites would have been sufficient to determine R given the assumption of synchronized receiver and satellite oscillators but the third satellite adds redundancy or an additional observation to solve for the receiver reference oscillator offset relative to the assumed synchronized satellite transmitted frequencies $f_T$.

Having determined $\vec{R}$ and having $\vec{\rho}_s$ as a given, the pseudo range (Doppler) $\rho_D = \rho_s - R$ is deduced and equated to equation (2).

$$\text{Thus, } c/fN = \rho_D - c/f(f_M T) = \rho_s - R - c/f(f_M T).$$

The ability to obtain positioning accuracy of better than 100 meters will be discussed in a later section on Doppler positioning.

Implementation

The innovations to be described were developed primarily in pursuit of extraterrestrial geodesy in a system called Satellite Emission Range Inferred Earth Surveying (SERIES), Reference 3. However, the term SERIES used in these descriptions will be considered as a generic term. Imagine one or more SERIES devices receiving signals from four or more GPS satellites. Each station is equipped with an antenna, a receiver and data system. Consider FIG. 1. The challenge is now to extract information from an encrypted spread spectrum biphase modulated into full carrier suppression by an unknown pseudo random noise (PRN) code sequence. What is known (Reference 4) is that the carriers and rate of digital modulation transitions are controlled by the satellite-borne atomic frequency reference. All GPS satellites have an identical rate of 10.23 mega-transitions per second which is termed the chip rate of the P (protected) channel. Two other modulations are also present, 1.023 MHz called the C/A (coarse acquisition) channel and a 50 bit per second telemetry channel containing satellite ephemeris data. Dual carriers are used for ionospheric calibration and are centered at 1575.42 MHz and 1227.6 MHz which are generated by multiplying the 10.23 MHz signal by 154 and 120, respectively.

To exploit these signals without code sequence knowledge, a non-linear detection scheme is used. By a full wave rectification process, the even harmonics of the suppressed L-band carriers are recovered as well as the P and C/A code modulation transitions when a delay and multiply method is employed (FIGS. 4 and 5). It is the second harmonic of the carrier that is of main interest although the higher harmonics are also present and exploitable. Similarly, the harmonics of the P-code and C/A code are also present and exploitable. The effect is to collapse a broadband 20.46 MHz signal (10.23 MHz, double sideband) into a simple sinewave. Such methods have been in common practice (Reference 5 and 6) to synchronously demodulate telemetry data where the recovery of the telemetry bit clock frequency is merely a means to the end of recovering the telemetry bit stream. In the SERIES implementation, the actual P-code and C/A code bit sequences are not explicitly used. The strategy is to exploit the chip rate as a type of coherent range code which has ambiguities which become resolved. Specifically, the L-band carrier cycle ambiguities are resolved by P-code phase measurement whose ambiguities are resolved by C/A-code phase measurement whose ambiguities are resolved by Doppler frequency measurement from either the L-band carriers or P-code modulation exploiting the fact that Doppler positioning is virtually unique.

For some applications, there is a desire to have access to the L-band R.F. carriers and the P and C/A channel sub-carriers, all of which have been coherently derived from the on-board spacecraft atomic frequency references. Because of the needs of the conventional GPS mission, these signals are stable to better than $10^{-12}$ at 100 seconds averaging time (Reference 7).

Using these signal squaring techniques, with a half chip time delay in the case of the sub-carriers, it is possible to recover twice the $L_1$ and $L_2$ carriers (i.e. 3150.84 MHz and 2455.20 MHz) which exhibit twice the Doppler frequency shift, maximum 8.3 kHz, that would have occurred at $L_1$ (1575.42 MHz) and a maximum of 6.5 kHz for the $L_2$ (1227.6 MHz) carrier had they not been totally suppressed by the P and C/A modulations. The P-code modulation rate of 10.23 MHz is also recovered at both the $L_1$ and $L_2$ channels and it exhibits Doppler shifts that span from 0 to ±27 Hz. The C/A modulation of 1.023 MHz, (usually present only on the $L_1$ channel) is similarly recovered and has a Doppler shift of 0±2.7 Hz.

A major feature of the SERIES technique is now evident, that of information compression. In the beginning, there was a spread spectrum of 20.46 MHz width of unknown modulation and now all the information necessary for pseudo ranging and ionospheric calibration is contained in sinewaves which are confined by the physical situation to a relatively narrow bandwidth. Specifically, for an Earth based observer all the L-band carrier phase information is contained in a 16.6 kHz bandwidth, the P-code within a 54 Hz bandwidth, and the C/A channel within 5.4 Hz.

Imagine now a receiver that has input to it a single GPS satellite perhaps by using a high gain antenna. The C/A channel output of the 1.023 MB/S chipping rate connected to the stop channel of a time interval counter (FIG. 8). This counter is started by a one pulse per second (1 PPS) signal from the station clock. The relative geometry of the satellite to the receiving antenna is now indicated by the time interval counter, module 978 nanoseconds (the period of 1.023 MHz) with an unknown possible bias in the satellite and the SERIES receiver clock. A second receiver can now perform the same measurement relative to its own clock. By forming the difference of time interval counter 1 multiplied by $f_1$ minus counter $2 \times f_2$ a phase delay observation is created which is identical to the delay data type of (VLBI) very long baseline interferometry (Reference 8) for which considerable baseline measurement experience exists (Reference 9). Note that the possible C/A phase bias in the satellite now vanished but in its place another bias appears which is the difference of clock epochs between station 1 and 2. The delay observable created by differenced C/A ranging is ambiguous at the C/A wavelength of 293 meters. Similarly, this same procedure could be employed using the P-code and/or L-band carriers which would introduce ambiguities in the delay of 29.3 m and 9.5 cm, respectively. For reasons of convenience and reduced cost of implementation the recovered sinewaves are coherently down-converted to lower frequencies where simple equipment functions well, see FIG. 6. The carriers are moved to 10 kHz centers, the P-codes to 1 kHz center and the C/A to 100 Hz. At these frequencies a simple start/stop counter can be used as a differential phase detector given only one satellite in view. A sensitivity expansion then results of 10,230 for the P and C/A codes; a factor of 315,000 for the $L_1$ channel and a factor of 245,500 for the $L_2$ channel. Other differential phase detectors are also possible.

The next step is to estimate the baseline vector and deduce the time offset of the station 1 clock relative to the station 2 clock. The conceptual approach is identical to that employed in quasar VLBI geodesy (Reference 11). Consider four or more GPS satellites above the horizon common to stations 1 and 2. Four delay observations are developed by differencing digital counter readings scaled by the Doppler frequency. Each of the GPS satellites are widely separated on the sky, and thus the four delays allow for a simultaneous estimation of the three dimensional baseline vector and the relative clock bias between the stations. The strategy here is to make four delay observations as rapidly as possible so as to minimize the effect of receiver clock instabilities because the clock error contribution grows linearly with the total time required to observe the four or more GPS satellites.

In the original SERIES paper (Reference 10), a phased array antenna system was suggested as the mechanization to rapidly move a high gain antenna beam around the sky to acquire four or more delay observations. In that earlier design, the delay observation was obtained by cross-correlation of noise-like illumination from the GPS satellites. While the steering of a high gain antenna is possible, either by phasing or mechanical pointing of a relatively small dish antenna (approximately 1 m in diameter), knowledge of where to point is usually required. Such satellite ephemeris information being resident in the receiver adds complications to the system and it is clearly an advantage to have a receiver without that information in the field data acquisition hardware. What is obviously desirable is to have no antenna pointing requirements and an inexpensive time and frequency subsystem in the receiver. What is required is simultaneous reception of several GPS satellites all broadcasting in the same frequency bands and then separately measure the range and ionospheric calibration to each satellite. In that manner, the baseline vector and relative clock offset could be virtually continuously estimated and the stability requirements on the receiver clock can be greatly reduced so that a crystal oscillator might perform well enough to allow few cm geodesy.

An omni-directional antenna provides such an option (FIG. 7). All GPS satellites above the local horizon will illuminate this antenna and by squaring the arriving signals the carrier second harmonics and chip rates of P and C/A will recovered in an unambiguous manner by allowing each of their intrinsic Doppler frequency shifts to identify from which NAVSTAR spread spectra the signal has come. This technique operates because the several arriving NAVSTAR spread spectra signals do not interfere with each other.

The initial concern involves the squaring process and whether intermodulation products will occur between the four or more simultaneously arriving GPS signals. It is conjectured that intermodulation is not a problem because each satellite transmits a unique code sequence by the design of the conventional GPS mode (Reference 4) so that a conventional GPS decrypting receiver will acquire only the desired satellite. That is equivalent to saying that the cross-correlation coefficient is virtually zero between the various satellite signals themselves. As a result of the signal squaring, the spread spectra from a given GPS satellite will collapse into only one spectral line which will be offset from the other satellites by its intrinsic Doppler shift and thus generally distinguishable. Although the satellite can take on Doppler frequencies which are nearly identical, this condition can be a priori predicted given even crude knowledge of the receiver position. For example, given a 100 km positional uncertainty P-code Doppler is predictable within 0.5 Hz and satellite signal overlapping can be avoided in the final processing.

Many data processing options now exist for extracting the several GPS satellite signals from within the receiver post product-detection bandpass. In its simplest form, the analog signals or their digitized form could be transmitted in realtime via radio or land line telephone for final processing to extract positioning and ionospheric information. However, in the analog case, care must be taken to calibrate the phase versus frequency distortions in the communucation channel. This analog channel could also be processed with a field receiver and a position deduced relative to a set of satellite ephemerides, a priori available, or decoded from the 50 bits per second telemetry code of the $L_1$ C/A channel.

Signal Extraction—Digital

Without assuming detailed knowledge of the satellite ephemerides, the signals from the narrow bandpass can be extracted as follows: in general, four or more sinewaves are expected to be present within each bandpass, one from each of the four or more GPS satellites above the horizon. Consider one or more simultanously observing platforms. The phase and phase rate differences between these platforms allows the pseudo range and range rate between the platforms to be measured (FIG. 8). There are ambiguities in these measurements, 9.5 cm from the $L_1$ channel, 12 cm from the $L_2$ channel (note the double frequency of the carriers); 29.3 m from the P-code channels and 293 from the C/A channel. Note that differencing the two platform observations eliminates any phase variations originating in the GPS satellites.

Image now a digital implementation of the phase extraction. The bandbass is digitally sampled and input to a Fast Fourier Transform (FFT) inphase and quadrature algorithm to resolve the bandpass into elements of desired bandwidth and to extract the phase of each spectral line. An individual GPS satellite undergoes a maximum $L_1$ channel carrier Doppler rate of about 0.9 Hertz per second at the time of closest approach. So, the $L_1$ carrier signal will remain in a 1 Hz bandwidth for approximately one second. The P-code will remain within 1 Hz width for approximately 308 seconds. Depending upon the signal to noise ratio in the channel, modeling of the phase rate might be desirable similar to the type of modeling done in VLBI cross correlation signal detection (Reference 11) to extract weak quasar signals in the presence of high background noise levels. In this mode, the FFT results are used as starting conditions for modeling the sinusoidal signals in the bandpass where an approximate guess of the receiver location and satellite positions are a priori input parameters and parameter estimation proceeds on the residuals to the model.

There is now the problem of determining the direction from which the GPS signals are coming which is equivalent to identifying the GPS satellite. This problem is essentially uniquely resolvable from a few minutes of data because the Doppler frequency offsets are virtually unique for each of the satellites. The processing algorithm needs only crudely know the position of the receiver within 100 km because the satellites signal wil be well-dispersed over the receiver output passband (FIG. 9), where the double subscript denotes first the receiver and the second number the particular satellite, i.e. $f_{23}$ denotes the measured frequency of satellite 3, including its Doppler offset as observed at station 2.

Signal Extraction—Analog

Rather than a digital FFT approach to extract phase and phase rate, the bandpass (i.e. 8.3 kHz for $2 \times L_1$ Doppler, 54 Hz for P-code and 5.4 Hz for C/A-code) can be input to bank of comb filters. For example, if a P-code signal existed at 17.7 Hz and the 54 Hz band was subdivided into 54 windows each about 1 Hz wide, then the signal would appear in the 17th window above the band center. A phase locked loop can be used to extract the signals from each comb filter output, see FIG. 10.

The condition of the receiver time and frequency subsystems can be incorporated into the bandpass by creating a GPS-like signal structure and injecting it into the receiver first amplifier at approximately the same signal level as available from the GPS satellites, −163 dBW. The receiver calibrator is made by using a pseudo random noise (PRN) sequence generator of convenient length which creates a 20.46 MHz spread spectrum which is then combined in a double balanced mixer with 1575.42 MHz and/or 1227.6 MHz carrier simulators, see FIG. 11. The SERIES receiver now maps these signals in an identical manner to the way the GPS signals are received. Thus, the calibration spread spectrum is collapsed into a sinewave at precisely the center of the IF bandpass (i.e. 1 kHz). This injection of a GPS-like signal not only has the effect of calibrating the delay of the SERIES receiver but serves as the clock or phase reference for the receiver modulo one millisecond. By changing the 10.23 MHz PRN clocking rate by slight amounts, it is possible to mimic any GPS satellite since for a terrestrial observer expects to find signals confined to within ±27 Hz of the zero Doppler condition.

A filter channel at the center of the band would extract the receiver reference. Reference and satellite filter outputs can then be input to a phase comparator circuit or perhaps a time interval counter to indicate the phase difference between the receiver reference and the received satellite signal. For example, a simple phase comparator circuit operated at 10 kHz could indicate a phase differential with a precision of one degree which on the $L_1$ channel would be equivalent to 0.03 cm pseudo ranging.

Time and Frequency Requirements

At the beginning of a measurement, the receiver location might be known only within 100 km. The sensitivity of the P-code Doppler frequency to positioning is approximately 0.005 Hz per km based upon fringe frequency VLBI experience, (Reference 13). The receiver frequency reference stabilty now enters the problem. Consider an oscillator of fractional stability $5 \times 10^{-11}$. The frequency stability is then $5 \times 10^{-4}$ Hz on the 10.23 Hz P-code which would support 100 meter positioning sensitivity which is sufficient to resolve the 293 meter ambiguity intervals for pseudo ranging on the C/A-code channel and the ambiguity resolution of P-code and L-band cycles proceeds as previously described.

Consider the minimum time to detect a signal and examine the frequency stability requirement. Set the detection threshold at 5:1 SNR achieved in 1 sec which allows 1 Hz frequency resolution in the Fourier Transform. For the case of the P-code, the frequency stability requirement derives from being able to resolve spectral lines which may be closely spaced. For example, 0.1 Hz resolution requires 10 seconds of processing and thus a fractional frequency stability of $10^{-8}$.

The SNR in 10 seconds becomes 16:1 which allows the time delay to be measured from the P-code with 1.0 nsec precision. Incoherently time averaging over a 1000 second interval improves the estimate of the delay precision to 0.1 ns (3 cm). One spectral line can serve as the reference for all other measurements. In each 10 second interval, the uncertainty of the phase difference of spectral line 1 relative to line N is given by $(\sqrt{2\pi} SNR)^{-1} = 1.4 \times 10^2$ cycles. For the C/A code modulation, this differential phase noise amounts to 4.1 m; for P-code is equivalent to 41 cm and for the $L_1$ carrier phase differential to 0.13 cm.

The instantaneous frequency offset of the receiver frequency reference is an error in common to all the spectral lines in the bandpass and therefore is common-mode eliminated. Consider two P-code derived spectral lines at their extreme values of $+27$ and $-27$ Hz. Consider that these signals are down converted to an intermediate frequency of 1 kHz center, so that the spectral lines are now at 1027 Hz and 973 Hz, respectively, FIG. 12. The local oscillator is at $10.229 + \epsilon$ MHz. Thus, the higher frequency spectral line is at $1027 - \epsilon$ Hz and the lower at $983 - \epsilon$ Hz. Dealing with a differential data type of higher minus lower spectral line eliminates the $\epsilon$ error and the two lines are separated in frequency space by 54 Hz as was their original state.

Time keeping traceable to the absolute scale of UTC (Universal Time Coordinated) is required at various levels depending upon the accuracy requirements of the mission. For example, from WWV broadcast time, it is possible to synchronize the SERIES receiver clock with 1 millisecond accuracy. The NAVSTAR satellites orbiting at 20,000 km above the Earth have an along track velocity of approximately 4 km/sec. Consider a single receiver operating in a point positioning mode. If the receiver clock is in error by $10^{-3}$ seconds relative to the UTC time scale which forms the independent variable of the GPS ephemerides, then the computed position will be in error by 4 m, and this 4 m error will map strongly into a 4 m point positioning error.

In a differential SERIES receiver mode, the receiver clock error relative to UTC is attenuated by the baseline length to satellite height ratio. Thus, for a 20 km receiver separation, a 1 millisecond UTC error contributes a $4 m - 1000 = 4$ mm baseline error. As a practical issue, many standard laboratories around the world maintain clocks which are traceable to the UTC scale with one microsecond or better accuracy so that SERIES could, in principal, have only a few millimeter position error contribution from the UTC scale.

This problem can of course be turned around and be exploited as a time transfer mode. Consider two locations which are a priori known in their positions to the one meter accuracy level and separated by 10,000 km. Here a 0.5 msec UTC error results in a 1 meter along track displacement which just matches the assumed station location accuracy.

Doppler Positioning

An item of information which was obtained early (Reference 13) in the SERIES development by cross correlation of $L_1$ with $L_2$ was a Doppler data type resulting from the fact that a delayed version of the $L_1$ P-code is in fact not an exact replica of the $L_2$ code. The output of the correlation was time variable because the radio frequencies of $L_1$ and $L_2$ differ by 348 MHz and thus a beat frequency phenomenon occurs which amplitude modulates the output of the correlator. A path change of 86 cm, the wavelength of 348 MHz, causes the correlator output to experience a full cycle of amplitude variation. Thus, a second geodetic data-type, that of single station Doppler, joins with pure VLBI cross correlation of two station observations to make the NAVSTAR-GPS a generally available geodetic resource needing no knowledge of the GPS code sequence. However, this single station Doppler data type is also vulnerable to signal transmission changes to non-identical code sequences on $L_1$ and $L_2$. It is more reliable to exploit the 10.23 MHz P-code chipping rate for pseudo range and range rate data.

By design of the GPS satellites, each of the satellites has an on-board reference atomic oscillator which is synchronized to all of the other GPS satellites to within $10^{-12}$. Therefore, all the satellites have identical P-code chipping rates at 10.23 MHz if viewed in a frame at rest.

Depending upon the location of an observer relative to the orbiting NAVSTAR, the measured Doppler offset frequency will differ from the rest frequency of 10.23 MHz. For example, at the time of closest approach, the velocity along the line of sight goes to zero and the observed frequency would be 10.23 MHz provided the receiver reference oscillator was synchronized to $f_T$, the transmitted frequency of the NAVSTAR, see FIG. 13, which also illustrates the relationship between the range and measured frequency, $f_M$.

The greatest distance between a Earth based observer and the satellite is approximately $25 \times 10^6$ meters to a minimum of about $20 \times 10^6$ meters. The P-code Doppler is a maximum of 27 Hz at rise, passes through 10.23 MHz, at closest approach and becomes low in frequency by 27 Hz as the satellite sets.

In the conventional Transit Doppler positioning geodetic mode (Reference 14), the Doppler offset radio signals at 400 and 150 MHz are observed for a total time equal to the time that the Transit satellite is above the observer's horizon plane which is about 15 minutes. The Transit satellite broadcasts a telemetry message which contains Keplerian ephemeris elements that allow the satellite position to be known in an Earth centered system. By observing the Transit's Doppler offset history, the observer beneath the orbit can deduce where the observer must be located in order that the receiver would have recorded such a Doppler history.

The limited time above the observer's horizon is both an advantage and a disadvantage for the Transit user. The present five Transit satellites orbit at an altitude of approximately 1100 km with a period of 107 minutes. These relatively low orbits cause the satellites to move rather rapidly between the observer's horizons and thus provide rapidly changing geometries. These quickly changing geometries make it possible to estimate the observer's location and receiver oscillator offset from 15 minutes of data. However, the Earth receiver and satellite oscillator stability now enter the determination directly. For a fractional frequency stability of f/f, the accumulated Doppler determined range change will be c f/f T were c is the speed of light and T is the total time required to derive the Doppler observations, typically 15 minutes. Thus, the range change error is $$\Delta\rho_\epsilon = (3\times 10^8 \text{ m/sec})(3\times 10^{-11})(900 \text{ sec}) = 8 \text{ m}$$

Another Transit limitation comes from the fact that the Transit satellites are not always available when a position fix may be desired and that in equatorial zones, several hours may elapse before a single Transit pass occurs. NAVSTAR presents multiple satellites above all Earth horizons at all times once all 18 satellites are in orbit in approximately 1986.

In the case of the NAVSTAR satellites, a trade is made for several satellites in difference sky locations instead of a single Transit satellite moving between different sky locations in several minutes. The principal advantage here is that four or more simultaneously available lines of sight present the opportunity for Doppler measurement to each of the visible NAVSTAR satellites. Three of the four satellites allows the determination of the three dimensional location of the observer in the Earth centered coordinate frame of the NAVSTAR ephemerides and the fourth NAVSTAR allows the estimate of the observer's clock rate offset. Because it is possible to extract the phase of each received satellite signal in a few seconds, the receiver clock stability requirements need be only modest at perhaps $f/f = 3\times 10^{-9}$. Thus, the accumulated range change error in the Doppler count in 10 seconds would be $$\Delta\rho_\epsilon = (3\times 10^8 \text{ m/sec})(3\times 10^{-9})(10 \text{ sec}) = 10 \text{ m}$$

Thus, a two order of magnitude less stable receiver reference contributes a similar range change error and accomplishes it in 10 seconds instead of 15 minutes. For a stationary receiver or a receiver in motion using velocity modelling, this estimation procedure can be repeated and an average result formed. For example, over a 15 minute interval, a SERIES receiver with a modest crystal clock could average its clock contributed error to one meter, thus effecting a two order of magnitude improvement over the Transit Doppler positioning method since 1 meter results can be obtained in 15 minutes instead of one day.

This discussion has concentrated on what is called point positioning and has assumed all NAVSTAR satellites are transmitting synchronized and identical rest frequencies of 1575.42, 1227.6, 10.23 and 1.023 MHz which are made distinguishable by their intrinsic Doppler offsets. It is also assumed that ephemerides of the satellites are known from another source.

At a condition of maximum, the P-code Doppler possesses a positional sensitivity of $4.97\times 10^{-6}$ Hertz per meter which results from the ratio of the satellite's angular rate as seen by the observer divided by the received wavelength. Consider one satellite to be at closest approach so that its Doppler frequency offset is zero since the line of sight velocity is zero. This closest approached satellite now presents its rest P-code frequency of 10.23 MHz that when frequency compared with a satellite either rising or setting will yield their Doppler frequency offsets relative to the closest approach satellite reference. As previously discussed, the differential phase noise between satellite spectral lines is $1.4\times 10^{-2}$ cycle in 10 seconds. To achieve 10 m positioning from the P-code Doppler requires frequency measurement precision of $4.97\times 10^{-5}$ Hz which can be achieved by phase tracking each spectral for 100s. The resolution of C/A code cycles ambiguities using P-code Doppler requires 20s since only 100 m precision is needed. The Doppler frequency offsets associated with each NAVSTAR are essentially unique and can therefore provide positioning estimates which are unambiguous and with sufficient precision to resolve both C/A and/or P-code cycle ambiguities so as to allow the formation of pseudo range just as if the SERIES receiver had decrypted the P-code channel.

The data requirements are modest. The P-code passband is 54 Hz wide and when input to an analog to digital converter (ADC) will require approximately 128 samples per second with each sample composed of 8 bits for a total data rate of 1,024 bits per second (b/s). To accomplish P-code Doppler positioning with 10 m precision will require 100 seconds of data or a total of 102 kb. Using P-code Doppler positioning to achieve 100 m precision to resolve C/A cycles requires 20 seconds of data or 20 kb. A modest voice grade channel could move digital data at a 4 kb/s rate which would require 5 seconds of channel time to transfer the 20 kb needed for a P-code Doppler resolution of C/A cycle ambiguity which allows 0.5 nsec delay precision from the P-code itself.

Where greater Doppler sensitivity is desired, the $L_1$ carrier can be used. The same SERIES receiver product detector approach yields the second harmonics of the $L_1$ and $L_2$ carriers which can be translated to convenient center frequencies (i.e. 10 kHz) where the Doppler frequency offsets will be larger by a factor of 308 for $L_1$ and 240 for $L_2$ compared to the P-code Doppler. The expected Doppler offsets span $\pm 8.3$ kHz for $L_1$ and $\pm 6.5$ kHz for $L_2$. The $L_1$ Doppler sensitivity to position is approximately $1.4\times 10^{-3}$ Hz per meter. A frequency reference fractional stabilty of $5\times 10^{-11}$ will cause frequency noise of 0.16 Hz at the $L_1$ second harmonic which will support 112 m positioning precision, sufficient to resolve C/A ambiguities.

Where a better frequency reference is available, perhaps a good Rubidium oscillator ($1\times 10^{-13}$), then Doppler positioning with sub-meter precision is possible, using the $L_1$ channel. The expected band through which all the satellite signals must pass is 16.6 kHz for the $L_1$ channel so that the FFT must sample at about 32 kb/sec. With $2\times 10^7$ samples, a resolution of $1.5\times 10^{-3}$ Hz is obtained which is equivalent to the oscillator noise. Approximately 12 minutes of receiver observations are required to achieve a 1 m precision. Incoherently combining several 12 minute measurement intervals can improve the precision to approximately 25 cm with about 2.5 hours of data collection.

NAVSTAR to Transmit Adaptor

The SERIES method of NAVSTAR L-band signal de-spreading can be exploited to make an adaptor so that the many existing VHF receivers of the Transit Navigational Satellite System (Reference 14) can be used to receive the NAVSTAR satellites. FIG. 14 illustrates the recovery of the double frequency $L_1$ and $L_2$ GPS carriers, with twice their associated Doppler shifts, and the heterodyne down-conversion to the 399.968 MHz high frequency channel and the 149.988 MHz lower or refraction channel of a conventional Transit receiver. Each of these translated NAVSTAR carriers is then combined with a GPS emphemeris message extracted from the $L_1$ C/A 50 bit/second telemetry and reformatted to resemble a Transit message. A mock ephemeris can also be used so that the Transit receiver will accept an adaptor created signal and the Transit receiver Doppler count can be processed after the fact with the actual best known GPS ephemeris. The conventional Doppler receiver processes the carrier cycle counts as if it had received a Transit satellite. Subsequent data reduction software then processes in a manner consistent with the actual physical situation of the NAVSTAR satellites in much higher orbits than the Transit satellites. The ionospheric correction factors are also scaled to account for the error present at L-band rather than at VHF frequencies. In this manner, no internal modifications are made to the conventional Transit Doppler receivers, so that at a flip of a switch the receiver can function with either a Transit satellite transmitting VHF carriers or through the adaptor to use the L-band spread spectra of the NAVSTAR satellites without the necessity of knowing the GPS code sequences.

The accuracy of such a Transit to NAVSTAR adapted receiver is as discussed in the section, Doppler Positioning with sub-meter precision attainable. Allowing one minute per satellite will require 240 seconds to gather four independent satellite observations in order to solve the three dimensional separation between a pair of antennas and synchronize the oscillator rates between the receivers. Where sub-meter precision is the goal, 4 minutes of data will require a reference oscillator stability of $3 \times 10^{-13}$ for each receiver, which is available from a Rubidium clock. By averaging approximately two hours of data, 25 cm baseline vector precision should be obtainable.

Differential Observations

An important data type is differential Doppler and differential pseudo ranging either from the received carriers or P or C/A channels. Differencing automatically removes any possible phase or phase rate biases which might originate in the GPS satellites. Operating in a differential mode also reduces the sensitivity of the baseline vector determination to the satellite ephemeris uncertainty. Orbit errors contribute to baseline error attenuated by the ratio of the baseline length to satellite height, nominally 20,000 km, (Reference 15). Thus, for a 20 km baseline separation between receivers, a 10 meter satellite orbit uncertainty at its 20,000 km orbital position contributes 1 cm to baseline uncertainty.

Satellite Positions and Phase Offsets

In order to maintain independence from the military systems it is important to have an alternative method for determination of satellite positions and the phase offsets of the clocks in orbit. Also, such an independent method should not involve computation through orbit mechanics because of the need for complex software, detailed gravity field models and a large computer. A purely geometric approach is therefore preferred even though such a method has no past or future GPS satellite orbital positioning capability (Reference 10).

The positions of the GPS satellites are solved-for parameters in this implementation. Consider a network of reference sites. Each of the Earth reference site SERIES receivers is at a known location previously determined by mobile VLBI methods with 5 cm accuracy relative to a quasar reference frame (Reference 9). For a scenario which is purely geometric, five Earth sites, widely separated, view four GPS satellites and form 20 unique observations (ten baseline pairs exist but only five are not linear combinations of other pairs). There are 20 unknowns which result from the three space positions of each satellite, plus a range bias in each satellite, plus four Earth based clock synchronization terms (one Earth station is taken as the reference for all the clock terms). The problem is therefore uniquely solvable although the issues of geometric strength of the solution must be accounted in actual applications.

To a first approximation, for Earth sites separated by 4000 km, a priori known to 5 cm, the GPS positions can be determined geometrically to approximately 25 to 30 cm since the GPS satellites orbit about 20,000 km above the Earth's surface. A range type bias in GPS signals can also be determined to approximately 30 cm (one nanosecond). Having the three dimensional position of each NAVSTAR satellite and the range bias in each satellite now makes it possible for a single pseudo-ranging receiver to perform point positioning with 30 cm precision or 5 cm precision at continental distances (i.e. 4000 km) when operated in a differential mode with the reference stations used to derive the GPS satellite positions. Also, from knowledge of each satellite's position derived from differential observables on the Earth, it is possible to deduce the relative $L_1 - L_2$ phase bias in the satellites consistent with the 30 cm orbital positioning uncertainty or a time equivalent bias of one nanosecond. Thus, the originally sought parameters of $\rho$, $\bar{p}_s$, $\bar{R}$, $\Delta t_s$ and $\Delta t_u$ can now be determined and SERIES receivers can be operated in a point positioning mode.

Ionospheric Calibration: Dual P-Code Channels

The L-band region of the electromagnetic spectrum contains substantial ionospheric delay effects when considering the sub-decimeter baseline accuracy requirements of geodesy. In an uncalibrated mode, the $L_1$ channel at 1575 MHz would experience approximately 15 m of zenith range delay or up to 40 m of delay at low elevation angles during active ionospheric conditions (zenith columnar contents of $10^{18}$ electrons per $m^2$). In a Doppler positioning mode, using the SERIES method, the $L_1$ channel would be disturbed by approximately 10 meters of positioning equivalent error which results from a columnar electron content rate of change of $6 \times 10^{17}$ el/$m^2$ per hour.

Clearly, the dual channel availability of NAVSTAR must be used to explicitly measure the ionospheric delay and delay rate effects in the line of sight to the satellite being observed. The differential, $L_1 - L_2$ frequencies, while not being optimum for measuring the ionospheric delay, are sufficient for determining the dispersion effect with the required precision.

In an earlier form of experimentation, (Reference 13) the SERIES ionospheric calibration utilized an analog cross correlation approach which exploited the fact that the identical P-code modulation sequence is coherently transmitted by NAVSTAR on both the $L_1$ and $L_2$ GPS channel (Reference 4). The ionospheric columnar content was measured by intentionally delaying the first arriving $L_1$ signals and then cross correlating with the $L_2$ channel. The delay in the $L_1$ is made adjustable to compensate the differential delay experienced in the $L_2$ channel. When the output of the correlator is a maximum, the variable delay value is the ionospheric delay. While the technique was functional, it suffered from two difficulties: it was difficult to calibrate to 0.1 nanoseconds and vulnerable to changes in the NAVSTAR transmission format. For example, the GPS satellites could conceivably be reconfigured so as to broadcast different portions of the P-code sequence on $L_1$ and $L_2$ thus destroying the possibility of obtaining an output by inter-channel cross correlation.

A more reliable approach was to exploit the 10.23 MHz P-code bit transition rates separately derived from the $L_1$ and $L_2$ channels. The 10.23 megabit per second code chip rate is directly derived from the on-board atomic frequency references and used to coherently modulate $L_1$ and $L_2$. Although the actual code sequence or code phasing might be altered, it is likely that the P-code chip rates of $L_1$ and $L_2$ will not be changed. Thus, the phase of the code transitions are probably in coincidence or with simple constant offsets in the satellites and will therefore experience ionospheric dispersion in the same manner that the code sequence is differentially delayed in the previously mentioned inter-channel correlation approach.

A digital time interval counter and/or a phase measuring device is used to determine the lag of the $L_2$ channel relative to the $L_1$ channel to determine the columnar content of the ionosphere plus any initial bias present in the NAVSTAR prior to transmission. This SERIES subsystem has been given the name SLIC for Satellite L-band Ionospheric Calibration and is illustrated in FIG. 15 for the case of receiving a single satellite or FIG. 16 for simultaneous multiple satellite reception.

Consider the P-code transitions at $L_1$ and $L_2$ to be phase coincident at the satellite's location. The $L_1$ and $L_2$ channels then experience the ionospheric dispersion because of their 347.82 MHz of frequency separation. The physics of this situation is discussed in Reference 16 and summarized as follows: The group delay effect is in general, $t = AI/cf^2$ where:

A = 40.3 in MKS units
I = columnar electron content, electrons per $m^2$
f = radio frequency, Hertz
c = speed of light, meters per second
t = ionospheric time delay, seconds The SLIC observable is the differential group delay (T) between $L_1$ and $L_2$.

$$T = t_2 - t_1 = AI/C[1/f_2^2 - 1/f_1^2]$$

Consider now the extreme conditions of the ionosphere. The minimum zenith content to be expected is $I = 0.5 \times 10^{17}$ el/$m^2$ which will result in T = 1.75 nanoseconds. At a maximum, the zenith content could approach $10^{18}$ el/$m^2$ and observing at a low elevation angle causes a columnar content of $2.5 \times 10^{18}$ el/$m^2$ and results in T = 87.50 nanoseconds. Exploiting the P-code in this manner has an ambiguity of 97.75 ns and thus care must be exercised in high ionospheric content situations.

In geodetic missions, calibration must be applied to the pseudo-range observable at either $L_1$ or $L_2$. The ionospheric delay on $L_1$ is $t_1 = 1.54$ T. Thus, $10^{17}$ el/$m^2$ results in T = 3.5 ns or 105 cm path equivalent difference between $L_1$ and $L_2$, 162 cm of path delay at the $L_1$ channel or 267 cm of path delay at the $L_2$ channel.

The SLIC error sources contain three major elements (1) receiver noise, (2) receiver delay and (3) possible biases in the NAVSTAR at the time of transmission. (1) Using a 1.5 m diameter dish antenna provides more than adequate signal strength and the differential phase shift between the $L_1$ and $L_2$ channels is measured to within 0.1 ns RMS or better with one second of averaging, corresponding to a columnar content of $3 \times 10^{15}$ el/$m^2$ or 4.6 cm of pseudo range calibration on the $L_1$ channel. Thus, to achieve a two centimeter precision in pseudo ranging calibration, 5 seconds of SLIC data must be averaged. (2) To measure the differential phase behavior of the SLIC receiver itself, a GPS satellite simulator consisting of a PRN sequence is modulated onto carriers at $L_1$ and $L_2$ and injected into the first R.F. amplifier and the data system processes the signal in a manner identical to the reception of the NAVSTAR signals. In this way the dissimilarities between $L_1$ and $L_2$ signal paths is measured and with a precision of 0.06 ns to achieve a 2 cm accuracy in the SLIC receiver delay. (3) According to the specification of the Block I NAVSTAR satellite (Reference 17), the phasing of the P-code transmissions on $L_1$ and $L_2$ channels are to be within 1.5 nanoseconds of coincidence. Such a time difference in transmission will cause a bias in the deduced total columnar content equivalent to $3 \times 10^{16}$ el/$m^2$ but will have no effect upon the SERIES determined baseline vectors performed in a two station differenced pseudo range mode since any satellite biases are common-mode rejected.

Some of the important features of the SLIC method are:

(1) Total columnar content measurement with a precision of $10^{15}$ el/$m^2$ with 10 seconds of averaging and an accuracy dependent upon the phasing in the NAVSTAR, limited to approximately $3 \times 10^{16}$ el/$m^2$.
(2) No P-code digital sequence knowledge required.
(3) No dependence upon orbit kinematics of the NAVSTAR.
(4) No modeling of geomagnetic fields of unsensed electrons as with the Faraday Rotation method.
(5) Completely passive, no active elements as with ionosondes or topside sounders aboard Earth orbiting spacecraft.
(6) Modest instrumentation requirements, with options for omni-directional reception.
(7) Columnar content measurement from a single station, no cross-correlation between two stations to achieve signal detection as in the VLBI methods.
(8) A single satellite pass allows horizon to horizon sampling of the ionosphere in 6 hours, the full 18 satellite constellation will allow a continuous sampling in at least four directions (perhaps as many as seven) from every location on the Earth's surface.

Single Channel Ionospheric Calibration

The fact that the NAVSTAR coherently derives the L-band carriers and the modulations, presents the opportunity to measure the change of columnar electron content without explicit recourse to the dual L-band transmissions as previously described. A technique developed for use in calibrating Doppler radio metric tracking data for use in interplanetary navigation (Reference 18) can be exploited in this case to derive the rate of change of columnar electron content to calibrate a single channel, either $L_1$ and $L_2$, receiver for Doppler positioning.

The technique exploits the physical fact that as ionospheric electrons either enter or leave the path between the satellite and receiver that the L-band carrier phase and wideband P-code modulations experience propagation velocity changes which are equal in magnitude but opposite in algebraic sign. There is also the very convenient property that the physical motion of the satellite and receiver is common mode eliminated from the observable created by Differenced Range Versus Integrated Doppler (DRVID). The DRVID measurement contains physics which reveals that for an increasing columnar electron content $\dot{I}>0$, the carrier phase velocity increases while the group velocity, with which the wideband P-mode modulation propagates, undergoes a velocity decrease. Thus, differencing the range change deduced by accumulated carrier cycles between times $t_1$ to $t_2$ from the range change deduced by subtracting the range at times $t_1$ and $t_2$ a generally non-zero value results which is proportional to twice the number of electrons that either entered or left the line of sight between times $t_1$ and $t_2$.

As derived in reference 18, $$DRVID = 2A/f^2 \int_{t_1}^{t_2} \dot{I}(t)dt$$

where $\dot{I}(t)$ is the time rate of change of the columnar content and $A=40.3$. The range change in the accumulated Doppler mode is in error by $$A/f^2 \int_{t_1}^{t_2} \dot{I}(t)dt = \tfrac{1}{2}DRVID.$$

Thus, a single channel SERIES receiver can be self calibrating for ionospheric effects when operated in a Doppler positioning mode. FIG. 17 illustrates the implementation for simultaneous multiple satellite DRVID ionospheric time delay variations.

High Precision Ionospheric Measurement

In FIG. 6, the $L_1$ and $L_2$ carrier second harmonics are recovered and down-converted to 10 kHz center frequency which are indicated as outputs $A_1$ and $A_2$. A phase comparison of these two outputs would yield the differential ionospheric phase velocity induced by a changing columnar electron content. However, the kinematics of differential Doppler between the $L_1$ and $L_2$ channels will also be present and be the dominant mechanism for differential $L_1$ minus $L_2$ phase. This kinematically induced phase rate behaves as if a carrier at twice the ($L_1-L_2$) frequency (695.64 MHz) was being received. This twice ($L_1-L_2$), $2\Delta L$ carrier undergoes 68 times the Doppler frequency shifts that occur at the P-code modulations.

The differential ionospheric effects of the carriers can only be extracted by first removing the kinematical effects from this differential carrier data-type. A modeling of the kinematics can be done by using the P-code phase multiplied by 68 and accounting the fact that the ionospheric changes on the P-code are opposite in algebraic sign to the carrier phase changes. A problem results from the precision available from the P-code to model the $2\Delta L$ observable phase changes. A goal of $10^{14}$ el/m$^2$ measurement sensitivity requires a $2\Delta L$ phase measurement precision to 0.1 cm which represents 0.002 cycle of the $2\Delta L$ data type but will require P-code phase precision of $3\times 10^{-5}$ cycles. To achieve such phase precision will require an SNR=5300. Using a 1.5 m diameter dish antenna, SNR=260 has been achieved in two seconds. By averaging over an 800 second interval, the SNR can be formally increased to 5300 but may lose its significance at the columnar content level of $10^{14}$ el/m$^2$.

This kinematical rate aided tracking of $2\Delta L$ is accomplished by first down-converting either the $L_1$ P-code or $L_2$ P-code channels which appear on 1 kHz biases on outputs $B_1$ and $B_2$. The next down-conversion is to zero frequency bias by mixing with 1 kHz. The resultant is then multiplied by 68 and mixed with the $2\Delta L$ signal (see FIG. 18).

Each $1\times 10^{15}$ el/m$^2$ columnar electron content increase will advance the $2\Delta L$ phase by $2\times 10^{-3}$ cycles and retard the group velocity of the P-code by $5\times 10^{-5}$ cycles which when multiplied by 68 becomes $3.8\times 10^{-3}$ cycles. Thus, a total phase shift of $5.8\times 10^{-3}$ cycles results on frequencies which may be as large as 68 times P-code Doppler or 1.8 kHz.

Using a simple time interval counter, a $5.8\times 10^{-3}$ cycle shift amounts to a time equivalent of 3.2 microseconds on a maximum 1.8 kHz Doppler offset in the $2\Delta L$ data type.

This measurement approach has an ambiguity whenever the $L_2$ channel changes by 12 cm (note the second harmonic of $L_2$ is actually recovered). At $L_2$, $10^{17}$ el/m$^2$ results in 267 cm delay change so 12 cm changes result from a columnar electron content change of $4.5\times 10^{15}$ el/m$^2$.

The ability to calibrate the ionosphere to the $10^{14}$ el/m$^2$ level amounts to a 0.16 cm calibration on the $L_1$ channel or 0.27 cm on $L_2$.

Applications

Embodiments of this invention have been disclosed in the following documents:

JPL No./NASA No.

4926/15437 Satellite L-band Ionospheric Calibration (SLIC)

4926/15437 Realtime Ionsopheric Radio Surveillance System

5029/15557 Sub-meter Positioning System Using SERIES and Single Station Doppler

5042/15570 Code Sequence Independent One-Way Range Synthesis

5079/15604 SERIES-GPS Aircraft Collision Avoidance System (combined with 5107)

5107/15640 Air Traffic Surveillance/Collision Avoidance System

5244/15791 NAVSTAR-GPS System Adaptation to Transit Doppler Positioning Equipment 5105/15638 Means of Tracking Earth Orbiting Satellites Using SERIES 5346/15888 Emergency Locator Beacon Homing by SERIES/GPS Location References 1. Milliken, R. J., and Zoller, C. J., "Principle of Operation of NAVSTAR and System Characteristics," Navigation 25, 3: 14, 1978.
2. Ong, K. M., MacDoran, P. F., "Quasars and Artificial Satellites for Geodynamics Monitoring and Earthquake Research," International Conference on Cybernetics and Society, October 1979.

3. MacDoran, P. F., Spitzmesser, D. J., Buennagel, L. A., "SERIES: Satellite Emission Range Inferred Earth Surveying," Proceedings of the Third International Geodetic Symposium on Satellite Positioning, Las Cruces, N. Mex., February 1982.
4. Spilker, J. J., Jr., "GPS Signal Structure and Performance Characteristics," Navigation 25, 121-146 (1978).
5. Spilker, J. J., Jr., [Digital Communications by Satellite, Prentice-Hall, Inc. Englewood Cliffs, N.J., 1977.
6. Viterbi, A. J., Principles of Coherent Communications, McGraw-Hill, 1966.
7. Bartholomew, C. A., "Satellite Frequency Standards," Navigation, Vol. 25, No. 2, Summer 1978.
8. Thomas, J. B., "An Analysis of Long Baseline Radio Interferometry," The Deep Space Network Progress Report, Tech. Rep. 32-1526, Vol. 7, p. 37, Jet Propulsion Laboratory, Pasadena, Calif., 1972a.
Thomas, J. B., "An Analysis of Long Baseline Radio Interferometry, 2," The Deep Space Network Progress Report, Tech. Rep. 32-1526, Vol. 8, p. 29, Jet Propulsion Laboratory, Pasadena, Calif., 1972b.
9. Niell, A. E., K. M. Ong, P. F. MacDoran, G. M. Resch, D. W. Fite, L. J. Skjerve, D. J. Spitzmesser, D. D. Morabito, L. Tanida, E. S. Claflin, B. B. Johnson, M. G. Newsted, A. Banisch, and J. F. Dracup: "Comparison of a Radio Interferometric Differential Baseline Measurement with Conventional Geodesy," Tectonophysics, 52, p. 532, 1979.
10. MacDoran, P. F., "Satellite Emission Radio Inteferometric Earth Surveying, SERIES-GPS Geodetic System," Bulletin Geodesique, 53 (1979), pp. 117-138.
11. Thomas, J. B., "An Analysis of Long Baseline Radio Interferometry, 3," The Deep Space Network Progress Report, Tech. Rep. 32-1526, Vol. 8, p. 29, Jet Propulsion Laboratory, Pasadena, Calif., 1973.
12. Williams, J. G., "Very Long Baseline Interferometry and Its Sensitivity to Geophysical and Astronomical Effects," JPL Space Programs Summary 37-62, Vol. II, March 1970.
13. MacDoran, P. F., SERIES-Satellite Emission Radio Interferometric Earth Surveying, Third Annual NASA Geodynamics Program Review, Crustal Dynamics Project Geodynamics Research, NASA, Washington, D.C., pp. 76 (1981).
14. Navy Navigation Satellite System (Transit) Issue, Johns Hopkins APL Technical Digest, January--March 1981, Vol. 2, No. 1.
15. Russell, S. S., Schaibly, J. H., "Control Segment and User Performance," Navigation, Vol. 25, No. 2, Summer 1978.
16. Koehler, R. L., "Radio Propagation Measurements of Pulsed Plasma Streams From the Sun Using Pioneer Spacecraft," J. Geophys. Res. 73, 115, 4483-4894 (1968).
17. Interface Control Document, 03953, Space Division, Rockwell International Corporation, September 1975.
18. MacDoran, P. F., "A First-Principles Derivation of the Differenced Range Versus Integrated Doppler (DRVID) Charged-Particle Calibration Method," JPL Space Programs Summary 37-62, Vol. II, March 1970.

CONVENTIONAL GPS POSITIONING METHOD
(2-DIMENSIONAL CASE)

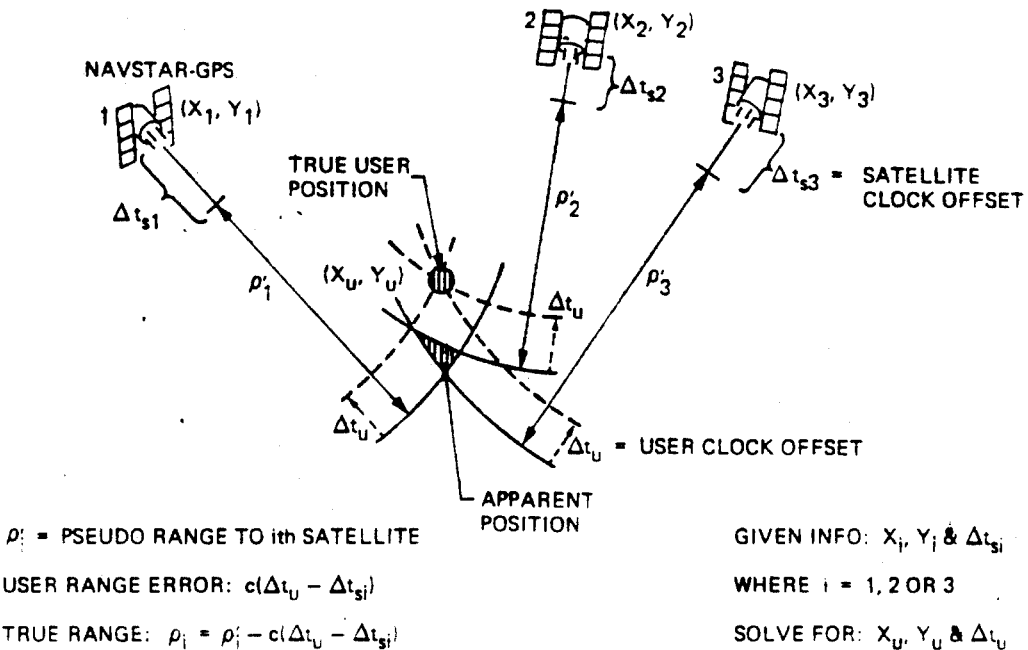

Figure 1

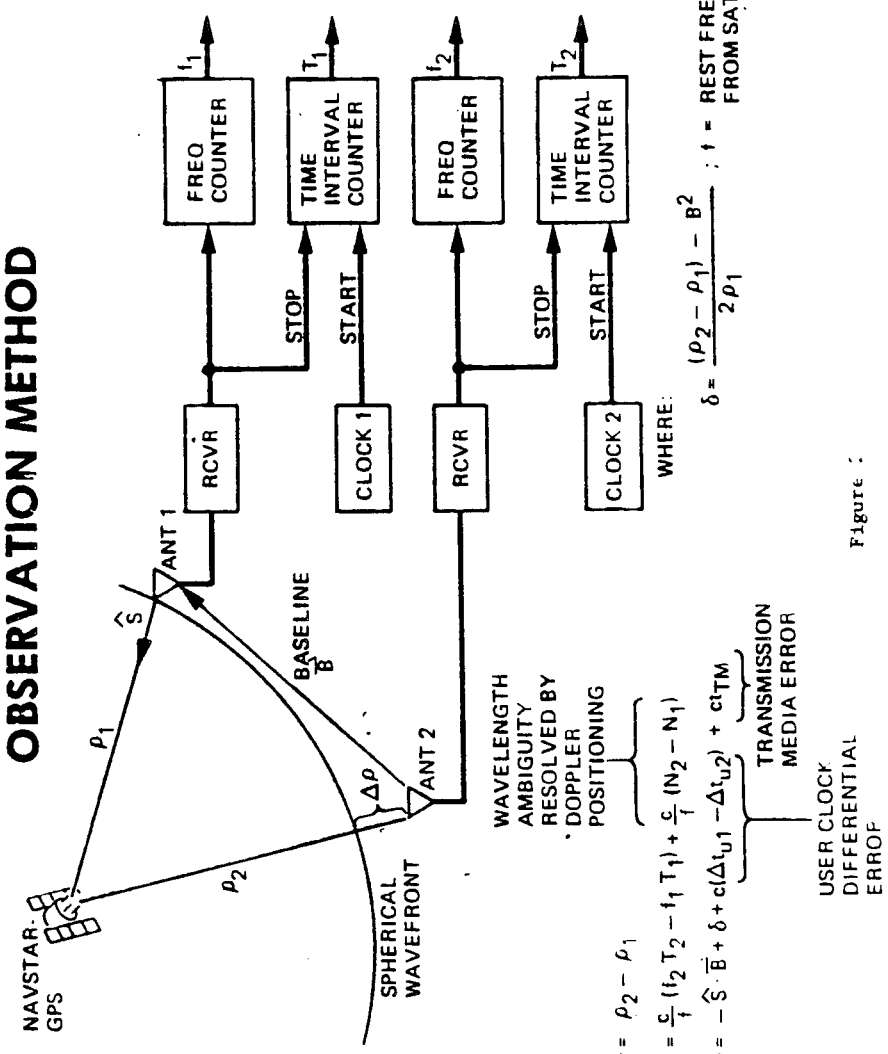
Figure

SUPPRESSED CARRIER RECOVERY

CARRIER SUPPRESSED
BI-PHASE MODULATED SIGNALS AT:
1575.42 MHz OR 1227.6 MHz

2nd HARMONIC OF SUPPRESSED CARRIER
3150.84 MHz
OR
2455.20 MHz

DELAY AND MULTIPLY RECOVERY OF GPS BIT CLOCKING

SERIES TECHNIQUE
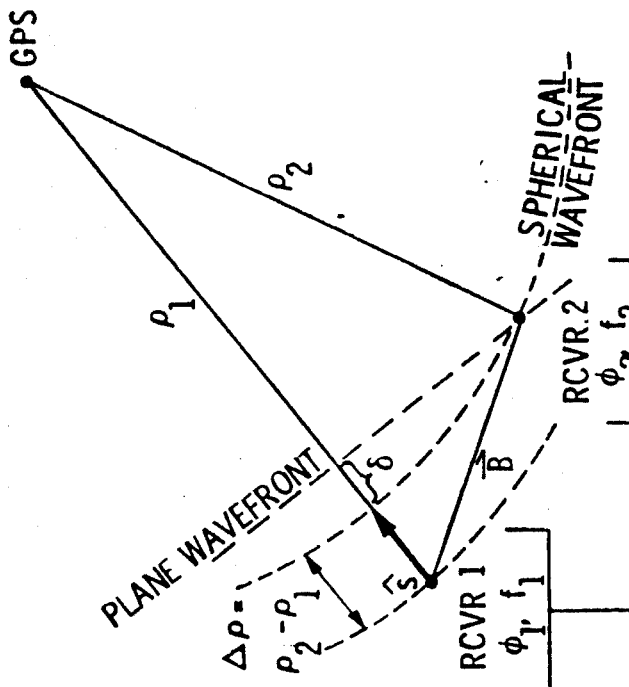
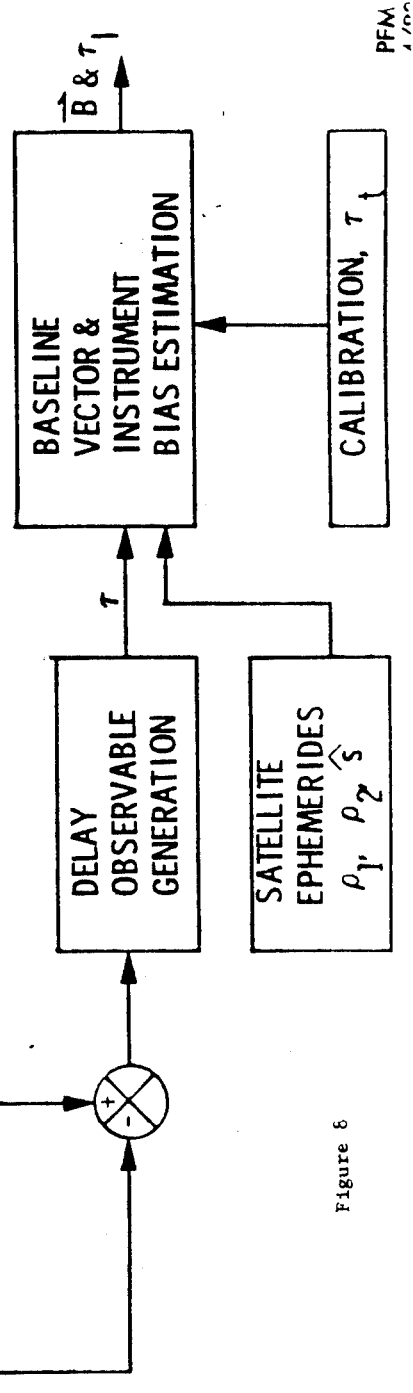
$$\text{DELAY, } \tau = \frac{\phi_2}{f_2} - \frac{\phi_1}{f_1} + \frac{1}{f}(N_2 - N_1) - \frac{\Delta\rho}{c}$$
$$\tau = \frac{1}{c}(-\hat{s}\cdot\vec{B}) + \tau_1 + \tau_t + \frac{\delta}{c}$$
WHERE
$$\delta = \frac{(\rho_2 - \rho_1) - B^2}{2\rho_1}$$
Figure 8

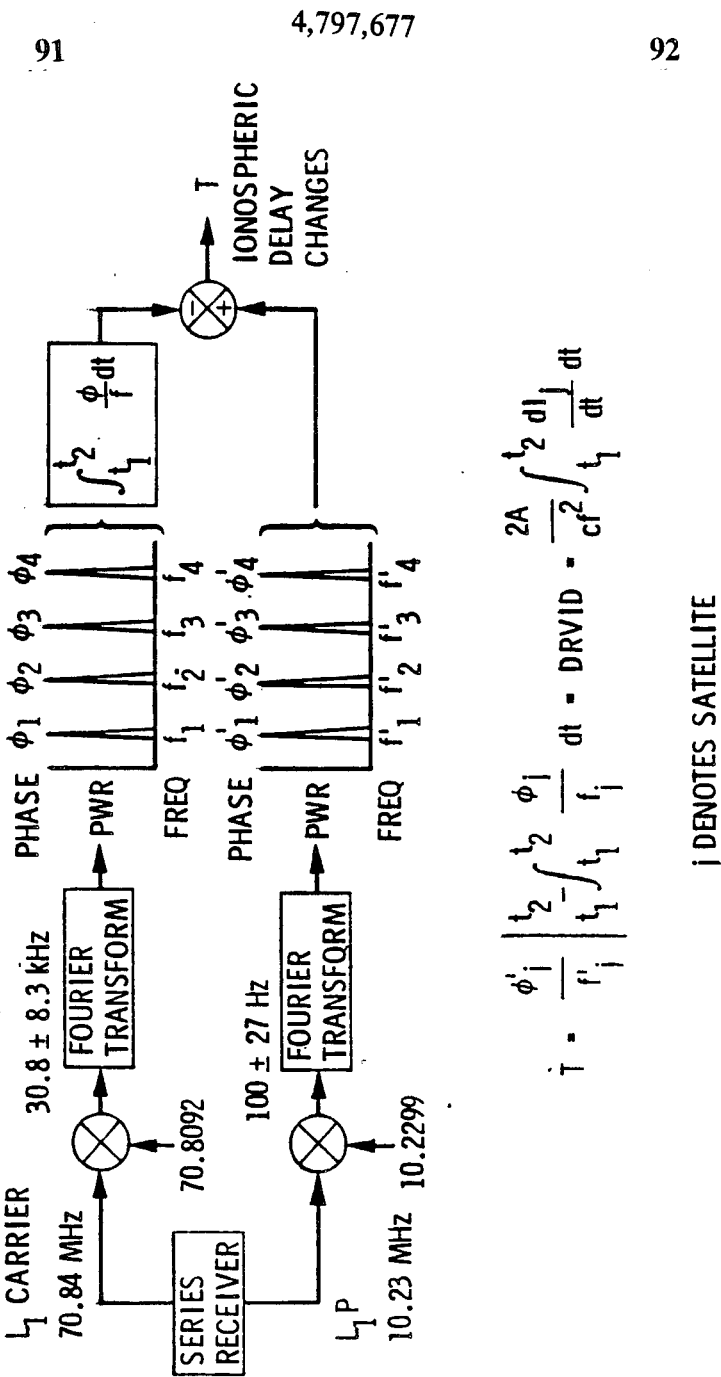

Figure 17

What is claimed is:

1. A method for deriving pseudo range from a user to earth-orbiting, signal-transmitting satellites that transmit a radio frequency signal having a component at a given frequency, the method comprising the steps of:
intercepting the signal from each satellite at the position of the user;
recovering the component from the intercepted signal from each satellite;
measuring the phase of the component;
measuring the frequency of the component;
deriving from the measured phase and frequency of the intercepted signal component from each satellite a fractional phase;
deriving from the measured frequencies from at least two satellites a Doppler range value;
dividing the Doppler range value by the wavelength of the given frequency to produce an integer and a remainder; and
adding the integer to the fractional phase.

2. A method for deriving pseudo range from a user to a signal transmitting satellite that transmits a radio frequency signal having a first component at a given frequency and a second component at a frequency higher than the given frequency, the method comprising the steps of:
- intercepting the signal from the satellite at the position of the user;
- recovering the first and second components from the intercepted signal;
- measuring the phase of the first component;
- determining a coarse range value from the satellite to the position of the user to an accuracy better than a wavelength of the first component;
- processing the coarse range value and the measured phase of the first component to resolve the ambiguity of the measured phase as a representation of a first pseudo range value, the frequency of the first component being sufficiently high that the first pseudo range value is accurate to better than a wavelength of the second component;
- measuring the phase of the second component; and
- processing the first pseudo range value as a coarse range value and the measured phase of the second component to resolve the ambiguity of the measured phase as a representation of a second pseudo range value.

3. The method of claim 2, in which the step of determining a coarse range value comprises measuring the Doppler frequency shift of the first component.

4. A method of deriving pseudo range from a user to a plurality of signal transmitting satellites that transmit radio frequency signals having a component at a given frequency, the method comprising the steps of:
- intercepting the signals from the satellites at the position of the user;
- recovering components from the intercepted signal, Doppler shifted according to the position of the transmitting satellites;
- Fourier transforming the recovered components in phase and phase quadrature to separate the components from the different satellites;
- comparing the in phase and quadrature phase Fourier transforms to derive phase measurements of the components;
- determining a coarse range value from one of the satellites to the position of the user to an accuracy better than a wavelength of the given frequency; and
- processing the coarse range value and the phase measurements to resolve the ambiguity of the measured phase values as representation of the pseudo range from the satellite to the position of the user.

5. The method of claim 4, in which the determining step comprises deriving Doppler frequency shift values from the time change of the phase measurements.

* * * * *